United States Patent
Liang et al.

(10) Patent No.: US 11,513,746 B2
(45) Date of Patent: Nov. 29, 2022

(54) POLICY-BASED PRINTING SYSTEM AND METHODS USING LIST FOR DOCUMENTS

(71) Applicant: Kyocera Document Solutions, Inc., Osaka (JP)

(72) Inventors: Jin Liang, Dublin, CA (US); Tai Yu Chen, Dublin, CA (US); Michael Ong Martin, Pacheco, CA (US)

(73) Assignee: Kyocera Document Solutions, Inc., Osaka (JP)

( * ) Notice: Subject to any disclaimer, the term of this patent is extended or adjusted under 35 U.S.C. 154(b) by 0 days.

(21) Appl. No.: 17/580,039

(22) Filed: Jan. 20, 2022

(65) Prior Publication Data

US 2022/0137896 A1    May 5, 2022

Related U.S. Application Data

(63) Continuation of application No. 17/080,207, filed on Oct. 26, 2020, now Pat. No. 11,269,568, which is a continuation-in-part of application No. 16/452,038, filed on Jun. 25, 2019, now Pat. No. 10,942,688, which is a continuation-in-part of application No. 16/451,913, filed on Jun. 25, 2019, now Pat. No. 10,817,230, which is a continuation-in-part of application No. 16/452,041, filed on Jun. 25, 2019, now Pat. No. 10,929,548.

(51) Int. Cl.
*G06F 3/12* (2006.01)

(52) U.S. Cl.
CPC .......... *G06F 3/1222* (2013.01); *G06F 3/1238* (2013.01); *G06F 3/1268* (2013.01); *G06F 3/1292* (2013.01)

(58) Field of Classification Search
CPC .... G06F 3/1222; G06F 3/1238; G06F 3/1292; G06F 3/1268
USPC ........................................................ 358/1.14
See application file for complete search history.

(56) References Cited

U.S. PATENT DOCUMENTS

| | | | |
|---|---|---|---|
| 7,716,240 B2 | 5/2010 | Lim | |
| 10,002,474 B1 | 6/2018 | Fernandez | |
| 11,165,783 B1* | 11/2021 | Eiers | ................... H04L 41/0893 |
| 2007/0107048 A1 | 5/2007 | Halls | |
| 2008/0034403 A1 | 2/2008 | Kakigi | |
| 2012/0162112 A1 | 6/2012 | Cho | |
| 2015/0369589 A1 | 12/2015 | Sochman et al. | |
| 2018/0213097 A1 | 7/2018 | Seike | |
| 2018/0341764 A1 | 11/2018 | Chou | |
| 2021/0306473 A1* | 9/2021 | Inouye | ............... H04N 1/00143 |

\* cited by examiner

*Primary Examiner* — Allen H Nguyen
(74) *Attorney, Agent, or Firm* — Millen, White, Zelano & Branigan, P.C.; William Nixon

(57) ABSTRACT

A policy-based printing system is implemented to allow access to a private domain to print using a public domain. The private domain includes private servers that store documents. The public domain includes servers and a printing device. A public policy server uses a domain list and a protocol connection with a private authentication server to validate a user and identify which private domain to access. The public policy server receives requests from the printing device to process a print job of a document in the private domain. A list is generated from the private server storing the documents based on the policy or other criteria. The list is provided to the user so that an approved listed document can be selected for printing.

20 Claims, 26 Drawing Sheets

| | | |
|---|---|---|
| Private Domain 120 | @example1.com | ← 402 |
| | @example2.com | ← 404 |
| Private Domain 130 | @company.com | ← 406 |
| Private Domain N | @firm.com | ← 408 |
| Private Domain N+1 | @college.com | ← 410 |
| Private Domain X | @website.com | ← 412 |

POLICY-BASED PRINTING SYSTEM AND METHODS USING LIST FOR DOCUMENTS

FIELD OF THE INVENTION

The present invention relates to a system of private and public servers that implement policy-based printing operations. The system includes public and private domains that support the policy used for printing operations, wherein the policy is implemented using a private server with a public server to generate a list of approved documents to print.

DESCRIPTION OF THE RELATED ART

Existing policy-based printing systems mostly operate within a closed private domain environment. Print data submitted by users may be only accessible within a single domain environment. Some users, such as on-the-go users including insurance and real estate agents, sales executives, lawyers, and company executives, require the capability to access printing data beyond an office environment. These users travel extensively and find themselves needing to print in public locations, such as convenience stores, libraries, airports, copy and printing service stores, and the like. At these locations, the users may not reliably access the printing data. Further, these public locations may not support policy-based printing.

SUMMARY OF THE INVENTION

A policy-based printing method is disclosed. The policy-based printing method includes receiving a request with information at a public server to perform printing operations at a printing device. The information corresponds to a user. The policy-based printing method also includes determining a private domain at the public server for the user based on the information. The policy-based printing method also includes sending the request to a private server corresponding to the private domain from the public server. The policy-based printing method also includes determining a plurality of documents accessible by the user. The plurality of documents is stored at the private server. The policy-based printing method also includes applying a policy stored at the private server to each of the plurality of documents. The policy corresponds to the user. The policy-based printing method also includes selecting at least one document from the plurality of documents according to the policy to generate a list. The policy-based printing method also includes receiving the list including the at least one document at the public server. The policy-based printing method also includes providing the list including the at least one document to the user at the printing device.

A policy-based printing method is disclosed. The policy-based printing method includes receiving a request with information at a public server to perform printing operations at a printing device. The information corresponds to a user. The policy-based printing method also includes determining a private domain at the public server for the user based on the information. The policy-based printing method also includes sending the request to a private server corresponding to the private domain. The policy-based printing method also includes determining a plurality of documents accessible by the user. The plurality of documents is stored at the private server. The policy-based printing method also includes determining a remaining credit value for a print job for the user to be printed at the printing device using a ledger. The policy-based printing method also includes selecting at least one document from the plurality of documents according to the remaining credit value for the user to generate a list. The policy-based printing method also includes receiving the list including the at least one document at the public server. The policy-based printing method also includes providing the list including the at least one document to the user at the printing device.

A policy-based printing system is disclosed. The policy-based printing system includes a printing device. The policy-based printing system also includes a public server connected to the printing device. The public server is configured to receive a request with information from the printing device to perform printing operations for a user and to determine a private domain for the user based on the information. The policy-based printing system also includes a private server in the private domain connected to the public server. The private server is configured to receive the request from the public server and generate a list of at least one document according to the user and the printing device. The private server is configured to apply a policy to generate the list. The policy allows the at least one document to be printed on the printing device. The private server is configured to send the at least one document to the printing device through the public server. The printing device is configured to display the list with the at least one document.

A policy-based printing method is disclosed. The policy-based printing method includes receiving a request with information from a mobile application on a mobile device to perform printing operations at a printing device. The information corresponds to a user. The policy-based printing method also includes determining a private domain for the user at a public server connected to the printing device based on the information in the request. The policy-based printing method also includes sending the request to a private server corresponding to the private domain from the public server. The policy-based printing method also includes determining a plurality of documents accessible by the user. The plurality of documents is stored at the private server. The policy-based printing method also includes applying a policy stored at the private server to each of the plurality of documents. The policy corresponds to the user. The policy-based printing method also includes selecting at least one document from the plurality of documents according to the policy to generate a list. The policy-based printing method also includes receiving the list including the at least one document at the public server. The policy-based printing method also includes providing the list including the at least one document to the user at the mobile application on the mobile device.

A policy-based printing method is disclosed. The policy-based printing method includes receiving a request with information from a mobile application on a mobile device to perform printing operations at a printing device. The information corresponds to a user. The policy-based printing method also includes determining a private domain for the user at a public server connected to the printing device based on the information in the request. The policy-based printing method also includes sending the request to a private server corresponding to the private domain. The policy-based printing method also includes determining a plurality of documents accessible by the user. The plurality of documents is stored at the private server. The policy-based printing method also includes determining a remaining credit value for a print job for the user at the printing device using a ledger. The policy-based printing method also includes selecting at least one document from the plurality of documents according to the remaining credit value for the user. The policy-based printing method also includes receiving a list including the at least one document at the public server. The policy-based printing method also includes providing the list including the at least one document to the user at the mobile application on the mobile device.

A policy-based printing method is disclosed. The policy-based printing method includes receiving a request with information at a public server from a mobile application on a mobile device to perform printing operations at a printing device. The information corresponds to a user. The policy-based printing method also includes determining a private domain for the user at the public server based on the information in the request. The policy-based printing method also includes determining a plurality of documents accessible by the user based on the private domain. The policy-based printing method also includes generating a list of at least one document from the plurality of documents according to a constraint corresponding to the user. The policy-based printing method also includes receiving the at least one document of the list at the public server. The policy-based printing method also includes receiving the list of the at least one document at the mobile application on the mobile device. The policy-based printing method also includes selecting a listed document from the list using the mobile application. The policy-based printing method also includes retrieving the listed document from the at least one document stored on the public server. The policy-based printing method also includes printing the listed document at the printing device.

A policy-based printing method is disclosed. The policy-based printing method includes receiving a request to access a plurality of documents stored on a server. The request includes information about a user. The policy-based printing method also includes determining a first set of documents and a second set of documents from the plurality of documents. The first set of documents are identified according to a policy corresponding to the user as having at least one original document available to print at a printing device connected to the server. The second set of documents are identified according to the policy as having at least one alternate document available to print at the printing device. The at least one alternate document includes a modified parameter to be allowed to print according to the policy. The policy-based printing method also includes generating a list including the first set of documents and the second set of documents having at least one alternate document with the modified parameter. The policy-based printing method also includes sending the list of the first set of documents and the second set of documents to the printing device. The policy-based printing method also includes selected an alternate document from the second set of documents. The policy-based printing method also includes retrieving the alternate document from the server. The policy-based printing method also includes printing the alternate document with the modified parameter at the printing device.

A policy-based printing method is disclosed. The policy-based printing method includes receiving a request to access a plurality of documents stored on a server. The request includes information about a user. The policy-based printing method also includes determining a first set of documents and a second set of documents from the plurality of documents. The first set of documents are identified according to a policy corresponding to the user as having at least one original document available to print at a printing device connected to the server. The second set of documents are identified according to the policy as having at least one alternate document available to print at the printing device. The at least one alternate document includes a modified parameter to be allowed to print according to the policy. The policy-based printing method also includes generating a list including the first set of documents and the second set of documents having at least one alternate document with the modified parameter. The policy-based printing method also includes sending the list of the first set of documents and the second set of documents to a mobile application on a mobile device. The policy-based printing method also includes selecting an alternate document from the second set of documents using the mobile application. The policy-based printing method also includes retrieving the alternate document from the server. The policy-based printing method also includes printing the alternate document with the modified parameter at the printing device.

A policy-based printing method is disclosed. The policy-based printing method includes receiving a request at a server for a list of documents to print at a printing device in a public domain. The request pertains to a user. The policy-based printing method also includes applying a policy to a plurality of documents stored on the server in response to the request. The policy corresponds to the user. The policy-based printing method also includes determining a first set of documents according to the policy. The first set of documents includes original versions of documents within the plurality of documents. The policy-based printing method also includes determining a second set of documents according to the policy. The second set of documents include alternate versions of documents within the plurality of documents. The alternate versions of the documents have a modified parameter. The policy-based printing method also includes generating the list using the first set of documents and the second set of documents. The policy-based printing method also includes displaying the list to the user. The first set of documents and the second set of documents are indicated separately. The policy-based printing method also includes selecting an alternate document having the modified parameter from the second set of documents. The policy-based printing method also includes retrieving the alternate document from the server. The policy-based printing method also includes printing the alternate document with the modified parameter at the printing device.

BRIEF DESCRIPTION OF THE DRAWINGS

Various other features and attendant advantages of the present invention will be more fully appreciated when considered in conjunction with the accompanying drawings.

FIG. 4A illustrates a domain list for use within the policy-based printing system according to the disclosed embodiments.

DETAILED DESCRIPTION OF THE PREFERRED EMBODIMENTS

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims. Numerous specific details are set forth in order to provide a thorough understanding of the present invention.

The disclosed embodiments use an authentication server, a policy server, a file server, a network enabled printing device, and a public domain server. At the printing device, a user may provide authentication information, such as a username or password. The authentication information is transmitted from the device to a public domain server that processes the username for domain information. The domain information is matched to a domain on record and a private server is identified that can handle the domain authentication. The public domain server, through a direct connection to the private server, will go through a series of steps to obtain an authentication token, a policy applicable to the user, a job list of the user, and the job binary data for printing a print job on the printing device.

Figure 1:
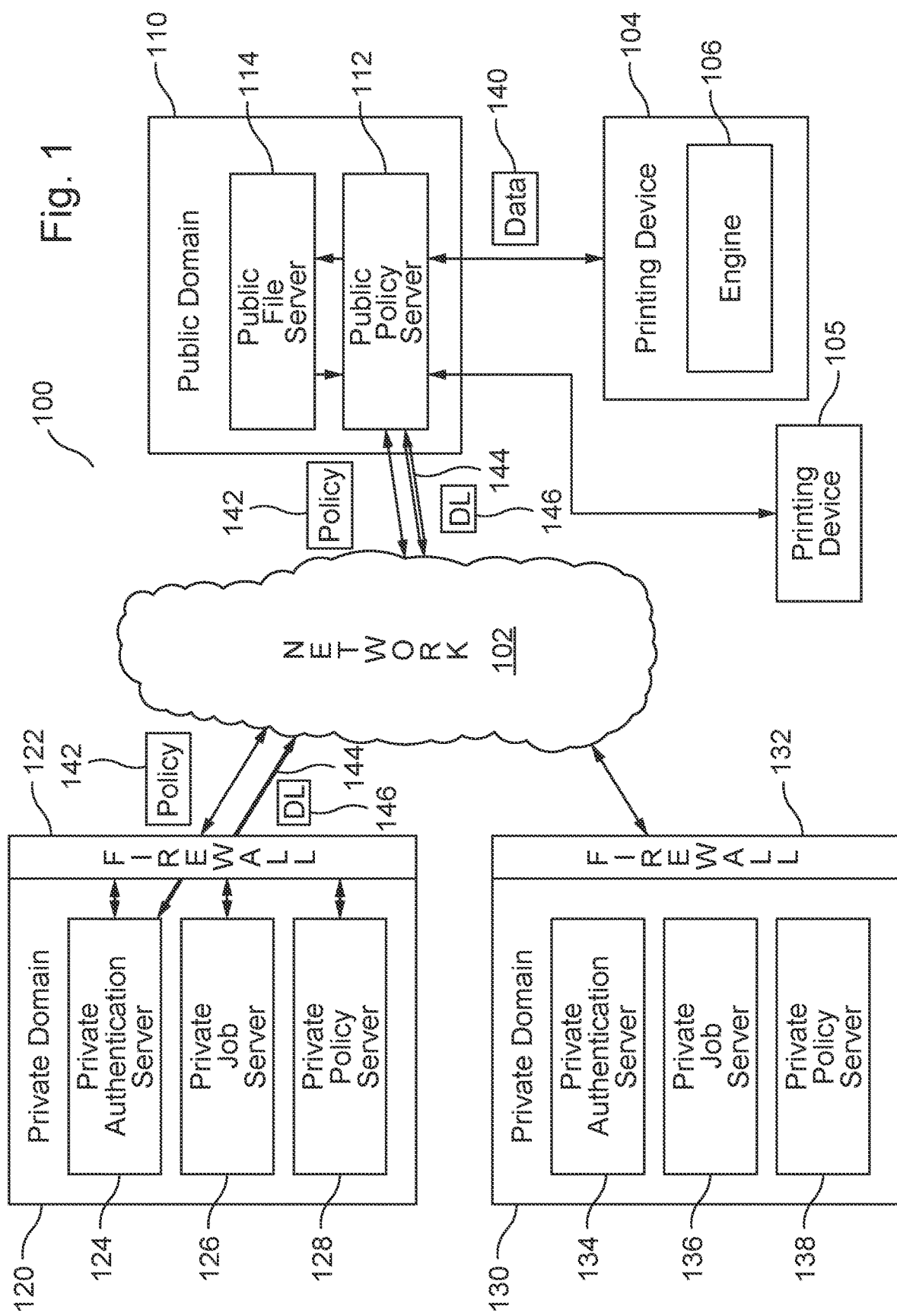
FIG. 1 depicts a system to implement policy-based printing on a printing device according to the disclosed embodiments.

FIG. 1 depicts a system 100 to implement policy-based printing on a printing device 104 according to the disclosed embodiments. System 100 includes network 102 which exchanges data between the public and private domains within system 100. System 100 allows a user to retrieve a print job having job binary data 140 from a private domain server to print on printing device 104. Printing device 104 may be any device that processes the binary data to generate an electronic document that is then printed or accessed by the user. Printing device 104 also may be known as an image forming apparatus or a multi-functional printer. For example, printing device 104 may print on a sheet of paper the document generated from binary data 140. Alternatively, printing device 104 may display the electronic document to the user. Printing device 104 also may store the binary data for the print job. Printing device includes engine 106, which performs many of the operations to print, scan, store, modify, and the like. Printing device 104 and engine 106 are disclosed in greater detail below with reference to FIG. 2.

System 100 include public domain 110 and private domains 120 and 130. Public domain 110 may represent a collection of public servers and devices linked to network 102. In some embodiments, these servers are cloud servers. Public domain 110 also may be known as a public network of the public servers. Public domain 110 is accessible by printing device 104. Additional printing devices may connect to public domain 110, such shown by printing device 105. The printing devices may be located in public places, such as convenience stores, libraries, printing and copying stores and kiosks, and the like. Users may access the printing devices and, in turn, the servers within public domain 110. The users may need to validate their ability to access public domain 110 through a connected printing device.

Public domain 110 includes public policy server 112. Public policy server 112 interacts with private domains 120 and 130 as well as printing devices 104 and 105. Public policy server 112 may act as the middle man between public domain 110 and the private domains. Public policy server 112 may generate and store tokens used to implement the policy-based operations disclosed below. It also may store and allow access to a policy 142 received from a private domain, upon request. Policy 142, disclosed in greater detail below, outlines what a user can and cannot do when printing to printing device 104 from a private domain.

Public file server 114 is connected to public policy server 112. Public file server 114 may store or host binary data 140 for print job from a private domain. Printing device 104 may retrieve binary data 140 securely for a print job. In some embodiments, printing device 104 does so through public policy server 112. Public file server 114 also may receive binary data 140 from a server in a private domain, as disclosed below.

System 100 includes private domains 120 and 140. System 100 may include additional private domains, not shown here. Each private domain may include a plurality of private servers that are protected by a firewall from access from network 102. For example, private domain 120 includes firewall 122. Firewall 122 may be a software or hardware device that filters data and information coming over network 102 to private domain 120 for malicious or unauthorized access. If an incoming packet of data is flagged by the filters in firewall 122, then it is not allowed through to private domain 120. Firewall 132 may serve the same function for private domain 130.

Private domain 120 includes private authentication server 124, private job server 126, and private policy server 128. Private domain 130 includes private authentication server 134, private job server 126, and private policy server 128. The servers for private domain 120 are disclosed below, but their functionality may apply to the servers in private domain 130. Further, additional servers may be in a private domain and used securely to exchange information over network 102.

Private authentication server 124 is a private domain server that will provide authentication and authorize a user to prove his/her identify. Private authentication server 124 may be the main server that connects the private and public domain information exchange. In some embodiments, private authentication server 124 establishes a protocol connection 144 with public policy server 112 to provide a domain list 146 for access to private domain 120. Private authentication server 124 also verifies a user trying to access private domain 120 using public policy server 112. Private job server 126 is a private domain server that stores all the binary data for the job files, or print jobs. When a user wants to print out a job file at printing device 104, private job server 126 should be queried in order to retrieve binary data 140 to generate the print job. Private job server 126 may forward binary data 140 to public file server 114 according to policy 142.

Private policy server 128 is a private domain server that hosts or stores all the policies, such as policy 142, related to a user. When printing device 104 attempts to perform any function, it should request private policy server 128 determine whether the user is allowed to do so. Private policy 128 may do the determination via public policy server 112.

The disclosed embodiments allow access to private servers from a public domain or to print on printing device 104 within a public network. An intranet application may do the authentication and job spooling so users need to authenticate printing device 104 before use. A policy may be associated with where a user can print, what kind of paper, number of pages, and the like. For example, some users may want to print from a public location, such as a convenience store, and want to access a private server that stores the print jobs. They would need access from network 102.

In some embodiments, public policy server 112 is a cloud server. Public policy server 112 may not be able to do accounting policy management to determine whether a user is allowed to print at printing device 104. Private domains 120 and 130 can operate over the cloud. Public policy server 112 may enforce the rules of the policy but management of the policy is still at a private server. Public policy server 112 also needs to distinguish between the private servers and private domains. Thus, if a user is outside the private network for a private domain, public policy server 112 will find the correct private domain to connect. That private domain will validate the user and access or use of the print job.

Figure 2:
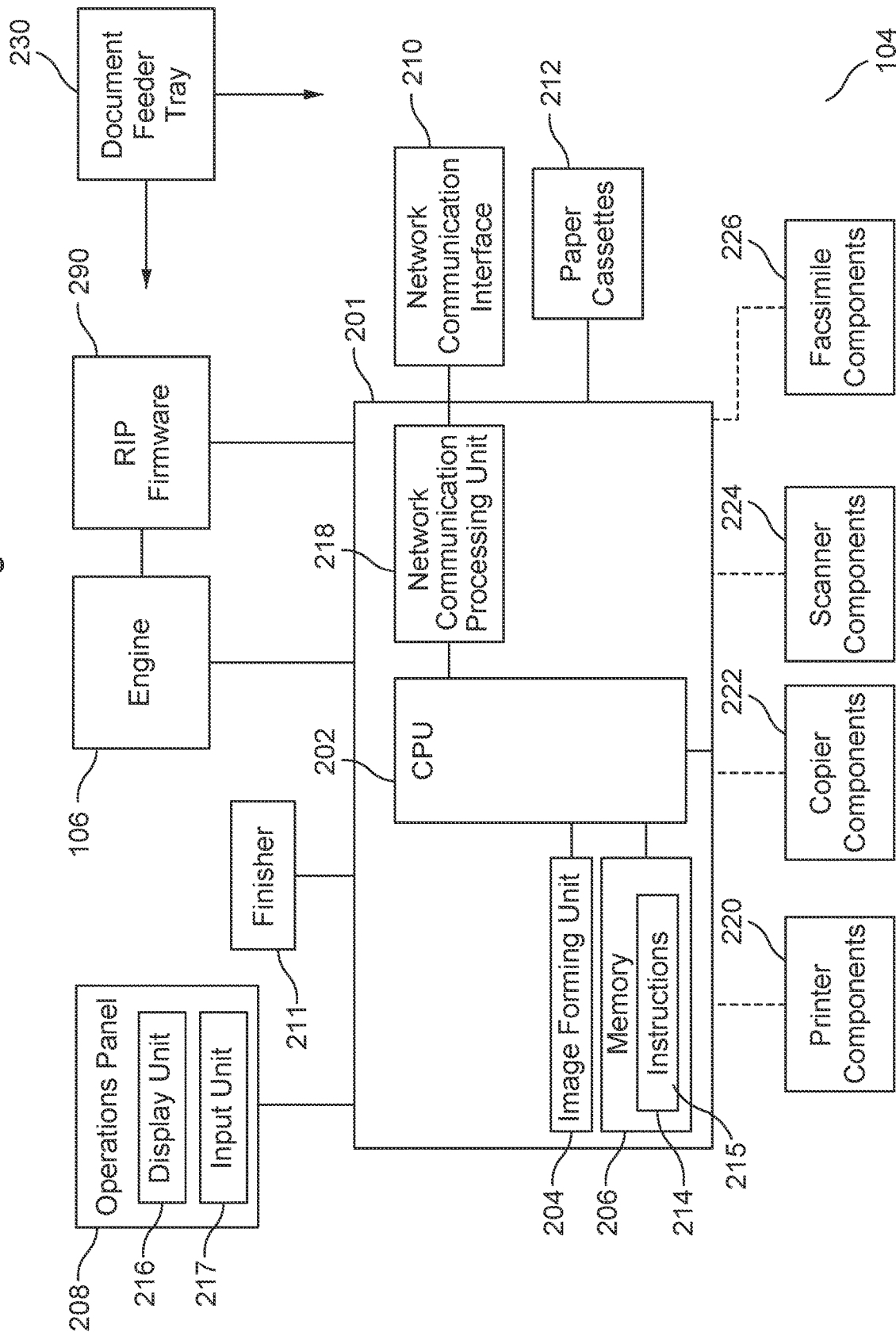
FIG. 2 illustrates a block diagram of components of the printing device used in conjunction with the authentication system according to the disclosed embodiments.

FIG. 2 illustrates a block diagram of components of printing device 104 used in conjunction with system 100 according to the disclosed embodiments. The architecture shown in FIG. 2 may apply to any multi-functional printer or image forming apparatus that scans documents to perform other functions, such as printing, storing, copying, and the like. As disclosed above, printing device 104 may send and receive data from public domain 110 and private domains 120 and 130.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like. Paper cassettes 212 supply paper to image the various components 220, 222, 224, and 226 to create the image formed surfaces on the papers. Paper cassettes 212 may include papers having various sizes, colors, composition, and the like. Paper cassettes 212 may be removed to refill as needed.

Document processor input feeder tray 230 may be the physical components of printing device 104 to receive papers and documents to be processed. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 220. As shown in FIG. 2, document processor input feeder tray 230 may interact with engine firmware 106 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the authentication operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter an identification code 138 generated by mobile application 110 into printing device 104.

Printing device 104 also includes network communication processing unit 218. Network communication processing unit 218 may establish a network communication, such as a wireless or wired connection with one or more other image forming apparatuses and a server in an image forming system. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes engine 106. Engine 106 may be a combination of hardware, firmware, or software components that act accordingly to accomplish a task. For example, engine 106 is comprised of the components and software to print a document. It may receive instructions from computing platform 201 after user input via operations panel 208. Alternatively, engine 106 may receive instructions from other attached or linked devices.

Engine 106 manages and operates the low-level mechanism of the printing device engine, such as hardware components that actuate placement of toner onto paper. Engine 106 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 106 for actual rendering of an image and application of the toner onto paper during operations on printing device 104.

Figure 3:
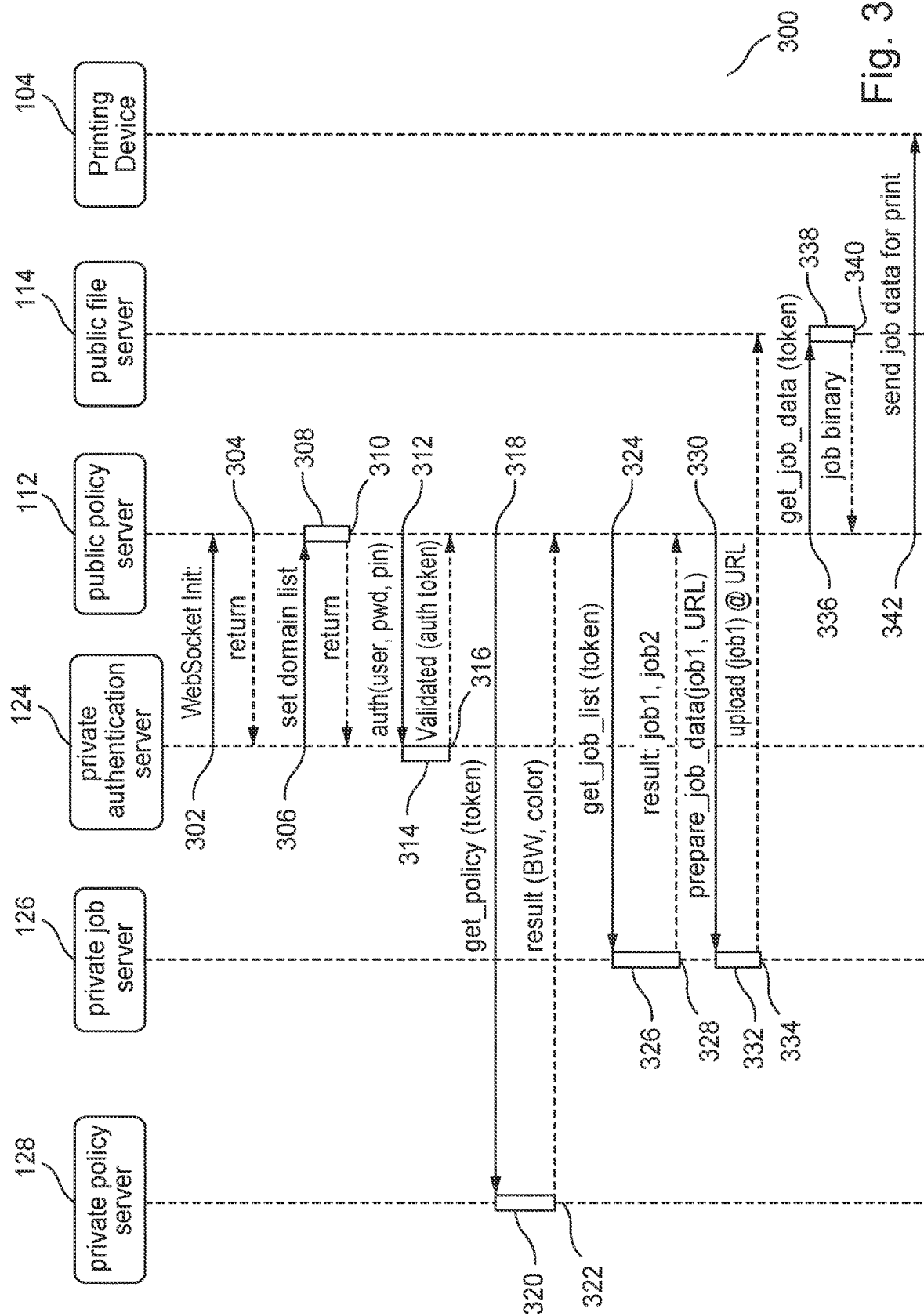
FIG. 3 illustrates a flow diagram for implementing a policy-based printing system according to the disclosed embodiments.

FIG. 3 depicts a flow diagram 300 for implementing policy-based printing system 100 according to the disclosed embodiments. In disclosing the embodiments shown by flow diagram 300, reference may be made to elements shown in FIGS. 1-2 and 4A, 4B, and 5. Flow diagram 300 shows the operations between the various servers disclosed in FIG. 1 above. Flow diagram 300 also depicts the actions taken at the various servers. The private and public servers may perform additional operations and actions not shown herein. The operations may be executed over network 102. Further, flow diagram 300 shows the operations between public domain 110 and private domain 120. Thus, firewall 122 may exist between the public servers and the private servers. The same operations may be executed between public domain 110 and private domain 130.

The processes disclosed by flow diagram 300 seek to solve the problem of how to authenticate a user in one location, such as a convenience store with printing services, that he/she is within an organization that has a policy applicable to the user. Further, the policy is stored in a private domain not readily accessible from the printing device at the convenience store. The printing device is connected to a public network and may be part of a public domain, such as public domain 110. The disclosed embodiments enable the user and the organization to implement the policy, which is applicable to the private domain, within the public domain of the printing device located in the convenience store.

Operation 302 executes by private authentication server 124 sending an initialization request to public policy server 112. As disclosed above, private authentication server 124 is within private domain 120 and public policy server 112 is within public domain 110. To send the initialization request, an administrator enter information about public policy server 112. Such information may include server network address, location, server capabilities, and the like. Once the information is entered, private authentication server 124 generates a verification token 502 which verifies that public policy server 112 is acceptable to receive information and communicate with the private authentication server.

Operation 304 executes by returning acceptance of the initialization request and establishing a protocol connection 144 between private authentication server 124 and public policy server 112. Protocol connection 144 may stay established as long as public policy server has verification token 502. Verification token 502 may be stored on public policy server 112 and presented whenever verification is required by private authentication server 124. Protocol connection 144 provides a persistent connection between private authentication server 124 and public policy server 112 that allows the servers to send data at any time. Protocol connection 144 preferably may be known as a WebSocket connection, which provides a full-duplex communication channel over a single connection. Preferably, protocol connection 144 uses a secure protocol.

Operation 306 executes by providing a domain list 400 from private authentication server 124 to public policy server 112. This operation also may include providing the information about the private authentication server. Action 308 executes by setting domain list 400 at public policy server 112 to include domain information for private authentication server 124. Public policy server 112 may refer to domain list 400 whenever a user attempts to print from a private domain. Public policy server 112 may use information provided by the user to determine which domain to obtain policy 142. For example, public policy server 112 may be connected to more than one private domain. Domain list 400 determines which private domain applies to a user trying to print.

FIG. 4A depicts an example domain list according to the disclosed embodiments. Domain list 400 may be a file having fields for the private domains and the email domains associated with each domain. A user is identified as part of a domain using his/her email address. Public policy server 112 will compare the email provided by the user to determine which private domain to access. As shown in FIG. 4A, private domain 120 may be associated with two email domains 402 and 404. A user having an email domain with "@example1.com" or "@example2.com" will have its policy and associated documents located on private domain 120. A user having an email domain 406 with "@company.com" will have its policy and associated documents located on private domain 130. Additional private domains may be served by public policy server 112. Private domain N will receive requests for policies of users having email domain 408 of "@firm.com" and private domain N+1 will receive requests for policies of users having email domain 410 of "@college.com."

As can be seen, companies, firms, and colleges have an interest in keeping their network domains private. Further, these entities may wish to limit use of printing devices within public domains according to a policy. Domain list 400 also may include an entry for a public domain, such as public domain X. In some instances, a public domain also may include policies to limit capabilities of a user on a printing device 104. These policies, however, may not be within a private domain and available for retrieving through a public network connection. An email domain of "@website.com" may direct public policy server 112 to a public domain for the associated policy 142. Referring back to FIG. 3, operation 310 returns an acknowledgement to private authentication server 124 that domain list 400 has been set and protocol connection 144 exists with public policy server 112.

Operation 312 executes when a user wants to print a document at printing device 104 coupled to public policy server 112. Authentication information 504 is provided from public policy server 112 to private authentication server 124. In some embodiments, the user enters a username and password that is captured by public policy server 112. For example, the user may enter this information at printing device 104 which forwards it to public policy server 112. Alternatively, the user may connect to public policy server 112 through an application on a mobile device or the like to provide authentication information 504.

In other embodiments, the user may enter a code, such as a personal identification number (PIN), that retrieves this information to provide it to public policy server 112. Public policy server 112 receives the code and matches the user information when the code is provided. Other embodiments may use a graphical code or identification card having a number that provides this information. Operation 312 sends this authentication information 504, such as username, password and PIN, to private authentication server 124.

Action 314 executes by authenticating the user with authentication information 504. Thus, user information is not stored on public policy server 112. Authentication still occurs in private domain 120 behind firewall 122. If the user is authenticated, then action 314 also includes private authentication server 124 generating authentication token 506. Operation 316 executes by indicating that the user has been validated and providing authentication token 506 to public policy server 112. Public policy server 112 may assign authentication token 506 to the user. Using the PIN example, the entered PIN may be associated with authentication token 506.

Private authentication server 124 also may provide an email address or the email domain, such as email domains 402-412 shown in FIG. 4A, to public policy server 112 if this information is not already available. For example, it may be too cumbersome to enter email addresses at printing device 104. Further, the administrators of private domain 120 may not want valid email addresses being entered at printing device 104 on a public network or in a public place. Thus, no email address is provided to public policy server 112 from within public domain 110 but, instead, from private domain 120. Moreover, private authentication server 124 may provide only the domain and not the actual email address.

Once validated, public policy server 112 now retrieves a policy 142 from private policy server 128. Operation 318 executes by getting policy 142. The email domain is compared against domain list 400 to determine which private domain to query for the policy. In this example, user@example1.com is the email provided to public policy server 112. It compares the email to domain list 400 to determine the applicable policy is within private domain 120. Public policy server 112 sends determined domain 508, such as example1.com, along with authentication token 506 to private policy server 128 in operation 318. If the next user has an email domain of @company.com, then public policy server 112 determines that domain 508 is company.com and that the applicable policy is located in private domain 130.

Figure 4B:
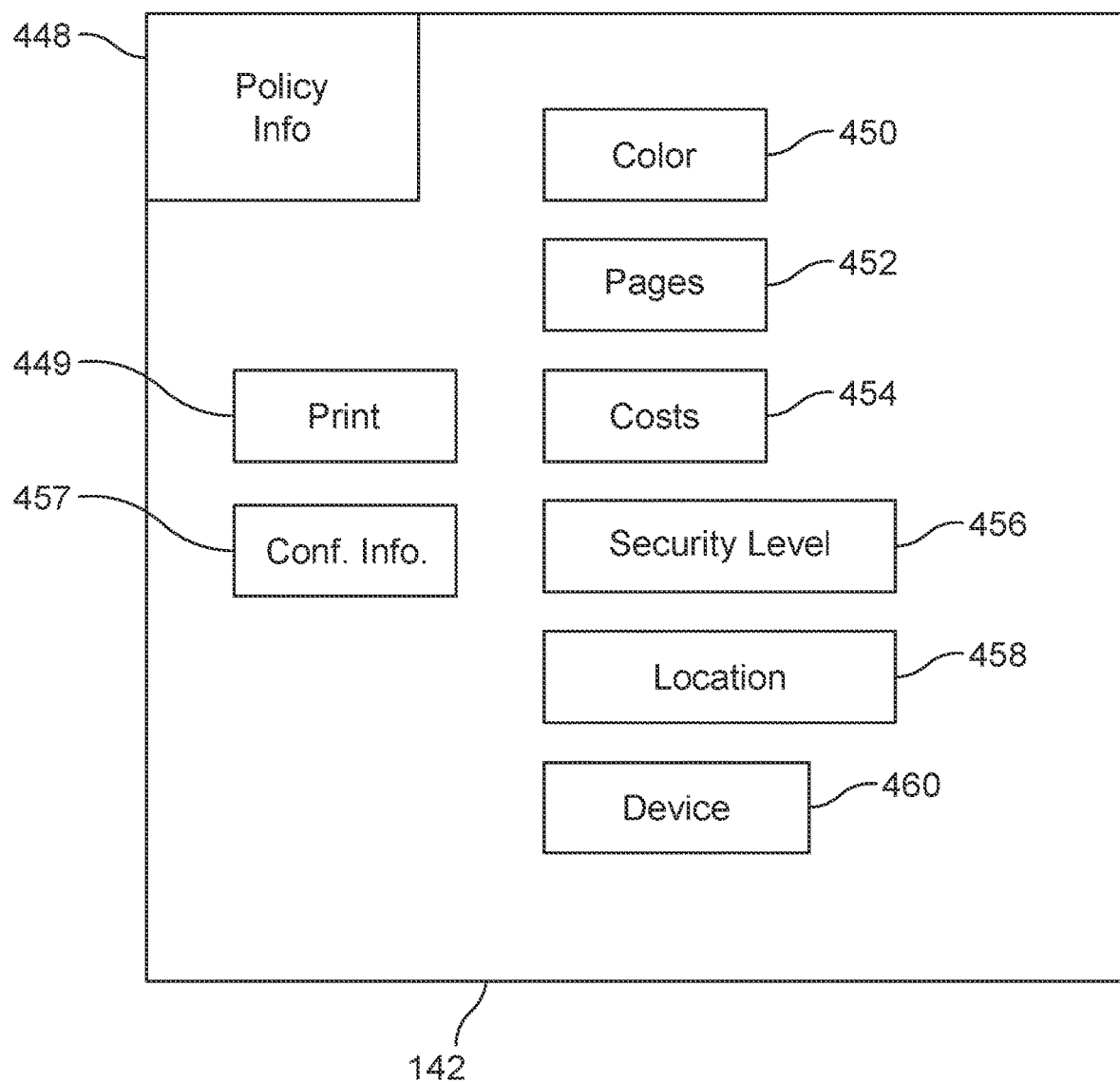
FIG. 4B illustrates a policy for use within the policy-based printing system according to the disclosed embodiments.
Figure 5:
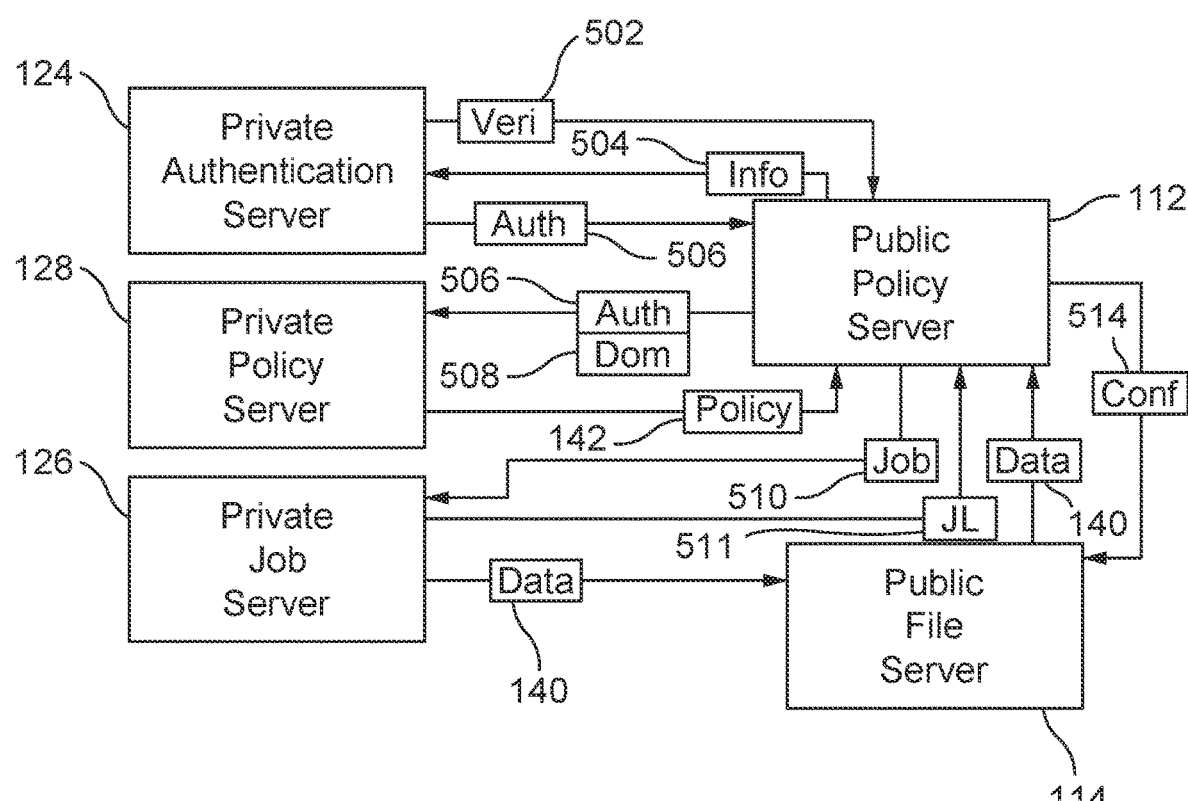
FIG. 5 illustrates a block diagram of servers and data used within the policy-based printing system according to the disclosed embodiments.

Action 320 executes by identifying policy 142 as being applicable to the user based on domain 508. Authentication token 506 may be associated with the user and this information provided from private authentication server 124. Policy 142 may be a file having flags or other information to indicate what the user can do within a public network. For example, limitations may be set as to what type of printing can be done, the number of pages may be printed, and the like. FIG. 4B depicts a block diagram of an example policy for policy 142 according to the disclosed embodiments.

Policy 142 may include policy information 448. Policy information 448 may include a title of the policy, document information, and private domain information. Policy 142 includes data, such as flags, that indicates what can and cannot be performed in public domain 110. This data may be known as parameters in policy 142. Examples of parameters that limit printing operations are shown in FIG. 4B. Print parameter 449 may be set to indicate whether a user can even print outside private domain 120. Certain users may not be allowed to print in a public domain. Print parameter 449 may be set to limit these users to scanning documents only or other operations that do not allow access to any documents or information stored in private domain 120.

Color parameter 450 may indicate whether the user can do color printing in public domain 110. If no, then the user may be limited to only black and write printing. The user may be allowed to do color printing at printing devices in private domain 120 but not allowed to do so in a public domain setting.

Pages parameter 452 may set a limit on the number of pages that a user can print. The administrators of private domain 120 do not want unlimited printing to occur outside the private domain. Pages parameter 452 may limit the number of pages printed per day, week, month, hour, year, and the like. Alternatively, pages parameter 452 may cap the number of pages printed to have the user check with the administrators of public domain 120 to reset this parameter. Once the user hits a limit, he/she requests that the number of pages printed be reset to allow further operations. Costs parameter 454 may be similar to pages parameter 452 except to limit the amount of fees that the user may incur before printing is stopped. Costs parameter 454 helps prevent the user from running up large bills at a convenience store. It also may cap the amount of costs incurred on a periodic basis or as a total cost.

Security level parameter 456 may indicate that the user can only access documents from a job list provided from private job server 126 having a certain security or access level. Security level parameter 456 may help prevent accidental or intentional printing of sensitive documents at printing device 104. Further, the user may have access to sensitive documents when printing within private domain 120 but not so when printing using public domain 110. Policy 142 may limit exposure to such documents.

Location parameter 458 may indicate whether the user can print at certain locations. Policy 142 may place geographic or other limitations on where the user can print using a public domain. Location parameter 458 also may indicate the type of locations to allow printing operations. For example, the administrators of private domain 120 may not allow printing in a convenience store but may allow printing in a library. Device parameter 460 may act similar to location parameter 458 except limit printing on certain devices. For example, policy 142 may not allow printing on a printing device 104 that does not have legal sized paper capability or stores the data from the job file in a memory on the device. Device parameter 460 also may limit printing operations to known printing devices having a serial number or IP address.

Operation 322 executes by providing policy 142 to public policy server 112. Public policy server 112 may configure policy 142 to determine whether the user can print using public domain 110 and what limits on the printing operations may be enforced. Policy 142 may apply to all users of private domain 120. Alternatively, policy 142 may treat users differently. Some users may have unlimited printing privileges according to parameters 452 or 454 while others are prevented from exceeding a cap set forth by these parameters. Public policy server 112 configures the determinations using policy 142 accordingly.

Using the parameters within policy 142, operation 324 executes by getting a job list from private job server 126. Public policy server 112 may generate a job token 510. Job token 510 is presented to private job server 126 to obtain a job list 511 of print jobs available to the user. In some embodiments, job token 510 may include data that specifies what print jobs can be added to job list 511 based on the parameters set forth in policy 146. Job list 511 includes those print jobs that meet the specifications of policy 146. For example, color print jobs will not be included in job list 511 of policy 146 does not allow color printing for the user in a public domain. Action 326 executes by generating job list 511 in response to job token 510. Operation 322 executes by sending the print jobs in job list 511 to public policy server 112 from private job server 126.

The user then may select a print job from job list 511. The user may select from an interface provided on printing device 104 that is then communicated to public policy server 112. Alternatively, an application may execute on a device of the user that presents the job list and allows for selection from the list. The selection is sent to public policy server 112. Operation 330 executes by sending a command to private job server 126 to prepare a selected print job along with a uniform resource locator (URL) address from public policy server 112. The URL address is one associate with public policy server 112 and accessible from public domain 110.

Action 332 executes by retrieving and preparing the data for the print job. Preferably, the data is binary data that represents the document for the print job. This may be shown as binary data 140 in FIGS. 1 and 5. Action 332 also may convert the data into a format compatible with printing device 104. For example, the document may include data that calls for printing on a legal sized paper while printing device 104 only prints using letter sized paper. The data sent from private job server 126 may be modified to fit onto a letter sized paper.

Operation 334 executes by uploading binary data 140 to the URL address provided in operation 330. Thus, private job server 126 puts the data for the print job outside private domain 120 for the first time at this point. The URL address may be valid for only a specified period of time, such as two hours, one day, a week, and the like. After that point, the URL address may expire. The URL address to download binary data 140 for the print job is provided to public file server 114.

Public policy server 112 now retrieves binary data 140 and sends the data to printing device 104. Before that occurs, however, the disclosed embodiments may confirm whether the user has enough funds to pay for processing and completing the print job. Operation 336 executes by generating a confirmation token 514 at public policy server 112 once it is confirmed that the user or user's account has enough money to cover expenses to print. Public policy server 112 may compare the funds available to the cost to complete the print job. If there are enough funds, then confirmation token 514 is generated and sent to public file server 114. If not, then the user may be alerted to add more funds to his/her account.

Action 338 executes by obtaining uploaded binary data 140 from the URL address. Public file server 114 may send a call to the URL address which then sends binary data 140 to the public file server. Public file server 114 may store binary data 140 until confirmation token 514 is received. If a confirmation token 514 is not received within a specified time frame, then binary data 140 may be deleted from public file server 114. This feature prevents print jobs from private domain 120 from being stored indefinitely in public domain 110. Other factors may be used to determine when to delete any stored files of binary data.

Operation 340 executes by sending binary data 140 for the print job from public file server 114 to public policy server 112. Operation 342 executes by sending binary data 140 from public policy server 112 to printing device 104. Printing device 104 may process the print job accordingly. The user's account for printing on public domain 110 may be charged accordingly as well. In some embodiments, public file server 114 may send binary data 140 to printing device 104.

The disclosed embodiments allow a private domain, or network, to print to a public domain using a policy applicable to the public domain. Internal policies to the private domain are not material to printing in the public domain. Further, job data is kept private as long as possible. The data for the print job is provided to the public domain when requested by the user and approved according to the policy. This feature allows the user to print anywhere. The print job is not automatically sent outside the private domain or from the private servers until printing actually occurs. The disclosed embodiments provide greater flexibility for companies and users to access documents in a secure, private location and use devices and resources in a public setting.

Figure 6:
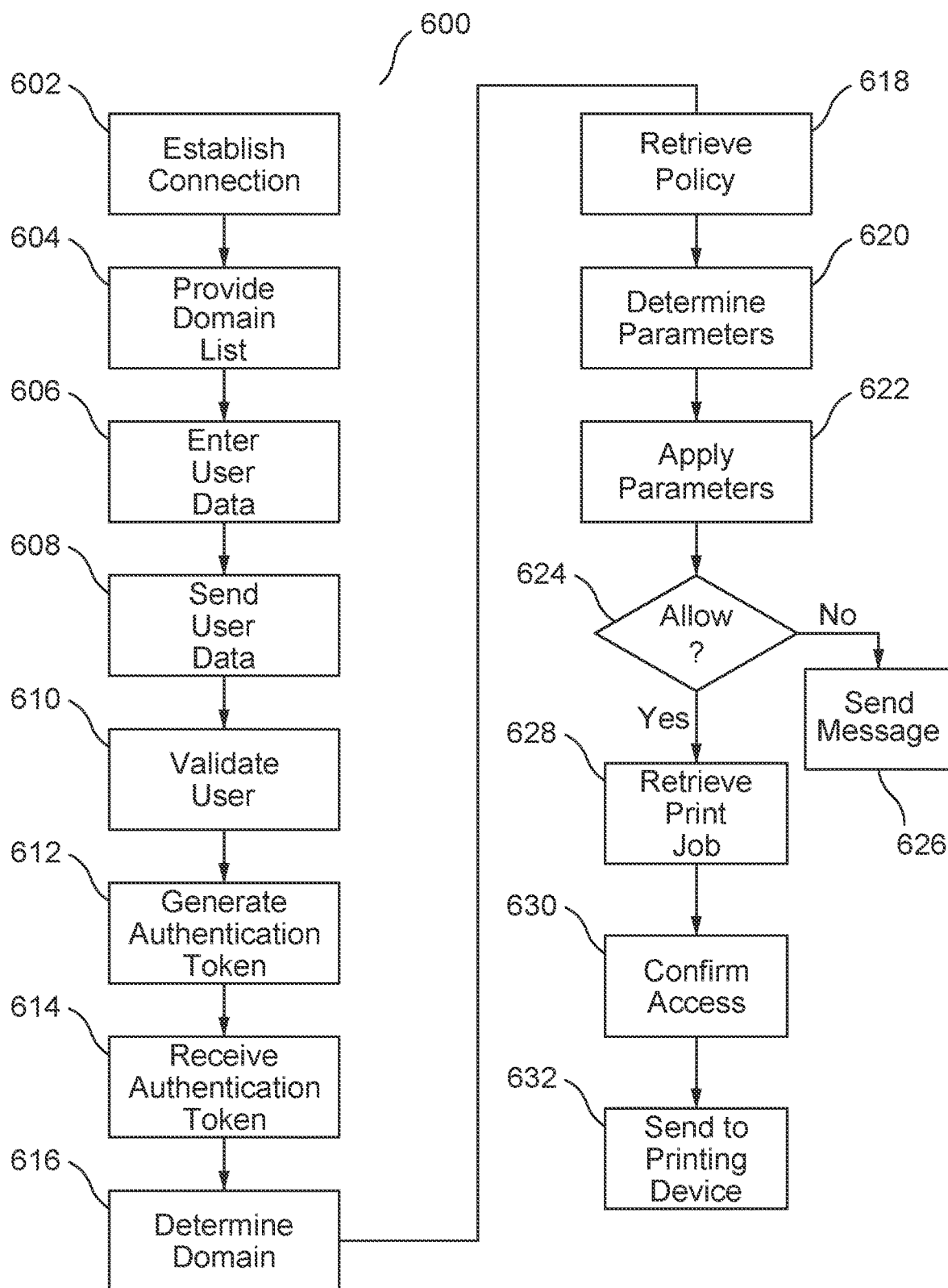
FIG. 6 illustrates a flowchart for printing at a printing device within the policy-based printing system according to the disclosed embodiments.

FIG. 6 illustrates a flowchart 600 for printing at printing device 104 within policy-based printing system 100 according to the disclosed embodiments. Flowchart 600 may refer back to elements disclosed in FIGS. 1-5 for illustrative purposes. The embodiments disclosed by flowchart 600, however, are not limited to the features disclosed in FIGS. 1-5. Further, flowchart 600 may compliment the embodiments disclosed by flow diagram 300.

Step 602 executes by establishing a protocol connection 144 between private authentication server 124 and public policy server 112. The protocol connection allows communication between the servers, one in private domain 120 and another one in public domain 110. Step 604 executes by providing a domain list 146 from private authentication server 124 to public policy server 112. Domain list 146 may include applicable private domains and associated email domains that are accessible by public policy server 112. Step 606 executes by entering user data 504 within public network 110 and providing the data to public policy server 112. Step 608 executes by sending user data 504 to private authentication server 124.

Step 610 executes by validating the user at private authentication server 124. Private authentication server 124 checks the provided user data 504 against its stored authentication records for the user. If the user is validated, then step 612 executes by generating authentication token 506. Step 614 executes by receiving authentication token 506 at public policy server 112. Step 616 executes by determining the applicable private domain for the user according to domain list 146. Preferably, public policy server 112 uses the email address for the user to determine which private domain to access for the policy for the user.

Step 618 executes by retrieving policy 142 from private policy server 128 based on the receipt of authentication token 506 and domain 508 from public policy server 112. Private policy server 128 is identified according to the applicable domain 508 and queried by public policy server 112. Once verified, private policy server 128 sends policy 142 to public policy server 112.

Step 620 executes by determining the parameters for policy 142. This process is disclosed above. As shown in FIG. 4B, policy 142 may include parameters that outline what printing options are available to the user. Step 622 executes by applying the parameters to configure public policy server 112 to determine what print jobs or operations are available to the user in public domain 110.

Step 624 executes by determining whether the user is allowed to access printing device 104 using public domain 110 according to the policy. Further, step 624 determines what print jobs are available to the user according to policy 142. The determination also may include reviewing policy 142 for allowing other operations on printing device 104 such as scanning, editing, faxing, and the like. If no, then step 626 executes by sending a message to the user or public policy server 112 that the operation on printing device 104 is not allowed.

If step 624 is yes, then step 628 executes by retrieving the print job from private job server 126. A job list 511 may be provided. The print job is selected from job list 511. Job token 510 is generated by public policy server 112. Public policy server 112 sends job token 510 to private job server 126 to obtain job list 511. Upon selection of the print job, private job server 126 uploads binary data 140 for the print job to a location accessible by public file server 114. Step 630 executes by confirming access to binary data 140 for the print job by checking to see if the user has enough money to pay for using printing device 104. Other restrictions also may be checked, such as time of day, location, and the like, to confirm whether the print job should be released to printing device 104.

Step 632 executes by sending binary data 140 to printing device 104 upon confirmation in step 630. Public policy server 112 generates a confirmation token 514 to confirm that the user is allowed to print. Public policy server 112 may send confirmation token 514 to public file server 114. Upon receipt of the confirmation token, public file server 114 may forward binary data 140 for the print job to public policy server 112, which provides the data file to printing device 104.

Figure 7:
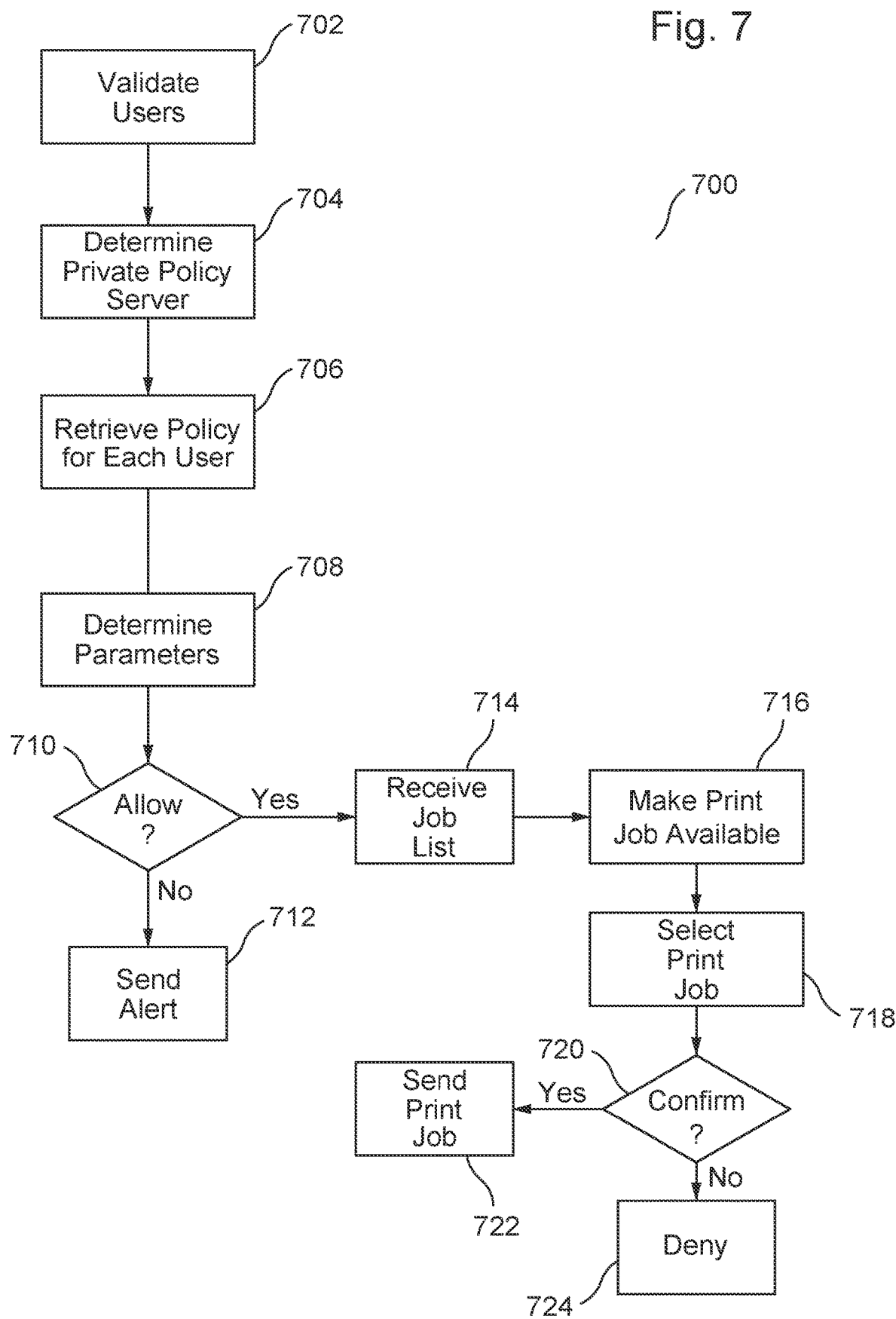
FIG. 7 illustrates a flowchart for implementing a policy-based printing system in a public domain according to the disclosed embodiments.

FIG. 7 illustrates a flowchart 700 for implementing a policy-based printing system 100 in a public domain 110 according to the disclosed embodiments. Flowchart 700 may refer back to elements disclosed in FIGS. 1-5 for illustrative purposes. The embodiments disclosed by flowchart 700, however, are not limited to the features disclosed in FIGS. 1-5. Further, flowchart 700 may compliment the embodiments disclosed by flow diagram 300.

As disclosed above, public policy server 112 may interact with a plurality of private domains. Public policy server 112 may retrieve and implement more than one policy for printing or processing print jobs in public domain 110. In some embodiments, public policy server 112 may implement policies for a plurality of public domains as well. Further, a plurality of printing devices may be connected to public policy server 112. Flowchart 700 discloses some embodiments that have public policy server 112 interacting with more than one private domain.

Step 702 executes by validating users within public domain 110 at private authentication server 124. As disclosed above, a protocol connection may be established between public policy server 112 and private authentication server 124 to exchange user information to perform the validation.

Step 704 executes by determining a private policy server for each user according to a domain for the user at public policy server 112. The domains for each user are private domains. Preferably, the email domain for each user indicates the applicable private domain for that user. With two or more users, different email domains may indicate more than one private domain. Step 706 executes by retrieving a policy 142 for each user according to the respective domain from private policy server 128.

Step 708 executes by determining the parameters for each policy 142. All of the policies are received at public policy server 112. Public policy server 112 configures the treatment of printing requests for each private domain according to the corresponding policy. The policy sets forth the parameters for printing from the private domain via the public domain.

For example, the parameters for one policy may only allow 100 pages to be printed per user a month from private domain 120 while the parameters for another policy may only allow 20 pages to be printed per user from private domain 130. Public policy server 112 is configured accordingly.

Step 710 executes by determining whether the user is allowed to print according to the applicable policy. If no, then step 712 executes by sending an alert to public policy server 112 or to the user. No printing operations using public domain 110 are allowed. If yes, then step 714 executes by receiving a job list according to the applicable policy from private job server 126. Step 716 executes by making the print jobs in the job list available to the user. Step 718 executes by selecting a print job from the job list. Binary data 140 for the selected print job is retrieved from private job server 126 and made available to public file server 114.

Step 720 executes by confirming whether the print job may be sent to printing device 104. Public policy server 112 confirms that the user has enough funds or credits to perform the request task on printing device 104. If yes, then step 722 executes by sending the print job as binary data 140 to printing device 104. If no, then step 724 executes by denying the print job. The user may be prompted to provide additional funds or credits to perform the requested task.

Figure 8:
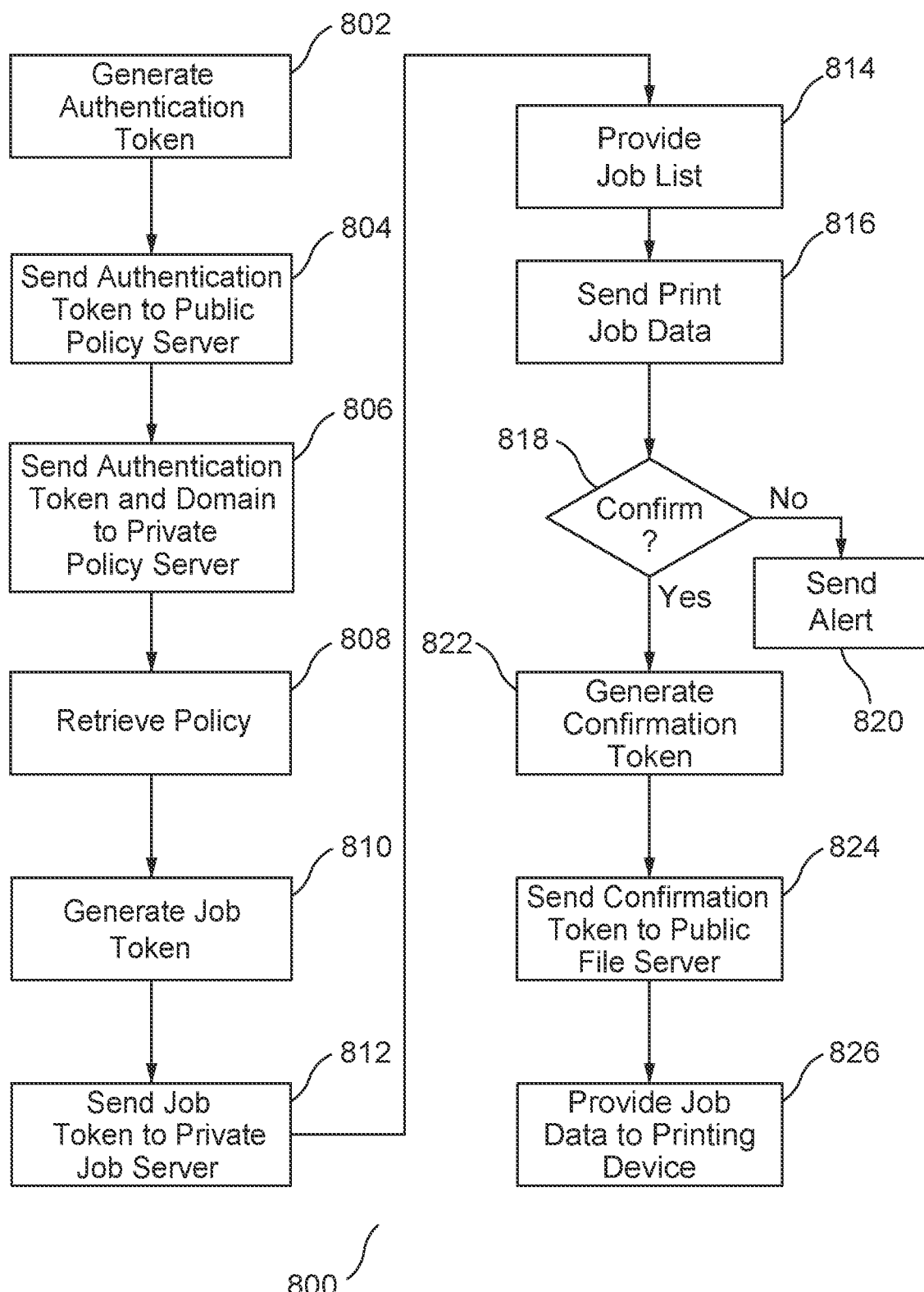
FIG. 8 illustrates a flowchart for implementing a policy-based printing system using tokens according to the disclosed embodiments.

FIG. 8 depicts a flowchart 800 for implementing a policy-based printing system 100 using tokens according to the disclosed embodiments. Flowchart 800 may refer back to elements disclosed in FIGS. 1-5 for illustrative purposes. The embodiments disclosed by flowchart 800, however, are not limited to the features disclosed in FIGS. 1-5. Further, flowchart 800 may compliment the embodiments disclosed by flow diagram 300.

Step 802 executes by generating authentication token 506 at private authentication server 124. This step occurs once private authentication server 124 validates a user attempting to print using public domain 110. Public policy server 112 sends user information 504 including an email address, username, password, or PIN to private authentication server 124. Private authentication server 124, being in private domain 120, may securely store this information for the user. The secure user information is not made available in public domain 110. Authentication token 506 indicates that the user may access private domain 120. Step 804 executes by sending authentication token 506 to public policy server 112.

Step 806 executes by sending authentication token 506 and domain 508 to private policy server 128. Public policy server 112 sends authentication token 506 and domain 508 after the domain is determined using domain list 146. An email address may indicate an email domain that is used as domain 508. Domain 508 indicates which private domain to access for the applicable policy. For example, referring to FIG. 4A, an email of user@example1.com will indicate private domain 120. Public policy server 112 attaches authentication token 506 to domain 508 and sends the request for the policy for the user.

Step 808 executes by retrieving policy 142 from private policy server 128. Authentication token 506 confirms that the user corresponds to the policy. Authentication token 506 may include data provided by private authentication server 124 that identifies the user as able to use private domain 120 and, therefore, policy 142 for the private domain should be used in printing on public domain 110. Private policy server 128 sends policy 142 to public policy server 112. Public policy server 112 then configures itself to apply the parameters of the policy to using public domain for the user.

Step 810 executes by generating job token 510 at public policy server 112 after applying the parameters of policy 142. The parameters may detail what the user can do using public domain 110. These parameters may not necessarily correspond to what the user can do using private domain 120. Limitations are placed on the user on how he/she can use printing device 104. Job token 510 may reflect the parameters to compile the job list of print jobs available to the user according to policy 142.

Step 812 executes by sending job token 510 to private job server 126. Private job server 126 may store the print jobs available to the user or to users in private domain 120. In some embodiments, a plurality of print jobs may be available such that a job list 511 is generated based on the parameters for the user in using public domain 110. Job token 510 may be used in generating job list 511 in that it includes information to select the appropriate print jobs to include in the print job list.

Step 814 executes by providing print job list 511 to public policy server 112. The user may select a print job from print job list 511. Alternatively, the desired print job may already be selected such that public policy server 112 receives data for the selection, such as from an application on a mobile device, that corresponds to the print job in job list 511. Public policy server 112 then requests the print job data from private job server 126. Step 816 executes by sending job binary data 140 for the selected print job from private job server 126 to public file server 114.

Step 818 executes by confirming whether the user may print or process the print job at printing device 104. For example, public policy server 112 may confirm that the user has enough funds in an account to pay for printing on printing device 104. If step 818 is no, then step 820 executes by sending an alert to the user or to public policy server 112 that printing operations are to be stopped until the condition is met. Using the above example, the user may be asked to provide additional funds to his/her account to print the document.

If step 818 is yes, then step 822 executes by generating confirmation token 514 by public policy server 112. Confirmation token 514 indicates that the processing of binary data 140 at printing device 104 may proceed. Step 824 executes by sending confirmation token 514 to public file server 114 to obtain binary data 140, which is stored thereon. Public file server 114 may send binary data 140 to public policy server 112 upon receipt of confirmation token 514.

Step 826 executes by providing binary data 140 to printing device 104. Public policy server 112 may send binary data 140 once a connection is established with printing device 104. Public policy server 112 may have to wait until printing device 104 is available before forwarding binary data 140. Thus, the data from private job server 126 is not made available on printing device 104 until the operations are ready to commence. Although the current embodiments discuss printing on printing device 104, other operations also may occur, such as scanning, editing, faxing, and the like.

Figure 9:
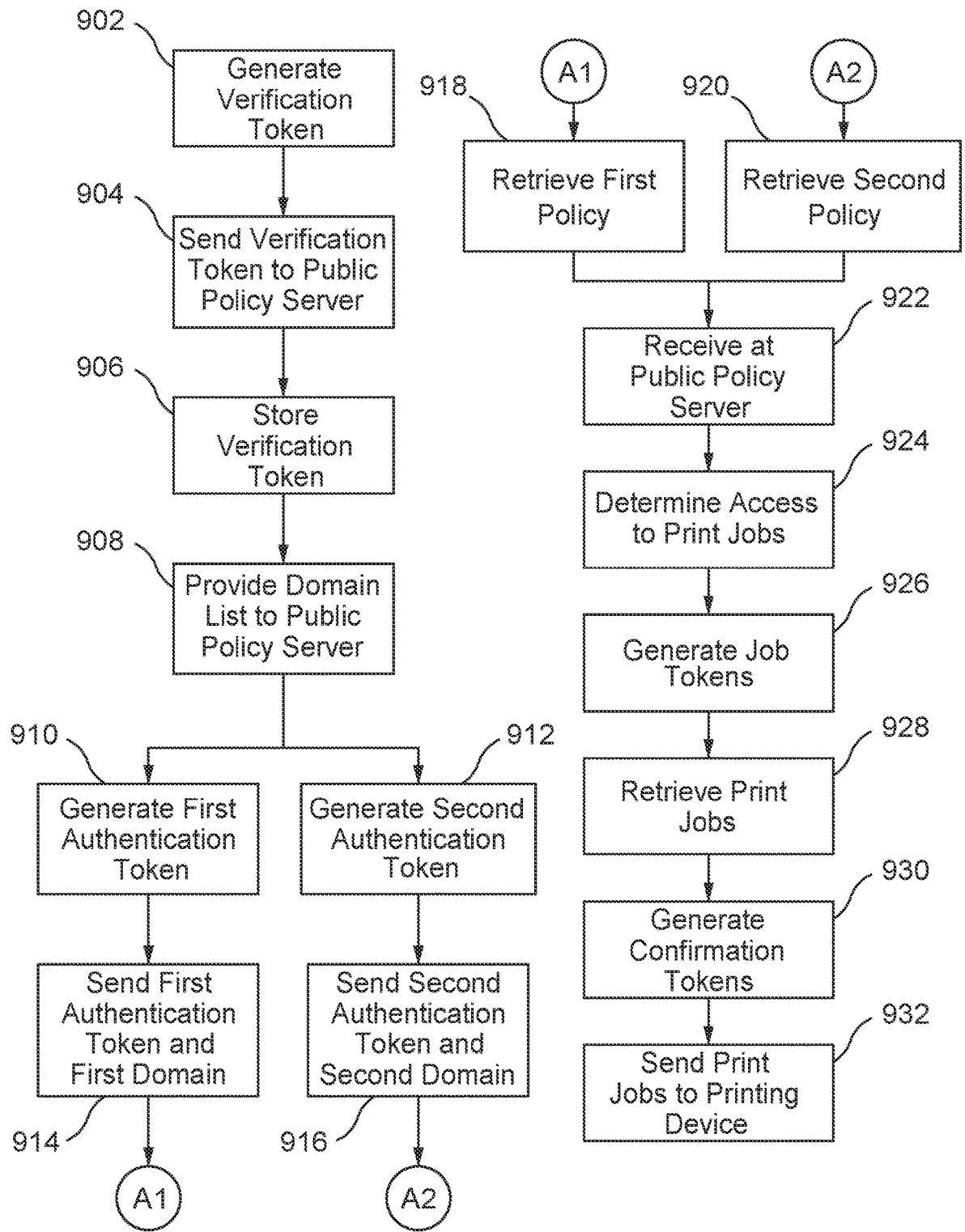
FIG. 9 illustrates a flowchart for selecting a plurality of print jobs from a plurality of private domains for printing in a public domain according to the disclosed embodiments.

FIG. 9 depicts a flowchart 900 for selecting a plurality of print jobs from a plurality of private domains 120 and 130 for printing in public domain 110 according to the disclosed embodiments. Flowchart 900 may refer back to elements disclosed in FIGS. 1-5 for illustrative purposes. The embodiments disclosed by flowchart 900, however, are not limited to the features disclosed in FIGS. 1-5. Further, flowchart 900 may compliment the embodiments disclosed by flow diagram 300.

As disclosed above, different policies apply to different to users and prints jobs from different private domains. One private domain may not allow color printing while another private domain may not allow unlimited printing. Thus, public policy server 112 configures itself to resolve the different requirements set forth in a plurality of policies from various private policy servers. Further, public policy server 112 may manage different job lists and print jobs from the plurality of private domains. Alternatively, a private domain may have different domains related to it, such as example1.com and example2.com for private domain 120 shown in FIG. 4A. Different policies may come from a single private policy server.

Step 902 executes by generating verification token 502 at private authentication server 124. Private authentication server 124 receives information about public policy server 112 in order to establish a protocol connection. Verification token 502 helps to establish a connection between private authentication server 124 and public policy server 112. Private authentication server 134 also may generate a verification token 502 to establish protocol connection to public policy server 112.

Step 904 executes by sending verification token 502 to public policy server 112. Step 906 executes by storing verification token 502 at public policy server 112. As long as public policy server 112 can present verification token 502 when requested or when submitting a print request for a user, the connection is established with private authentication server 124. Step 908 executes by providing domain list 146 from private authentication server 124 to public policy server 112. Domain list 146 may include information pertaining to a plurality of domains for a plurality of private domains, as disclosed by FIG. 4A.

Step 910 executes by generating a first authentication token 506. Step 912 executes by generating a second authentication token 506. The first authentication token may be generated in response to a first user providing user information at public policy server 112. The second authentication token may be generated in response to a second user providing user information at public policy server 112. Public policy server 112 may access the appropriate private authentication server to validate the user information for each user. In some embodiments, private authentication server 124 may validate both users and generate both authentication tokens. Alternatively, private authentication server 124 may generate the first authentication token while private authentication server 134 may generate the second authentication token. Public policy server 112 may have instructions when to use the different private authentication servers.

Step 914 executes by sending the first authentication token and a first domain to a first private policy server. Step 916 executes by sending the second authentication token and a second domain to a second policy server. Public policy server 112 determines which private domain is applicable to each user. The determination of the private domain may be based on the email address for each user. In some embodiments, public policy server 112 may send this data to a single private policy server, which stores different policies for different domains that use a single private domain. Alternatively, the authentication tokens and domains may be sent to separate private policy servers. For example, the first authentication token and first domain are sent to a first private policy server, such as private policy server 128. The second authentication token and the second domain are sent to a second private policy server, such as private policy server 138.

Flowchart 900 proceeds to steps A1 and A2 for steps 914 and 916, respectively. Steps A1 and A2 then proceed to steps 918 and 920, respectively. Step 918 executes by retrieving a first policy, such as policy 142, in response to the first authentication token and the first domain. Step 920 executes by retrieving a second policy, such as policy 142, in response to the second authentication token and the second domain. In some embodiments, the first policy is stored on private policy server 128 and the second policy is stored on private policy server 138. Alternatively, both policies may be stored on private policy server 128 or 138. The first policy may apply to the first user and the second policy may apply to the second user.

Step 922 executes by receiving the first and second policies at public policy server 112. Step 924 executes by determining access to a first print job according to the first policy and access to a second print job according to the second policy. Public policy server 112 may configure the parameters of each policy to determine what type of print jobs may be made available to each user. For example, the first print job may not be available to the second user according to the second policy. The determination of access may relate to what print jobs are available to the users over public domain 110.

Step 926 executes by generating first and second job tokens, such as job token 510, based on the first and second policies at public policy server 112. A first job token is generated for the first policy and a second job token for the second policy. In some embodiments, the first job token may be sent to private job server 126 and the second job token may be sent to private job server 136. The different private job servers are in separate private domains. Alternatively, the job tokens may be sent to private job server 126 or 136.

Step 928 executes by retrieving a first job list, such as job list 511, based on the first policy and the received first job token and retrieving the second job list, such as job list 511, based on the second policy and the received second job token. The applicable private job server or servers provide the job lists to public policy server 112. The first user may select a first print job from the first print job list. The second user may select a second print job from the second print job list. These requests are communicated back to the application private job server or servers. The binary data for the first and second print jobs are sent to public file server 114.

Step 930 executes by generating confirmation tokens, such as confirmation token 514, at public policy server 112 to indicate that the print jobs may be processed at printing device 104. Public policy server 112 may confirm that each user has enough funds in his/her account to perform operations on printing device 104, as disclosed above. A first confirmation token for the first print job is presented to public file server 114. A second confirmation token for the second print job is presented to public file server 114. Public file server 114 provides the binary data for each print job to public policy server 112. Step 932 executes by sending the binary data for the first and second print jobs to printing device 104.

In some embodiments, it may be preferred to provide a list of documents already approved by the policy so that the policy-based printing system does not need to validate every print request. The user then may select a document from the list to print at a printing device. The private server may generate the list by applying the policy to a set of documents for the user as well as other criteria for printing the documents. The approved documents may be kept at the private server or sent to the public server so that when a document is selected from the list, it may be printed without the need for the private server.

Figure 10:
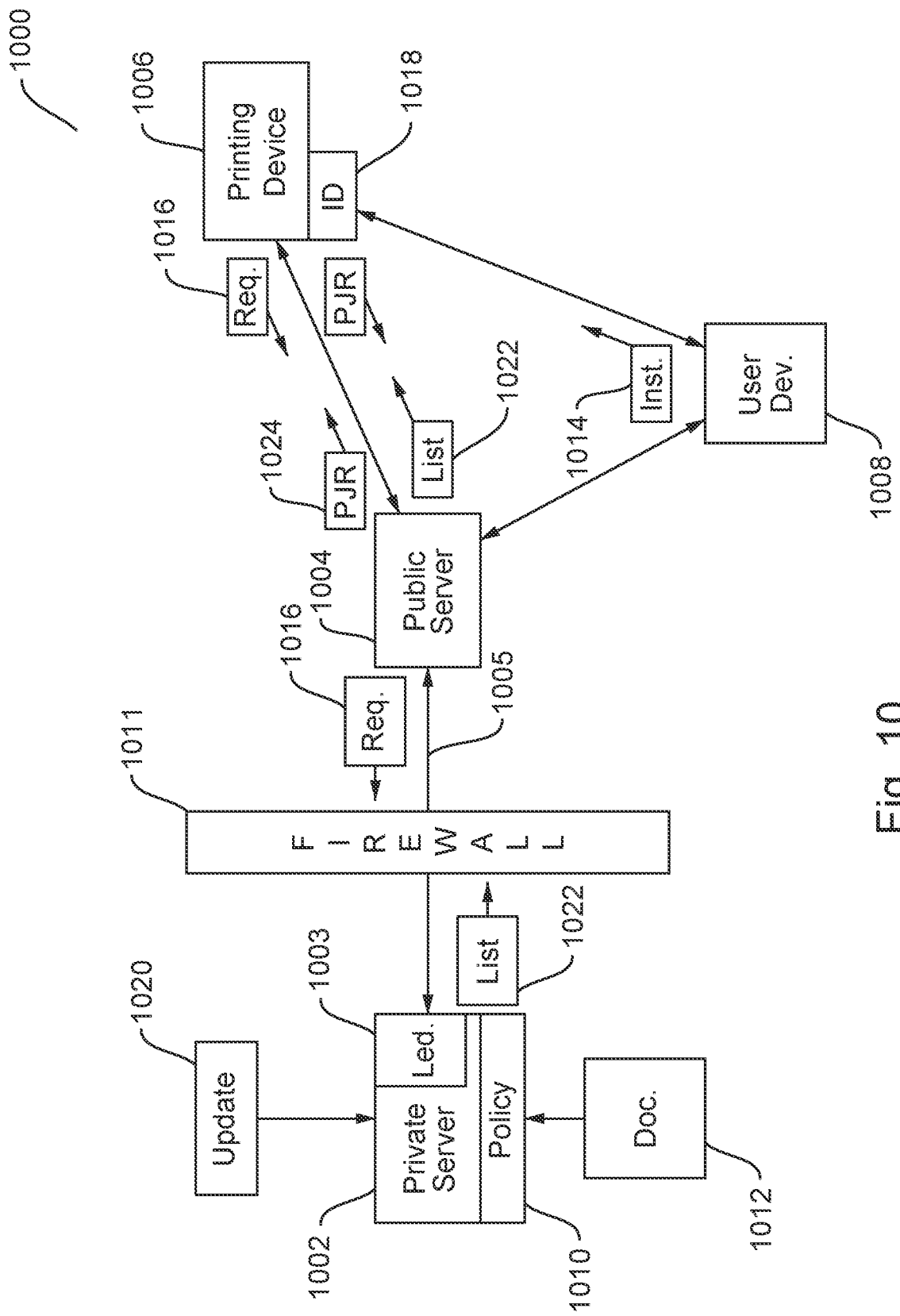
FIG. 10 illustrates a policy-based printing system to implement policy-based printing using a private server and a public server according to the disclosed embodiments.

FIG. 10 illustrates a policy-based system 1000 to implement policy-based printing using a private server 1002 and a public server 1004 according to the disclosed embodiments. System 1000 may reduce development and maintenance responsibilities in multiple components in the system and provide additional security with an advanced policy. In some embodiments, a private server at the corporate office, or private domain, has the policy set by an administrator. The policy changes frequently and becomes more complex with each evolution of software within the printing system or on the devices.

On the private server, a ledger may exist that records all the actions performed by end users who are printing, copying, scanning, and the like within system 1000. The users may utilize printing devices and servers in a public domain such that they perform actions outside the normal corporate environment. A public server may serve as a gateway to the private domain. It may have open websocket bi-directional communication with the private server, as disclosed above. The printing device is connected to the public server to request and receive documents to print. At times, the documents may come from the private server.

FIG. 10 shows a policy-based system 1000 having a private server 1002, a public server 1004, a printing device 1006, and a user device 1008. These components of the system may be disclosed above with regard to FIGS. 1-9. In system 1000, private server 1002 may refer to any of the servers in the private domain, such as private authentication server 124, private job server 126, and private policy server 128 of private domain 120 shown in FIG. 1. Private server 1002 may be used in system 1000 to represent any server or group of servers in a private domain, as disclosed above. Private server 1002 may be separated from servers and printing devices in public domains by firewall 1011. Private server 1002 also stores and applies policy 1010. Policy 1010 may correspond to policy 142 disclosed above.

Public server 1004 may refer to any of the servers in the public domain, such as public file server 114 and public policy server 112 of public domain 110 shown in FIG. 1. Public server 1004 may be accessible by a plurality of printing devices, including printing device 1006. In the public domain, public server 1004 may manage print jobs going to various printing devices. It also may include a connection to private server 1002, which has been verified and authenticated according to the processes disclosed above. For example, a websocket connection 1005 may exist between private server 1002 and public server 1004.

Printing device 1006 may receive documents from public server 1004 as well as other sources to print, modify, and the like. The features of printing devices according to the disclosed embodiments are disclosed above. Printing device 1006 may include device identification 1018 that indicates a unique identifier within system 1000. In some embodiments, device identification 1018 may be a number, alphanumeric characters, or a combination thereof. Public server 1004 may send documents and files to printing device 1006 based on device identification 1018.

User device 1008 may be a mobile device, tablet, laptop, desktop computer, and the like. User device 1008 may move between the private domain and the public domain, as separated by firewall 1011. It also may access private server 1002 as well as public server 1004. A user may send and receive data from the servers at user device 1008. User device 1008 also may send instructions 1014 to printing device 1006 to print, copy, scan, and the like stored documents from private server 1002. In some embodiments, the user inputs instructions 1014 into printing device 1006 to retrieve a list of documents available to print based on the user's permissions set forth in the private domain. In other embodiments, user device 1008 sends the instructions to printing device 1006.

Private server 1002 may upload one or more documents 1012. Documents 1012 may be data files stored on private server 1002 to retrieval within system 1000. Documents 1012 include data and information that is transmitted to devices within the private domain. The user of user device 1008 may upload documents 1012 within the private domain. Documents 1012, however, may be processed and printed at devices outside the private domain and not necessarily at devices connected to private server 1002. Policy 1010 also may be used to determine how and if documents 1012 are used within system 1000 outside the private domain.

The user may authenticate user device 1008 to public server 1004 according to the disclosed embodiments. For example, user device 1008 may provide verification data, such as a user/account name and password, to verify the user to public server 1004. This process may be disclosed above with regard to verification between public policy server 112 and private authentication server 124. Alternatively, the verification data may be a token used by user device 1008 to authenticate the user in a public domain. Upon authentication, websocket connection 1005 may be established to allow open bi-directional communication between private server 1002 and public server 1004 on behalf of the user for user device 1008.

In some embodiments, printing device 1006 receives instructions 1014 from the user or user device 1008 to access documents 1012. Electronic copies of documents 1012 may be sent to printing device 1006 to process and print, copy, scan, and the like. The user also may modify the electronic copies. In summary, one or more documents stored on private server 1002 are made available to print on a public device.

Before receiving documents 1012, printing device 1006 in conjunction with public server 1004 and private server 1002 may determine whether any action on behalf of the user is allowed at the printing device. An action by printing device 1006 is a simple operation of print, copy, scan, and the like. It may be measured in the smallest scale possible, such as a single page at a time. Thus, printing device 1006 may send request 1016 to public server 1004, which is then forwarded to private server 1002. Printing device 1006 does not do any analysis of policy 1010. Private server 1002 applies policy 1010 to determine whether printing operations allowed on behalf of the user at printing device 1006, as disclosed above by FIG. 3.

In some embodiments, request 1016 is used to obtain a list 1022 of documents 1012 that are available to the user for printing at printing device 1006. Private server 1002 may apply policy 1010 to the documents associated with the user to determine which ones can be printed outside the private domain. For example, policy 1010 may include a parameter that indicates the user may not color print outside the office, or outside the private domain. The user is limited to printing documents in black and white, or greyscale, in the public domain. Thus, policy 1010 will not allow color documents on list 1022 provided to the user.

In other embodiments, the parameter set forth by policy 1010 may include a total cost that may be incurred by the user or the organization using public print services. Thus, print jobs of documents on private server 1002 that cause the user to exceed this limit may not be placed in list 1022. The user may not select these documents for printing at printing device 1006. The process of generating list 1022 is disclosed in greater detail below.

Public server 1004 receives request 1016 pertaining to the user instructions to printing device 1006 to access documents 1012. Public server 1004 may forward request 1016 without further processing. In other embodiments, public server 1004 may determine whether request 1016 is acceptable to private server 1002. Public server 1004 also may perform tasks on behalf of private server 1002, such as store list 1022 or documents to be sent to the printing devices. Public server 1004 also may track print jobs to completion. Upon receipt of responses from private server 1002, public server 1004 may forward documents 1012 or provide further instructions to printing device 1006.

Private server 1002 receives request 1016 from public server 1004 via websocket connection 1005. If no websocket connection exists, then private server 1002 may not receive the request and public server 1004 responds to printing device 1006 with an alert that printing, copying, scanning, and the like for request 1016 is denied. Upon receipt of request 1016, private server 1002 analyzes policy 1010 to determine what documents of documents 1012 may be sent to printing device 1006. Private server 1002 also compiles or accesses ledger 1003 to determine if the action is allowed based on a remaining cost value or a remaining quota value. These features are disclosed in greater detail below. Ledger 1003 may be a record or file of all fine grained action within system 1000 that provides the status of the account for the user. For example, ledger 1003 may indicate how many pages that the user has printed in the policy-set period, costs incurred, and other statistics of actions limited by policy 1010.

Update 1020 also may be received at private server 1002. Update 1020 can impact policy 1010 and ledger 1003. Update 1020 may change the parameters of interest to policy 1010 or provide temporary adjustments to the policy. For example, the user may exceed his/her printing page limit by a specified number of pages for a 24 hour period. The user is attending an important off-site meeting or conference that would provide a good reason to exceed the daily printing limit. Update 1020, however, is not meant to be permanent. In the disclosed embodiments, update 1020 may be implemented in a more efficient manner by keeping policy 1010 at private server 1002 as opposed to having it stored on public server 1004. Private server 1002 does not need to update policies in the public domain or on different devices because all policy analysis and determinations may be performed at the private server. In some embodiments, update 1020 may modify policy 1010 to allow unused usage from a previous period or borrow usage from a future period for a current period.

Depending on the results of the determination, private server 1002 sends list 1022 to public server 1004. List 1022 may include copies of approved documents 1012 for printing. Documents 1012 may be sent as data files intended to reproduce the documents at printing device 1006. List 1022 may include more than one list, but is shown as a single list for brevity. Public server 1004 may analyze list 1022 to ensure it is appropriate for printing device 1006. Public server 1004 forwards list 1022 to printing device 1006. List 1022 may be displayed on printing device 1006 to allow the user to select one or more listed documents to print. Printing device 1006 sends the selected listed document as listed document print job request 1024 to public server 1004. As disclosed below, the listed document selected by the user is retrieved from storage on public server 1004 or private server 1002. It is then sent to printing device 1006 for processing and printing.

In some embodiments, public server 1004 also may send list 1022 or a message associated thereto to user device 1008. The response sent to user device 1008 also may include statistics or information regarding the status of the user's account based on ledger 1003 and policy 1010. List 1022 may be displayed on user device 1008. The listed document selected by the user may be sent to printing device 1006, which then forwards the request for the document to public server 1004. Alternatively, the listed document selected by the user may be sent directly to public server 1004.

System 1000 shows user device 1008 sending instructions 1014 to printing device 1006. In some embodiments, the user may interact directly with printing device 1006 to process document 1012 thereon. Use of a user device 1008 is not required to print, copy, or scan a document at printing device 1006 or within the public domain. Further, user device 1008 may generate request 1016 to send list 1022 to printing device 1006. The request is forwarded to private server 1002 through public server 1004. User device 1008 also may receive list 1022 to indicate documents which may be selected from the list to print, which is then provided to printing device 1006.

Figure 11:
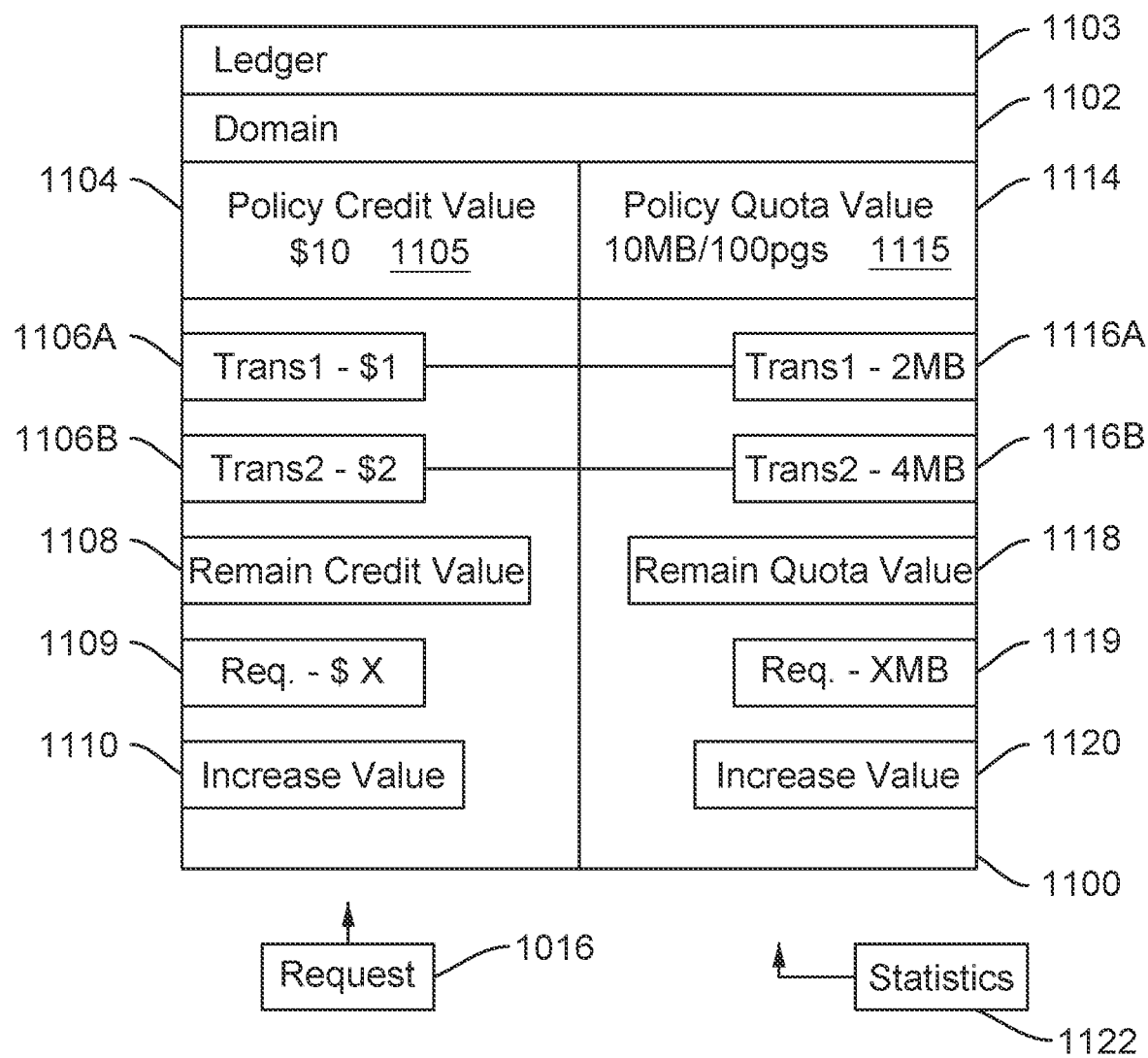
FIG. 11 illustrates a block diagram of a ledger for use in the policy-based printing system according to the disclosed embodiments.

FIG. 11 depicts ledger 1003 for use in policy-based printing operations according to the disclosed embodiments. FIG. 11 shows some of the features disclosed above in greater detail. Ledger 1003 may store information that is used in determining whether to allow a print job. Further, ledger 1003 is used to generate list 1022 of documents that may be printed by the user. Ledger 1003 may be a table or file stored on private server 1002 to record transactions generated by the user in the private or public printing domain. The fields and entries shown in ledger 1003 are for illustrative purposes only. Other means for storing the information used by ledger 1003 may be used.

Table 1100 may be in ledger 1003, which corresponds to the user. The user may belong to an organization corresponding to a domain, shown as domain 1102. Domain 1102 may be related to a URL address for private server 1002, and identified using the URL address in a request for a print job. Domain 1102 may be a field in table 1100 that stores this information. The URL address may be used by public server 1004 to identify the appropriate domain to query for print jobs for the user. Domain 1102 relates to the organization that employs or allows the user to print from private server 1002 in the public domain. Preferably, policy 1010 is used to facilitate this process.

Table 1100 also may include fields for parameters that vary over time due to the transactions. These fields include values that are used to determine whether to allow a print job or generate list 1022. For illustrative purposes, the features of ledger 1003 will be disclosed as using printing device 1006. The same features also may apply to print jobs using a printing device in the private domain.

For the user, policy 1010 may be used to limit print jobs according to certain parameters, such as only black and white printing, security levels, and the like, disclosed above. One parameter may be costs, as shown in FIG. 4B in that the user may not exceed a certain amount of printing costs for a policy period. To track incurred costs, ledger 1003 records transactions and adjusts a remaining credit value 1108 for the user. Thus, credit field 1104 includes information to determine the remaining credit value for the user. Remaining credit value 1108 then may be used to determine which documents belong in list 1022.

Credit field 1104 includes a policy credit value 1105. Policy credit value 1105 may be set by an administrator based on factors, such as the contract with the organization, the access level of the user, budgeted usage, and the like. Policy credit value 1105 may be sent or set at ledger 1003 by the administrator or set forth in policy 1010. Policy credit value 1105 is stored in credit field 1104. For the most part, policy credit value 1105 does not change during a policy period. It sets the limit on how much the user may charge to the organization for printing. In some embodiments, policy credit value 1105 may differ for printing using printing devices in the private domain as opposed to using printing devices through public server 1004. Alternatively, policy credit value 1105 may place a limit on all printing across both services.

Print jobs for the user results in entries for the transactions being created in credit field 1104. Thus, transactions 1106A and 1106B may reflect two print jobs already performed for the user during the current policy period. Information for these transactions may include costs, time/date, device identification for the printing device, whether it is a private or public print job, and the like. When a request for a new print job or list 1022 is received, the costs of the transactions are compiled to determining remaining credit value 1108.

For example, policy credit value 1105 may be $10 for a policy period. The user may incur printing costs up to $10 before requests will be denied. Transaction 1106A incurred a cost of $1 while transaction 1106B incurred a cost of $2. Thus, remaining credit value 1108 is $7. A print job will be allowed as long as it does not cost more than $7. Ledger 1003 is notified of a pending request for list 1022, which will include documents for the user stored at private server 1002. In some embodiments, request 1016 is received from public server 1004. In other embodiments, request 1016 may be received from user device 1008. The request may include a request to list or provide all documents that may be printed for less than $7, or remaining credit value 1108. This feature is disclosed in greater detail below.

In some embodiments, request 1016 may be for a print job. Ledger 1003 may be used to allow the print job if enough remaining credit value is available. Estimated transaction 1109 may be the amount estimated to complete the print job, shown as X. If X is $5, then the print job will be allowed. If X is $8, then the print job will be denied as it exceeds remaining credit value 1108 or $7.

If request 1016 is received at public server 1004, then a URL address may be used to determine which domain 1102 to query with the user's information. The URL address is determined by public server 1004 based on information provided by the user, such as an email address. The email address will indicate the domain of the user, which then is used to obtain the URL address. Determination of domains may be disclosed above by FIG. 4A.

Table 1100 also includes quota field 1114 to determining a remaining quota value 1118 for the user. Quota value may refer to a parameter other than cost to limit printing operations for the user, such as total data or pages for print jobs during a policy period. For example, the user may be limited to printing up to 10 MB of data for a policy period. Another example may be limiting the user to printing 100 pages within a policy period. The data limit may be more applicable when the user is printing documents having complex graphics or information as opposed to text. Much like policy credit value 1105, policy quota value 1115 may be set by policy 1010 or the administrator.

Quota field 1114 also includes entries for transactions corresponding to those in credit field 1104. Thus, transaction 1116A corresponds to transaction 1106A and includes the amount of data used to accomplish the print job, which cost $1. Transaction 1116B corresponds to transaction 1106B. The corresponding transactions may share certain information such as time/data, printing location, and the like. The determination of remaining quota value 1118 also is determined by compiling the amount of data used in the previous transaction and comparing the compiled amount to policy quota value 1115. Using the above example, transaction 1116A used 2 MB of data while transaction 1116B used 4 MB of data. If using pages, then the number of pages printed may be compiled. If policy quota value 1115 is 10 MB, then remaining quota value 1118 is 4 MB.

Request 1016 is received and a list 1022 is generated as a result. Remaining quota value 1118 may be used to determine which documents to add to list 1022 in that printing the document will not cause the user to exceed policy quota value 1115 for the policy period, or whatever period is set. In some embodiments, both remaining credit value 1108 and remaining quota value 1118 may be used to filter the documents placed in list 1022. The disclosed embodiments may prevent the user from printing large amounts of data in the public domain.

In some embodiments, request 1016 may be for a print job as opposed to a request for list 1022. When the request for the new print job is received, the estimated size of the print job is shown as estimated transaction 1119. The estimated quota size may be X MB. If X is 2 MB, then the print job should be allowed. If X is 6 MB, then the print job will be denied. In some embodiments, if the estimated cost and size of the print job fails to be within the parameters for remaining credit value 1108 or remaining quota value 1118, then the print job will not be allowed. Alternatively, if the estimated cost or size is acceptable, then the print job may proceed. The appropriate notification may be generated by private server 1002 and sent to the appropriate device, either printing device 1006 or public server 1004.

After printing operations are complete, the printing device performing the print job will generate statistics 1122 and send them to update ledger 1003. Entries will be made into credit field 1104 and quota field 1114 for the transaction. Statistics 1122 may include the actual cost and size of the print job, which may differ from the estimated amounts used in determining whether to allow the print job. Statistics 1122 may be generated for printing operations using a printing device in the public domain as well as the private domain. In some embodiments, list 1022 may be updated upon receipt of statistics 1122. For example, remaining credit value 1108 is reduced based on the new transaction such that documents are removed from list 1022 that cannot be printed for less than the new remaining credit value.

In some embodiments, the user may add to the credit or quota allocation for the period in order to perform more printing operations. Alternatively, an administrator or other third party may add to remaining credit value 1108 or remaining quota value 1118 to allow list 1022 to include more documents to print. Thus, ledger 1003 may receive increase credit value 1110 or increase quota value 1120 that increases the respective remaining values. As a result, list 1022 may be updated with the additional documents made available due to the increase. Update 1020 may include increase credit value 1110 and increase quota value 1120.

Figure 12:
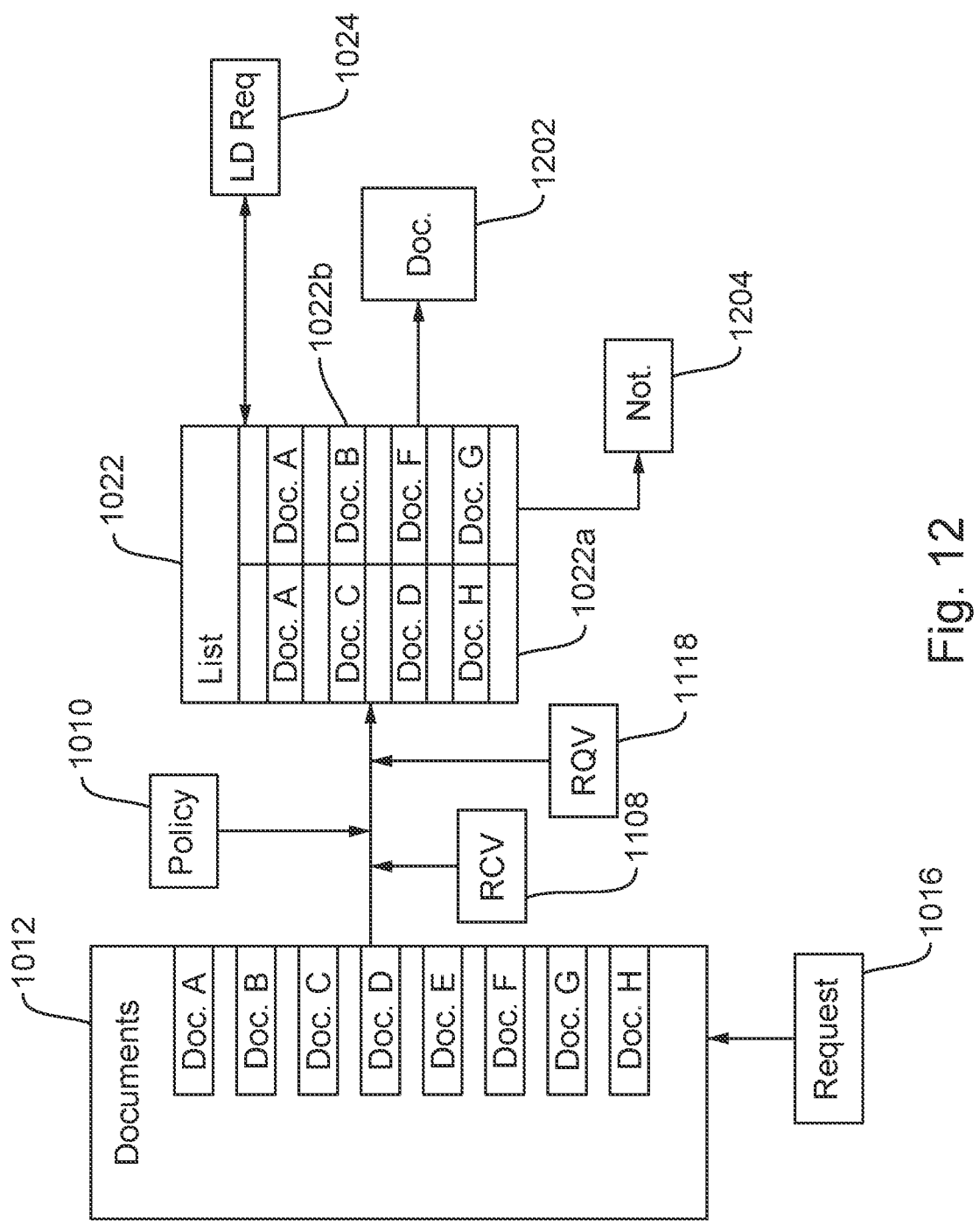
FIG. 12 illustrates a block diagram of components within the system to generate a list for use in policy-based printing operations according to the disclosed embodiments.

FIG. 12 depicts a block diagram of components within system 1000 to generate a list 1022 for use in policy-based printing operations according to the disclosed embodiments.

FIG. 12 shows a plurality of documents 1012 available to print by the user being filtered to generate list 1022 of documents that the user may print based on policy 1010, remaining credit value 1108, or remaining quota value 1118. The disclosed embodiments apply these items at private server 1002 to create list 1022. Alternatively, public server 1004 may apply these items.

Documents 1012 include documents A, B, C, D, E, F, G, and H. Each one of these documents may differ in size and cost to print. For example, document A may be 20 pages with complex graphics and cost $5 to print at printing device 1006. Document H may be 2 pages of text and cost $0.50 to print. As the user prints documents within the public domain, the number of documents available to print in subsequent actions may reduce based on the terms of policy 1010 or the remaining credit values. Policy 1010 also may limit the number of documents available due to parameters set forth by the organization, such as no color printing, no printing confidential information or certain level of documents, and the like.

Request 1016 is received at private server 1002 where documents 1012 are stored. The disclosed embodiments apply policy 1010 to the documents and determine those documents which may be printed based on the information provided in request 1016. For example, request 1016 may include information about printing device 1006, such as the cost per page or per kilobyte for printing operations. It also includes user information so that the appropriate policy is applied. Request 1016 also may include limitations of the printing device itself, such as no color printing or certain sizes of paper are not available. For example, printing device 1006 may only print on letter size paper such that a map on legal size paper could not be printed.

The disclosed embodiments apply the parameters set forth in policy 1010 to filter out documents 1012. The documents that are allowed according to policy 1010 are added to list 1022. For example, documents A, C, D, and H are acceptable to print according to policy 1010. Policy 1010 will allow those documents to be printed. The parameters of policy 1010 denied printing of documents B, E, F, and G so they are not included on list 1022. These documents are shown in list 1022A.

Remaining credit value 1108 and remaining quota value 1118 also may be applied to documents 1012 with policy 1010. Alternatively, policy 1010 is not applied and only the remaining values are used to create list 1022. As noted above, ledger 1003 may be used to determine the remaining values left to the user for print jobs. If remaining credit value 1108 is $7, then documents that may be printed for $7 or less may be added to list 1022. The disclosed embodiments may estimate how much a print job is for each document based on information from printing device 1006, such as cost to print a page in black and white. The number of pages in each document is then used to determine the estimated cost, shown as 1109. This process may be repeated for each document. Further, the same process may be used for adding documents to list 1022 based on remaining quota value 1118.

For example, list 1022B may represent documents allowed to be printed on printing device 1006 based on remaining credit value 1108 or remaining quota value 1118. The documents in list 1022B will not exceed the amount allowed to the user for the period. List 1022B may include documents A, B, F, and G. Thus, list 1022B may not necessarily include all the documents in list 1022A. Just because a document may be allowed by policy 1010 does not mean it also will be allowed based on remaining values and vice versa. For example, policy 1010 may not allow color print jobs even though the credit is available to do so. Referring to FIG. 12, document A is shown as the only document that meets all the criteria set forth by policy 1010 as well as remaining credit value 1108 or remaining quota value 1118.

Either list 1022A or list 1022B may be sent to the user as list 1022. Alternatively, both lists may be sent. In any event, the user is presented with a list 1022 of documents that he/she may print at printing device 1006. The user may then select a document, shown as listed document 1202 for printing on printing device 1006. In some embodiments, list 1022 is displayed to the user on printing device 1006. Referring to FIG. 2, the user may use the operations panel and display to indicate document 1202 to print. Printing device 1006 sends a listed document print job request 1024 to retrieve document 1202 for printing.

In some embodiments, list 1022 may reside at private server 1002. Listed document print job request 1024 is received at private server 1002. As document 1202 is within list 1022, policy 1010, remaining credit value 1108, and remaining quota value 1118 need not be applied to the request. Document 1202 is already approved for printing. Private server 1002 may send document 1202 to public server 1004. Public server 1004 forward document 1202 to printing device 1006.

Alternatively, list 1022 may include the data files for the listed documents such that these documents are made available on public server 1004. Listed document print job request 1024 for document 1202 is received at public server 1004. Public server 1004 retrieves document 1202 and sends it to printing device 1006. This feature may save actions needed to communicate with private server 1002. Further, private server 1002 may not be available to send documents such that public server 1004 manages the allowed documents in list 1022.

Once a document is retrieved from list 1022, notification 1204 may be sent to the user via printing device 1006 or user device 1008. Notification 1204 may indicate that the document is being sent to printing device 1006. It also may include a code to enter into printing device 1006 to print document 1202. For example, the user may not physically be next to printing device 1006 when document 1202 is sent. Notification 1204 may include a code for the user to input to printing device 1006 to print document 1202 when the user is at the printing device. In some embodiments, statistics 1122 are generated and sent to private server 1002 or public server 1004 to update list 1022.

Figure 13:
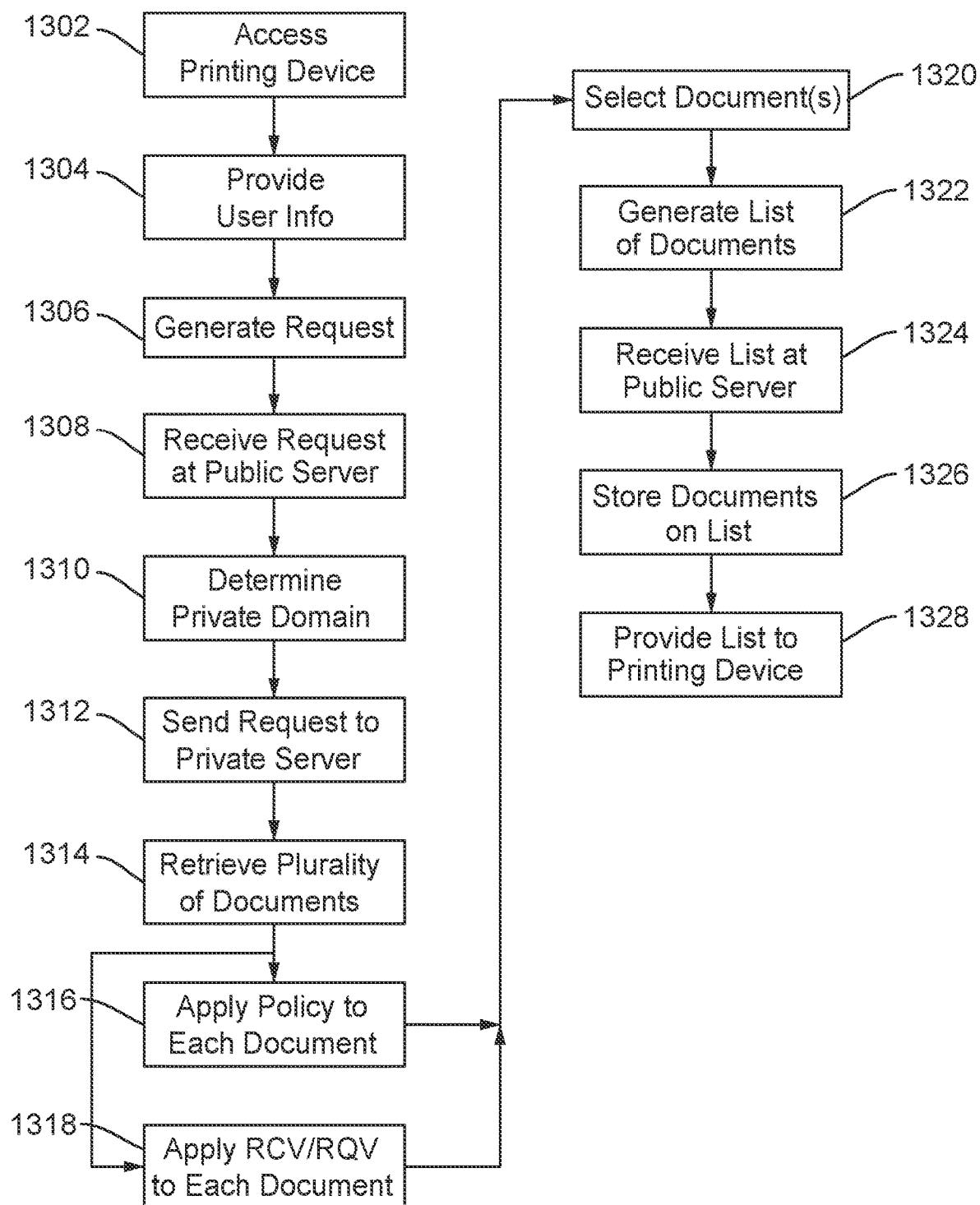
FIG. 13 illustrates a flowchart for generating a list for use within a policy-based printing system according to the disclosed embodiments.

FIG. 13 depicts a flowchart 1300 for generating list 1022 for use within policy-based printing system 1000 according to the disclosed embodiments. Flowchart 1300 may refer to the features of FIGS. 1-12 for illustrative purposes. The embodiments disclosed by flowchart 1300, however, are not limited to the features shown in FIGS. 1-12.

Step 1302 executes by accessing printing device 1006. Printing device 1006 is part of a public print service through public server 1004. The user may choose printing device 1006 to perform printing operations. In other embodiments, the user may access any printing device within the public print service through public server 1004. For example, the user may go into a location with a plurality of printing devices and access a kiosk for being printing operations.

Step 1304 executes by providing user information at printing device 1006. Alternatively, the user information may be provided to printing device 1006 using the kiosk disclosed above or information from user device 1008. For example, the user information may be sent as instructions 1014 to being printing operations. Step 1306 executes by generating request 1016 for a list of documents printable at printing device 1006. In some embodiments, the list may be for documents printable within the public print service. Request 1016 may be generated at printing device 1006. In other embodiments, user device 1008 may send instructions 1014 to public server 1004 such that the public server generates request 1016.

Step 1308 executes by receiving request 1016 at public server 1004, if the request is generated by printing device 1006. Step 1310 executes by determining a private domain applicable to the user using the user information. The user information preferably includes an email address for the user. Public server 1004 may use the email address to determine the private domain applicable to the user. The user information also may include a URL address that directs public server 1004 to the appropriate private domain. The private domain includes one or more private servers that store documents accessible by the user.

Step 1312 executes by sending request 1016 to private server 1002 associated with the private domain determined in step 1310. Request 1016 instructs private server 1002 to generate list 1022 of one or more documents 1012 associated with the user. Private server 1002 stores these documents and identifies those documents that the user may print. Not all of these documents may be printed on a public printing device. Step 1314 executes by retrieving documents 1012.

Step 1316 executes by applying policy 1010 to each document 1012 retrieved for the user. The application of policy 1010 to determine whether a document may be printed in the public domain is disclosed above. The disclosed embodiments determine whether policy 1010 will allow one or more documents 1012 to be printed based on the parameters and constraints set forth by the organization or company associated with the domain.

Step 1318 executes by applying remaining credit value 1108 or remaining quota value 1118 to determine if one or more documents 1012 can be printed without exceeding the remaining values. This process is disclosed above by FIGS. 11 and 12. In some embodiments, steps 1316 and 1318 may be executed simultaneously. In other embodiments, step 1318 may be executed after step 1316 such that a document allowed by policy 1010 may not be allowed if the print job exceeds the remaining credit value or remaining quota value. Alternatively, only one step 1316 or 1318 may be executed. Private server 1002 may be instructed which step to execute by the organization.

Step 1320 executes by selecting one or more documents 1012 that may be printed according to step 1316 or step 1318, or both. As shown above, document A may be allowed for printing using both policy 1010 and remaining credit value 1108. Using only policy 1010, documents A, C, D, and H may be printed by the user. Step 1322 executes by generating list 1022 of approved documents for printing by the user. In some embodiments, separate lists may be generated according to different criteria. List 1022 may be stored at private server 1002 along with the corresponding request.

Steps 1314-1322 also may be executed at public server 1004. In other words, request 1016 may not be sent to private server 1002. Documents 1012 may be stored at public server 1004 along with policy 1010 and ledger 1003 to determine remaining credit value 1108 or remaining quota value 1118. List 1022 may be generated at public server 1004 in the same manner. This feature may remove the need to engage and tie up private server 1002 with generating lists over and over for users.

Step 1324 executes by receiving list 1022 at public server 1004 from private server 1002, if applicable. If list 1022 is generated at private server 1002, then the list should be provided to public server 1004 as it will provide a selected document to printing device 1006. Step 1326 executes by storing any documents within list 1022 at public server 1004, if appropriate. In some embodiments, the files for the documents in list 1022 are sent as well so that these documents may be saved at public server 1004 for quick retrieval when a print job is received.

Step 1328 executes by providing list 1022 to printing device 1006. The user will receive list 1022 at the printing device that generated request 1016. In some embodiments, a kiosk associated with one or more printing devices may receive list 1022. The user may view list 1022 to select a document for printing when he/she is ready. Alternatively, list 1022 also may be sent to user device 1008.

Figure 14:
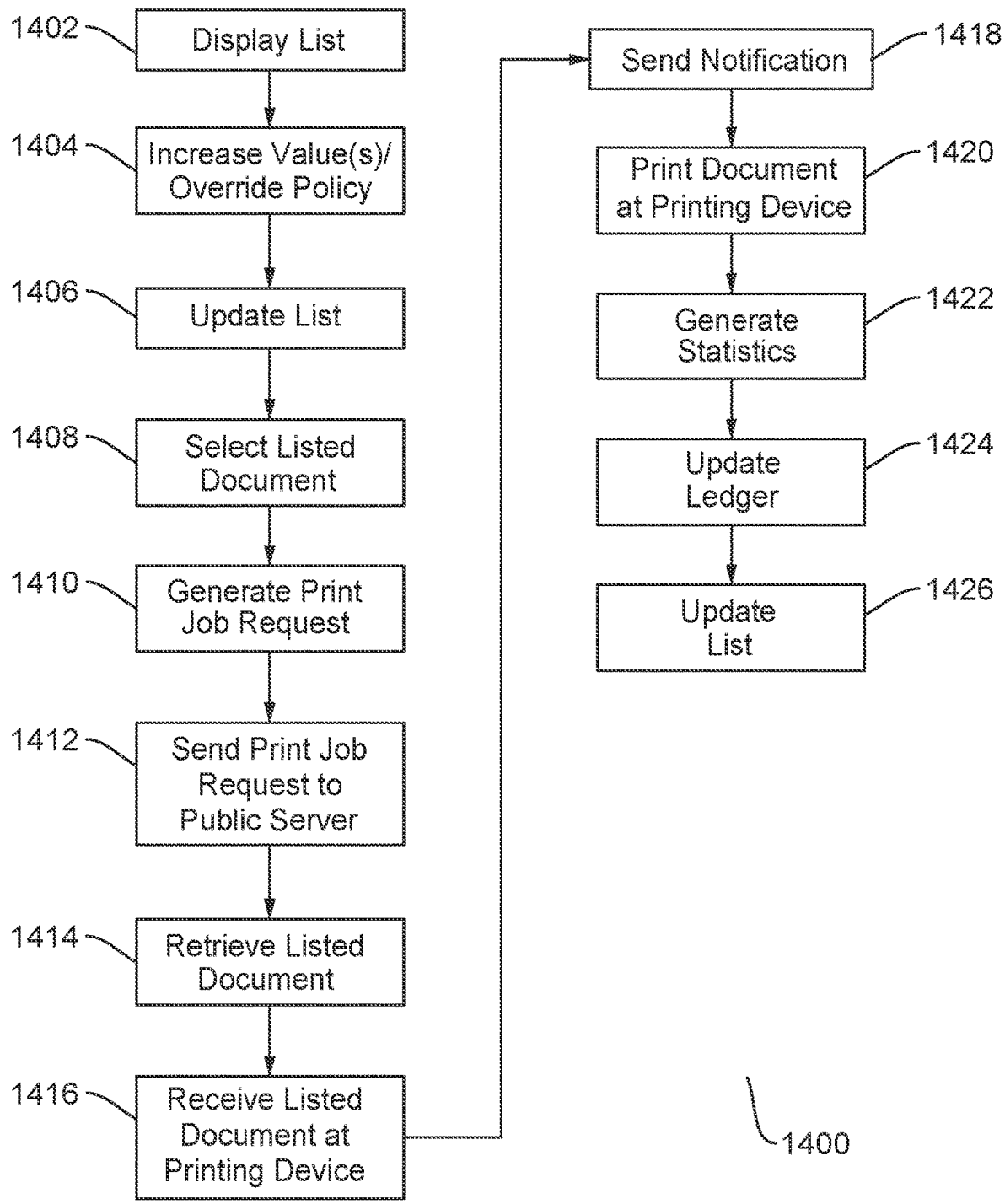
FIG. 14 illustrates a flowchart for using a list to print a document at the printing device according to the disclosed embodiments.

FIG. 14 illustrates a flowchart 1400 for using list 1022 to print document 1202 at printing device 1006 according to the disclosed embodiments. Flowchart 1400 may refer to the features of FIGS. 1-13 for illustrative purposes. The embodiments disclosed by flowchart 1400, however, are not limited to the features shown in FIGS. 1-13.

Step 1402 executes by displaying list 1022 at printing device 1006. The documents in list 1022 are made available to the user so that the user may browse the list to search for a document to print. A graphical user interface may allow the user to scroll through list 1022 as well as bring up information about each document, such as page numbers, file size, estimated cost to print, and the like. Alternatively, list 1022 may be displayed on user device 1008 so that the user may browse the documents before interacting with printing device 1006.

Step 1404 executes by increasing credit value or overriding policy 1010, if available. In some embodiments, an option may be presented to the user to add value to his/her account by payment so that the number of documents available in list 1022 increases accordingly. For example, if remaining credit value 1108 is $7 based on the example above, the user may add $3 to the account to increase the remaining credit value to $10. Thus, documents costing more than $7 may become available for printing within system 1000. Alternatively, the user may be able to override the restrictions applied by policy 1010 to printing operations. The user may have a code or other means to override the parameter constraints of policy 1010. The override code may be entered into printing device 1006 and sent to public server 1004 for verification. Step 1406 executes by updating list 1022 in response to any action taken in Step 14040. If the remaining credit value is increased or the override approved, then list 1022 may be updated accordingly using the processes disclosed above with reference to flowchart 1300.

Step 1408 executes by selecting a listed document 1202 from list 1022 for printing. The user may indicate one or more documents to print that fit within the constraints and parameters applied when generating list 1022. Listed document 1202 may be selected by highlighting the selection on list 1022. Step 1410 executes by generating a print job request 1024 for listed document 1202 at printing device 1006. Print job request 1024 may be like a typical print job request sent to retrieve a document from public server 1004.

Step 1412 executes by sending print job request 1024 to public server 1004 from printing device 1006. Print job request 1024 is sent to public server 1004 instead of directly to a private server, such as private server 1002, as printing device 1006 does not have a direct connection to the private domain past firewall 1011. In some embodiments, print job request 1024 may be generated and sent from user device 1008.

Step 1414 executes by retrieving listed document 1202 for printing based on the print job request. In some embodiments, print job request 1024 is passed from public server 1004 to private server 1002 to retrieve listed document 1202. Listed document 1202 is stored on private server 1002. Because the document is selected from list 1022, private server 1002 does not need to apply policy 1010 or use ledger 1003 to approve the print job. Private server 1002 may send the data file for listed document 1202 to public server 1004.

Alternatively, step 1414 may retrieve listed document 1202 from public server 1004. As noted above, the data files for documents on list 1022 may be sent from private server 1002 and stored at public server 1004 to allow easier access for printing operations. Thus, public server 1004 process print job request 1024 and retrieves the requested document without the need to involve private server 1002. Thus, the disclosed embodiments may reduce the number of actions needed to fulfill print job requests from printing device 1006 by using list 1022 in conjunction with public server 1004.

Step 1416 executes by receiving listed document 1202 at public server 1004. Public server 1004 may receive listed document 1202 from private server 1002. If listed document 1202 is stored on public server 1004, then this step may be skipped. In some embodiments, public server 1004 may retrieve documents from another server in the public print service. Step 1418 executes by sending notification 1204 to the user that listed document 1202 is ready to print. Notification 1204 may be sent to printing device 1006 or user device 1008. Notification 1204 may include a code to enter at printing device 1006 to launch printing of listed document 1202. The code may be used so that only the user may print listed document 1202. For example, printing device 1006 may be in a public location having many printing devices operated by a kiosk. The user enters the code from notification 1204 upon arrival at the public location so that the document is not made available without the user present. Printing device 1006 also should receive the code associated with listed document 1202.

Step 1420 executes by printing listed document 1202 at printing device 1006. If using a code from notification 1204, then printing device 1006 may verify the code to listed document 1202 to print. Step 1422 executes by generating statistics 1122 for the print job of listed document 1202. Statistics may include the number of pages printed, costs accrued, data used, type of paper used, color or black and white printing, and the like. Statistics 1122 may be sent to public server 1004 as well as user device 1008. If applicable, then statistics 1122 also are sent to private server 1002.

Step 1424 executes by updating ledger 1003 with statistics 1122 for the print job of listed document 1202. As disclosed above, completed print jobs are entered as transactions in ledger 1003. Thus, an entry will be created for the completed print job using the data from statistics 1122. Further, remaining credit value 1108 or remaining quota value 1118 is adjusted accordingly so that these values reflect the amount now available for the user. Step 1426 executes by updating list 1022 accordingly. List 1022 may remove those documents that are not allowed due to the updated remaining credit value 1108 or remaining quota value 1118. The updated list may be sent to public server 1004. In other embodiments, public server 1004 may update list 1022 using a ledger 1003 thereon. This feature may reduce the number of actions needed between public server 1004 and private server 1002.

In some embodiments, only policy 1010 is applied to generate list 1022. No remaining credit value 1108 or remaining quota value 1118 is used. Thus, no update of list 1022 is needed after a print job is completed. List 1022, however, may be updated when policy 1010 is changed or updated.

According to the disclosed embodiments, the number of applications of a policy or other constraints to a user for public domain printing may be reduced using a list generated beforehand and provided to the user. The list may reduce the number of denials to the user for print jobs. It also gives a clear indication to the user what is available to print in the public domain so that he/she may take action before commencing printing operations to make other documents available. The disclosed embodiments also may reduce the number of interactions between the public server and the private server.

Figure 15:
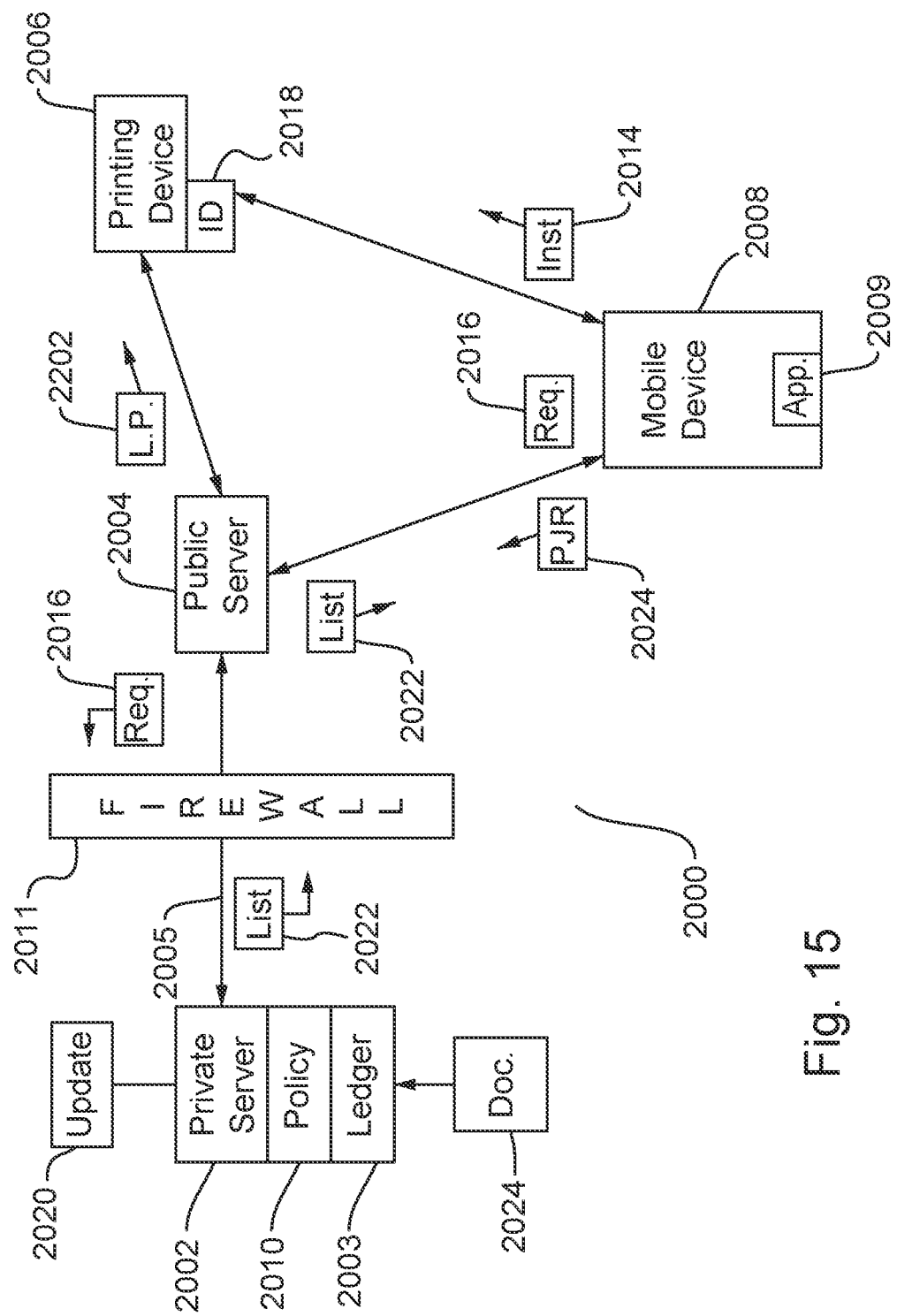
FIG. 15 illustrates a policy-based printing system to implement policy-based printing using a private server and a public server according to the disclosed embodiments.

FIG. 15 illustrates another policy-based system 2000 to implement policy-based printing using a private server 2002 and a public server 2004 according to the disclosed embodiments. System 2000 may differ from system 1000 in that it includes a mobile device 2008. System 2000 may reduce development and maintenance responsibilities in multiple components in the system and provide additional security with an advanced policy. In some embodiments, a private server at the corporate office, or private domain, has the policy set by an administrator. The policy changes frequently and becomes more complex with each evolution of software within the printing system or on the devices.

On the private server, a ledger may exist that records all the actions performed by end users who are printing, copying, scanning, and the like within system 2000. The users may utilize printing devices and servers in a public domain such that they perform actions outside the normal corporate environment. A public server may serve as a gateway to the private domain. It may have open websocket bi-directional communication with the private server, as disclosed above. The printing device is connected to the public server to request and receive documents to print. At times, the documents may come from the private server.

FIG. 15 shows a policy-based system 2000 having a private server 2002, a public server 2004, a printing device 2006, and a mobile device 2008. These components of the system may be disclosed above with regard to FIGS. 1-9. In system 2000, private server 2002 may refer to any of the servers in the private domain, such as private authentication server 124, private job server 126, and private policy server 128 of private domain 120 shown in FIG. 1. Private server 2002 may be used in system 2000 to represent any server or group of servers in a private domain, as disclosed above. Private server 2002 may be separated from servers and printing devices in public domains by firewall 2011. Private server 2002 also stores and applies policy 2010. Policy 2010 may correspond to policy 142 disclosed above.

Public server 2004 may refer to any of the servers in the public domain, such as public file server 114 and public policy server 112 of public domain 110 shown in FIG. 1. Public server 2004 may be accessible by a plurality of printing devices, including printing device 2006. In the public domain, public server 2004 may manage print jobs going to various printing devices. It also may include a connection to private server 2002, which has been verified and authenticated according to the processes disclosed above. For example, a websocket connection 2005 may exist between private server 2002 and public server 2004. Public server 2004 also may interact with mobile device 2008.

Printing device 2006 may receive documents from public server 2004 as well as other sources to print, modify, and the like. The features of printing devices according to the disclosed embodiments are disclosed above. Printing device 2006 may include device identification 2018 that indicates a unique identifier within system 2000. In some embodiments, device identification 2018 may be a number, alphanumeric characters, or a combination thereof. Public server 2004 may send documents and files to printing device 2006 based on device identification 2018.

Mobile device 2008 may be a mobile phone or smartphone, tablet, laptop, desktop computer, and the like. Mobile device 2008 may move between the private domain and the public domain, as separated by firewall 2011. It also may access private server 2002 as well as public server 2004. A user may send and receive data from the servers at user device 2008. Mobile device 2008 also may send instructions 2014 to printing device 2006 to print, copy, scan, and the like stored documents from private server 2002. In some embodiments, the user inputs instructions 2014 into printing device 2006 to retrieve a list of documents available to print based on the user's permissions set forth in the private domain. In other embodiments, mobile device 2008 sends the instructions to printing device 2006.

Mobile device 2008 includes mobile application 2009 to manage print jobs within system 2000. Mobile application 2009 may send and receive information to public server 2004 or printing device 2006. For example, mobile application 2009 may send a selection by the user of mobile device 2008 to print a document. Mobile application 2009 also may display information regarding print jobs on mobile device 2008. In some embodiments, mobile application 2009 is launched or executed on mobile device 2008 to configure the mobile device into a special purpose machine to manage printing operations within system 2000.

Private server 2002 may upload one or more documents 2012. Documents 2012 may be data files stored on private server 2002 for retrieval within system 2000. Documents 2012 include data and information that is transmitted to devices within the private domain. The user of mobile device 2008 may upload documents 2012 within the private domain. Documents 2012, however, may be processed and printed at devices outside the private domain and not necessarily at devices connected to private server 2002. Policy 2010 also may be used to determine how and if documents 2012 are used within system 2000 outside the private domain.

The user may authenticate mobile device 2008 to public server 2004 according to the disclosed embodiments. For example, mobile device 2008 may provide verification data, such as a user/account name and password, to verify the user to public server 2004. Public server 2004 may use this information to verify the user to private server 2002. This process may be disclosed above with regard to verification between public policy server 112 and private authentication server 124. Alternatively, the verification data may be a token used by mobile device 2008 to authenticate the user in a public domain. Upon authentication, websocket connection 2005 may be established to allow open bi-directional communication between private server 2002 and public server 2004 on behalf of the user for mobile device 2008.

In some embodiments, printing device 2006 receives instructions 2014 from the user or mobile device 2008 to access documents 2012. Electronic copies of documents 2012 may be sent to printing device 2006 to process and print, copy, scan, and the like. The user also may modify the electronic copies. In summary, one or more documents stored on private server 2002 are made available to print on a public device as managed by mobile application 2009 on mobile device 2008.

Before receiving documents 2012, mobile application 2009 in conjunction with public server 2004 and private server 2002 may determine whether any action on behalf of the user is allowed at the printing device. An action by printing device 2006 is a simple operation of print, copy, scan, and the like. It may be measured in the smallest scale possible, such as a single page at a time. Thus, mobile device 2008 may send request 2016 to public server 2004, which is then forwarded to private server 2002. Mobile device 2008 does not do any analysis of policy 2010. Private server 2002 applies policy 2010 to determine whether printing operations allowed on behalf of the user at printing device 2006, as disclosed above by FIG. 3.

In some embodiments, request 2016 is used to obtain a list 2022 of documents 2012 that are available to the user for printing at printing device 2006. Private server 2002 may apply policy 2010 to the documents associated with the user to determine which ones can be printed outside the private domain. For example, policy 2010 may include a parameter that indicates the user may not color print outside the office, or private domain. The user is limited to printing documents in black and white, or greyscale, in the public domain. Thus, policy 2010 will not allow color documents on list 2022 provided to the user through mobile application 2009.

In other embodiments, the parameter set forth by policy 2010 may include a total cost that may be incurred by the user or the organization using public print services. Thus, print jobs of documents on private server 2002 that cause the user to exceed this limit may not be placed in list 2022. The user may not select these documents for printing at printing device 2006. The process of generating list 2022 is disclosed in greater detail below.

Public server 2004 receives request 2016 pertaining to the user instructions from mobile application 2009 to access documents 2012. Public server 2004 may forward request 2016 without further processing. In other embodiments, public server 2004 may determine whether request 2016 is acceptable to private server 2002. Public server 2004 also may perform tasks on behalf of private server 2002, such as store list 2022 or documents to be sent to the printing devices. Public server 2004 also may track print jobs to completion. Upon receipt of responses from private server 2002, public server 2004 may forward documents 2012 or provide further instructions to printing device 2006 or mobile application 2009.

Private server 2002 receives request 2016 from public server 2004 via websocket connection 2005. If no websocket connection exists, then private server 2002 may not receive the request and public server 2004 responds to mobile application 2009 with an alert that printing, copying, scanning, and the like for request 2016 is denied. Upon receipt of request 2016, private server 2002 analyzes policy 2010 to determine what documents of documents 2012 may be sent to printing device 2006. Private server 2002 also compiles or accesses ledger 2003 to determine if the action is allowed based on a remaining cost value or a remaining quota value. These features are disclosed in greater detail below. Ledger 2003 may be a record or file of all fine grained action within system 2000 that provides the status of the account for the user. For example, ledger 2003 may indicate how many pages that the user has printed in the policy-set period, costs incurred, and other statistics of actions limited by policy 2010 or the account for the user's organization.

Update 2020 also may be received at private server 2002. Update 2020 can impact policy 2010 and ledger 2003. Update 2020 may change the parameters of interest to policy 2010 or provide temporary adjustments to the policy. For example, the user may exceed his/her printing page limit by a specified number of pages for a 24 hour period. The user is attending an important off-site meeting or conference that would provide a good reason to exceed the daily printing limit. Update 2020, however, is not meant to be permanent. In the disclosed embodiments, update 2020 may be implemented in a more efficient manner by keeping policy 2010 at private server 2002 as opposed to having it stored on public server 2004. Private server 2002 does not need to update policies in the public domain or on different devices because all policy analysis and determinations may be performed at the private server. In some embodiments, update 2020 may modify policy 2010 to allow unused usage from a previous period or borrow usage from a future period for a current period.

Depending on the results of the determination, private server 2002 sends list 2022 to public server 2004. List 2022 may include names, titles, reference numbers or other indicators of approved documents 2012 for printing. In other embodiments, documents 2012 may be sent as list 2022. Documents 2012 may be sent as data files intended to reproduce the documents at printing device 2006. List 2022 may include more than one list, but is shown as a single list for brevity. Public server 2004 may analyze list 2022 to ensure it is appropriate for printing device 2006. Public server 2004 forwards list 2022 to mobile device 2008. List 2022 may be displayed on mobile device 2008 using mobile application 2009 to allow the user to select one or more listed documents to print. Mobile device 2008 using mobile application 2009 sends the selected listed document as listed document print job request 2024 to public server 2004. As disclosed below, the listed document selected by the user is retrieved from storage on public server 2004 or private server 2002. It is then sent to printing device 2006 for processing and printing.

System 2000 shows mobile device 2008 sending instructions 2014 to printing device 2006. In some embodiments, the user may interact directly with printing device 2006 to process document 2012 thereon. Use of mobile device 2008 is not required to print, copy, or scan a document at printing device 2006 or within the public domain. Further, mobile device 2008 may generate request 2016 and send it to printing device 2006. The request is forwarded to private server 2002 through public server 2004. Mobile device 2008 receives list 2022 to indicate documents which may be selected from the list to print, which is then provided to public server 2004 or printing device 2006.

Figure 16:
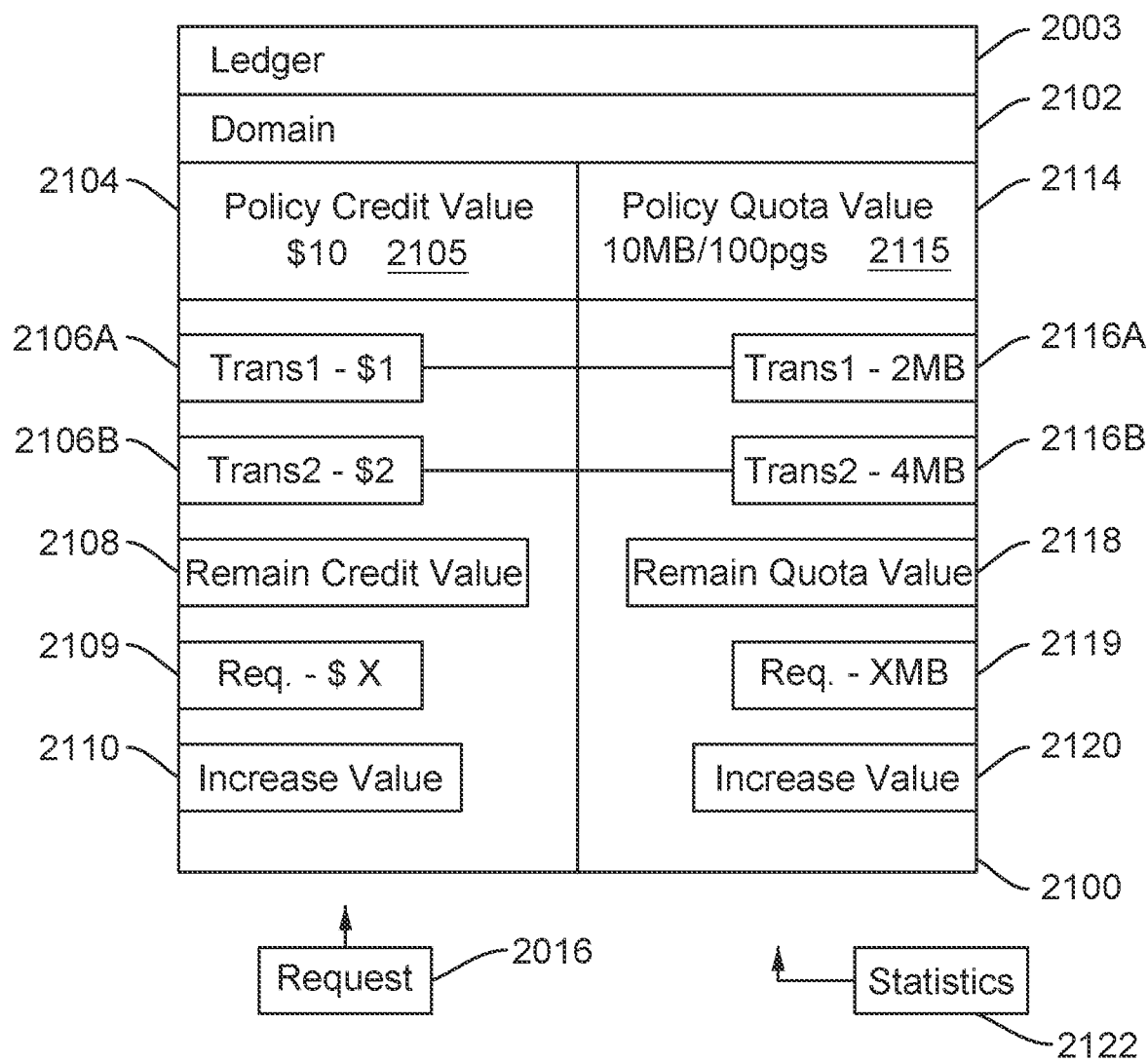
FIG. 16 illustrates a block diagram of a ledger for use in the policy-based printing system according to the disclosed embodiments.

FIG. 16 depicts ledger 2003 for use in policy-based printing operations according to the disclosed embodiments. FIG. 16 shows some of the features disclosed above in greater detail. Ledger 2003 may store information that is used in determining whether to allow a print job. Further, ledger 2003 is used to generate list 2022 of documents that may be printed by the user. Ledger 2003 may be a table or file stored on private server 2002 to record transactions generated by the user in the private or public printing domain. The fields and entries shown in ledger 2003 are for illustrative purposes only. Other means for storing the information used by ledger 2003 may be used.

Table 2100 may be in ledger 2003, which corresponds to the user. The user may belong to an organization corresponding to a domain, shown as domain 2102. Domain 2102 may be related to a URL address for private server 2002, and identified using the URL address in a request for a print job. Domain 2102 may be a field in table 2100 that stores this information. The URL address may be used by public server 2004 to identify the appropriate domain to query for print jobs for the user. Domain 2102 relates to the organization that employs or allows the user to print from private server 2002 in the public domain. Preferably, policy 2010 is used to facilitate this process.

In some embodiments, public server 2004 also may send list 2022 or a message associated thereto to printing device 2006. The response sent to mobile device 2008 also may include statistics or information regarding the status of the user's account based on ledger 2003 and policy 2010. List 2022 may be displayed on mobile device 2008 through mobile application 2009. The listed document selected by the user may be sent to printing device 2006 from mobile device 2008, which then forwards the request for the document to public server 2004. Alternatively, the listed document selected by the user may be sent directly to public server 2004 from mobile device 2008.

Table 2100 also may include fields for parameters that vary over time due to the transactions. These fields include values that are used to determine whether to allow a print job or generate list 2022. For illustrative purposes, the features of ledger 2003 will be disclosed as using printing device 2006. The same features also may apply to print jobs using a printing device in the private domain.

For the user, policy 2010 may be used to limit print jobs according to certain parameters, such as only black and white printing, security levels, and the like, disclosed above. One parameter may be costs, as shown in FIG. 4B in that the user may not exceed a certain amount of printing costs for a policy period. To track incurred costs, ledger 2003 records transactions and adjusts a remaining credit value 2108 for the user. Thus, credit field 2104 includes information to determine the remaining credit value for the user. Remaining credit value 2108 then may be used to determine which documents belong in list 2022.

Credit field 2104 includes a policy credit value 2105. Policy credit value 2105 may be set by an administrator based on factors, such as the contract with the organization, the access level of the user, budgeted usage, and the like. Policy credit value 2105 may be sent or set at ledger 2003 by the administrator or set forth in policy 2010. Policy credit value 2105 is stored in credit field 2104. For the most part, policy credit value 2105 does not change during a policy period. It sets the limit on how much the user may charge to the organization for printing. In some embodiments, policy credit value 2105 may differ for printing using printing devices in the private domain as opposed to using printing devices through public server 2004. Alternatively, policy credit value 2105 may place a limit on all printing across both services.

Print jobs for the user results in entries for the transactions being created in credit field 2104. Thus, transactions 2106A and 2106B may reflect two print jobs already performed for the user during the current policy period. Information for these transactions may include costs, time/date, device identification for the printing device, whether it is a private or public print job, and the like. When a request for a new print job or list 2022 is received, the costs of the transactions are compiled to determining remaining credit value 2108.

For example, policy credit value 2105 may be $10 for a policy period. The user may incur printing costs up to $10 before requests will be denied. Transaction 2106A incurred a cost of $1 while transaction 2106B incurred a cost of $2. Thus, remaining credit value 2108 is $7. A print job will be allowed as long as it does not cost more than $7. Ledger 2003 is notified of a pending request for list 2022, which will include documents for the user stored at private server 2002. In some embodiments, request 2016 is received from public server 2004. In other embodiments, request 2016 may be received from mobile device 2008. The request may include a request to list or provide all documents that may be printed for less than $7, or remaining credit value 2108. This feature is disclosed in greater detail below.

In some embodiments, request 2016 may be for a print job. Ledger 2003 may be used to allow the print job if enough remaining credit value is available. Estimated transaction 2109 may be the amount estimated to complete the print job, shown as X. If X is $5, then the print job will be allowed. If X is $8, then the print job will be denied as it exceeds remaining credit value 2108 or $7. In other embodiments, request 2016 may be for a scan job.

If request 2016 is received at public server 2004, then a URL address may be used to determine which domain 2102 to query with the user's information. The URL address is determined by public server 2004 based on information provided by the user, such as an email address. The email address will indicate the domain of the user, which then is used to obtain the URL address. Determination of domains may be disclosed above by FIG. 4A. Mobile application 2009 also may provide information to identify domain 2102, such as a token or code if the email address is not provided.

Table 2100 also includes quota field 2114 to determining a remaining quota value 2118 for the user. Quota value may refer to a parameter other than cost to limit printing operations for the user, such as total data or pages for print jobs during a policy period. For example, the user may be limited to printing up to 10 MB of data for a policy period. Another example may be limiting the user to printing 100 pages within a policy period. The data limit may be more applicable when the user is printing documents having complex graphics or information as opposed to text. Much like policy credit value 2105, policy quota value 2115 may be set by policy 2010 or the administrator.

Quota field 2114 also includes entries for transactions corresponding to those in credit field 2104. Thus, transaction 2116A corresponds to transaction 2106A and includes the amount of data used to accomplish the print job, which cost $1. Transaction 2116B corresponds to transaction 2106B. The corresponding transactions may share certain information such as time/data, printing location, and the like. The determination of remaining quota value 2118 also is determined by compiling the amount of data used in the previous transaction and comparing the compiled amount to policy quota value 2115. Using the above example, transaction 2116A used 2 MB of data while transaction 2116B used 4 MB of data. If using pages, then the number of pages printed may be compiled. If policy quota value 2115 is 10 MB, then remaining quota value 2118 is 4 MB.

Request 2016 is received and a list 2022 is generated as a result. Remaining quota value 2118 may be used to determine which documents to add to list 2022 in that printing the document will not cause the user to exceed policy quota value 2115 for the policy period, or whatever period is set. In some embodiments, both remaining credit value 2108 and remaining quota value 2118 may be used to filter the documents placed in list 2022. The disclosed embodiments may prevent the user from printing large amounts of data in the public domain.

In some embodiments, request 2016 may be for a print job as opposed to a request for list 2022. When the request for the new print job is received, the estimated size of the print job is shown as estimated transaction 2119. The estimated quota size may be X MB. If X is 2 MB, then the print job should be allowed. If X is 6 MB, then the print job will be denied. In some embodiments, if the estimated cost and size of the print job fails to be within the parameters for remaining credit value 2108 or remaining quota value 2118, then the print job will not be allowed. Alternatively, if the estimated cost or size is acceptable, then the print job may proceed. The appropriate notification may be generated by private server 2002 and sent to the appropriate device, either mobile device 2008 or public server 2004.

After printing operations are complete, the printing device performing the print job will generate statistics 2122 and send them to update ledger 2003. Statistics 2122 also may be sent to mobile device 2008 for the user to view in mobile application 2009. Entries will be made into credit field 2104 and quota field 2114 for the transaction. Statistics 2122 may include the actual cost and size of the print job, which may differ from the estimated amounts used in determining whether to allow the print job. Statistics 2122 may be generated for printing operations using a printing device in the public domain as well as the private domain. In some embodiments, list 2022 may be updated upon receipt of statistics 2122. For example, remaining credit value 2108 is reduced based on the new transaction such that documents are removed from list 2022 that cannot be printed for less than the new remaining credit value.

In some embodiments, the user may add to the credit or quota allocation for the period in order to perform more printing operations. Alternatively, an administrator or other third party may add to remaining credit value 2108 or remaining quota value 2118 to allow list 2022 to include more documents to print. Thus, ledger 2003 may receive increase credit value 2110 or increase quota value 2120 that increases the respective remaining values. As a result, list 2022 may be updated with the additional documents made available due to the increase. Update 2020 may include increase credit value 2110 and increase quota value 2120. The increase in remaining values may be performed using mobile application 2009. The user may submit payment information obtained at mobile device 2008 to private server 2002 to update ledger 2003.

Figure 17:
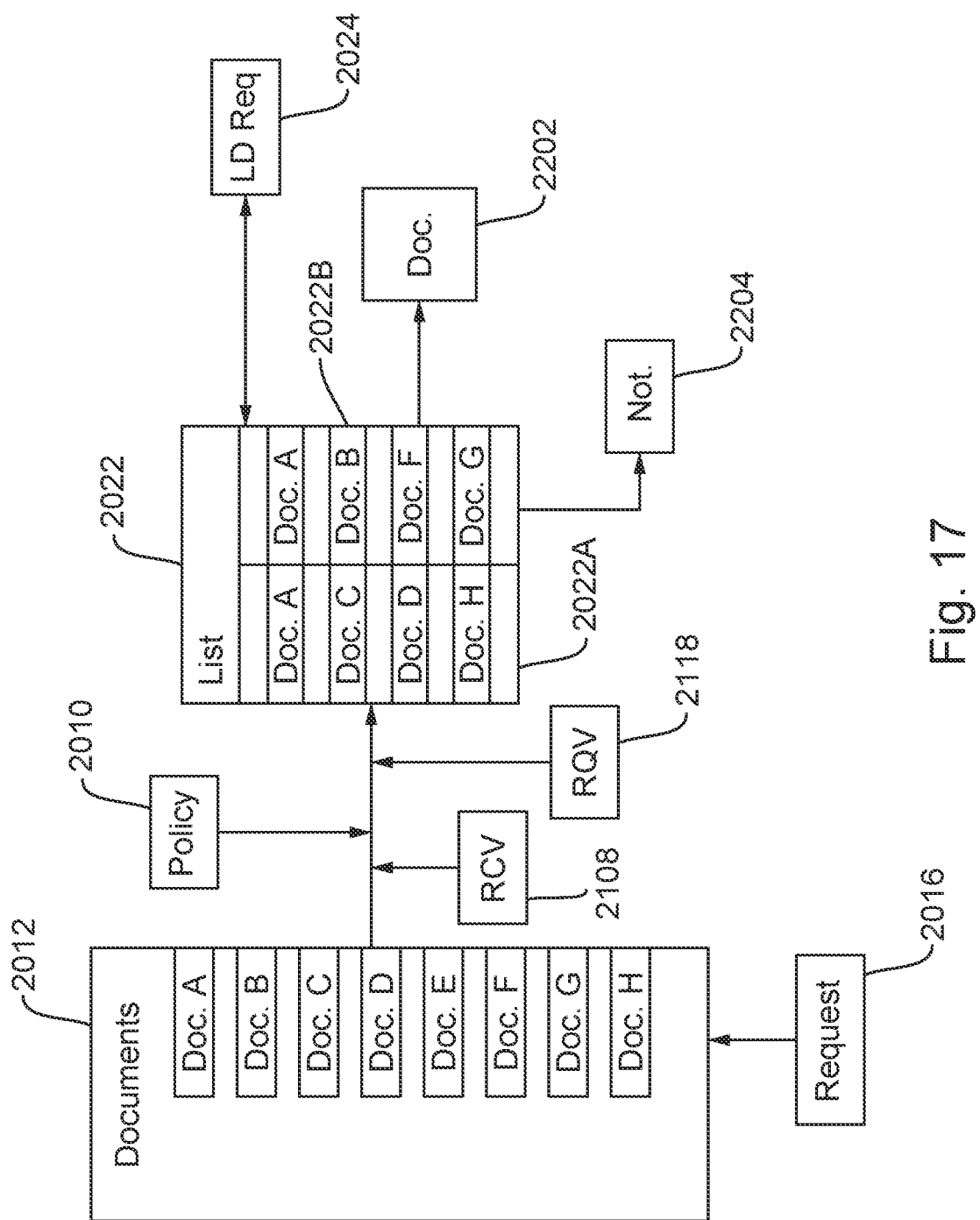
FIG. 17 illustrates a block diagram of components within the system to generate a list for use in policy-based printing operations according to the disclosed embodiments.

FIG. 17 depicts a block diagram of components within system 2000 to generate a list 2022 for use in policy-based printing operations according to the disclosed embodiments. FIG. 17 shows a plurality of documents 2012 available to print by the user being filtered to generate list 2022 of documents that the user may print based on policy 2010, remaining credit value 2108, or remaining quota value 2118. The disclosed embodiments apply these items at private server 2002 to create list 2022. Alternatively, public server 2004 may apply the items.

Documents 2012 include documents A, B, C, D, E, F, G, and H. Each one of these documents may differ in size and cost to print. For example, document A may be 20 pages with complex graphics and cost 5 to print at printing device 2006. Document H may be 2 pages of text and cost $0.50 to print. As the user prints documents within the public domain, the number of documents available to print in subsequent actions may reduce based on the terms of policy 2010 or the remaining credit values. Policy 2010 also may limit the number of documents available due to parameters set forth by the organization, such as no color printing, no printing confidential information or certain level of documents, and the like.

Request 2016 is received at private server 2002 where documents 2012 are stored. The disclosed embodiments apply policy 2010 to the documents and determines those documents which may be printed based on the information provided in request 2016. For example, request 2016 may include information about printing device 2006, such as the cost per page or per kilobyte for printing operations. It also includes user information so that the appropriate policy is applied. Request 2016 also may include limitations of the printing device itself, such as no color printing or certain sizes of paper are not available. For example, printing device 2006 may only print on letter size paper such that a map on legal size paper could not be printed.

The disclosed embodiments apply the parameters set forth in policy 2010 to filter out documents 2012. The documents that are allowed according to policy 2010 are added to list 2022. For example, documents A, C, D, and H are acceptable to print according to policy 2010. Policy 2010 will allow those documents to be printed. The parameters of policy 2010 denied printing of documents B, E, F, and G so they are not included on list 2022. These documents are shown in list 2022A.

Remaining credit value 2108 and remaining quota value 2118 also may be applied to documents 2012 with policy 2010. Alternatively, policy 2010 is not applied and only the remaining values are used to create list 2022. As noted above, ledger 2003 may be used to determine the remaining values left to the user for print jobs. If remaining credit value 2108 is 7, then documents that may be printed for 7 or less may be added to list 2022. The disclosed embodiments may estimate how much a print job is for each document based on information from printing device 2006, such as cost to print a page in black and white. The number of pages in each document is then used to determine the estimated cost, shown as 2109. This process may be repeated for each document. Further, the same process may be used for adding documents to list 2022 based on remaining quota value 2118.

For example, list 2022B may represent documents allowed to be printed on printing device 2006 based on remaining credit value 2108 or remaining quota value 2118. The documents in list 2022B will not exceed the amount allowed to the user for the period. List 2022B may include documents A, B, F, and G. Thus, list 2022B may not necessarily include all the documents in list 2022A. Just because a document may be allowed by policy 2010 does not mean it also will be allowed based on remaining values and vice versa. For example, policy 2010 may not allow color print jobs even though the credit is available to do so. Referring to FIG. 17, document A is shown as the only document that meets all the criteria set forth by policy 2010 as well as remaining credit value 2108 or remaining quota value 2118.

Either list 2022A or list 2022B may be sent to the user as list 2022. Alternatively, both lists may be sent. In any event, the user is presented with a list 2022 of documents that he/she may print at printing device 2006. The user may then select a document, shown as listed document 2202 for printing on printing device 2006. In some embodiments, list 2022 is displayed to the user on mobile device 2008 through mobile application 2009. Mobile application 2009 may include a graphical user interface to interact with the user to indicate a document from printing. Mobile application 2009 on mobile device 2008 sends a listed document print job request 2024 to retrieve document 2202 for printing.

In some embodiments, list 2022 may reside at private server 2002. Listed document print job request 2024 is received at private server 2002. As document 2202 is within list 2022, policy 2010, remaining credit value 2108, and remaining quota value 2118 need not be applied to the request. Document 2202 is already approved for printing. Private server 2002 may send document 2202 to public server 2004. Public server 2004 forward document 2202 to printing device 2006.

Alternatively, list 2022 may include the data files for the listed documents such that these documents are made available on public server 2004. Listed document print job request 2024 for document 2202 is received at public server 2004 from mobile device 2008. Public server 2004 retrieves document 2202 and sends it to printing device 2006. This feature may save actions needed to communicate with private server 2002. Further, private server 2002 may not be available to send documents such that public server 2004 manages the allowed documents in list 2022.

Once a document is retrieved from list 2022, notification 2204 may be sent to the user via mobile device 2008. Notification 2204 may indicate that the document is being sent to printing device 2006. It also may include a code to enter into printing device 2006 to print document 2202. For example, the user may not physically be next to printing device 2006 when document 2202 is sent. Notification 2204 may include a code for the user to input to printing device 2006 to print document 2202 when the user is at the printing device. In some embodiments, statistics 2122 are generated and sent to private server 2002 or public server 2004 to update list 2022.

Figure 18:
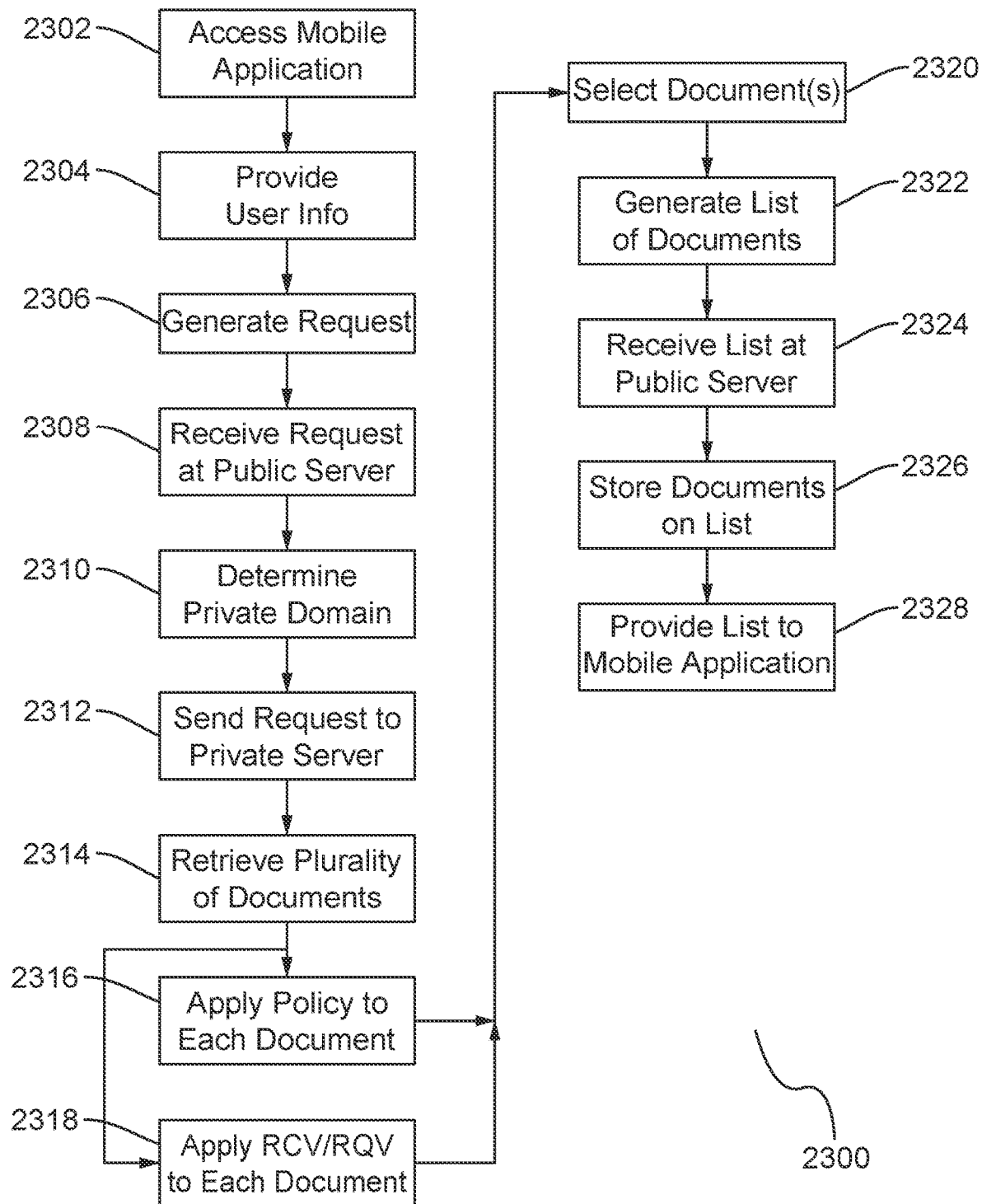
FIG. 18 illustrates a flowchart for generating a list for use within a policy-based printing system according to the disclosed embodiments.

FIG. 18 depicts a flowchart 2300 for generating list 2022 for use within policy-based printing system 2000 according to the disclosed embodiments. Flowchart 2300 may refer to the features of FIGS. 1-17 for illustrative purposes. The embodiments disclosed by flowchart 2300, however, are not limited to the features shown in FIGS. 1-17.

Step 2302 executes by accessing mobile application 2009. The user may launch mobile application 2009 on mobile device 2008. Mobile application 2009 includes a GUI to allow the user to select an action to take to manage printing operations within system 2000. One option may be to obtain a list of documents that the user may print in the public domain. The user may select this action using mobile application 2009. In some embodiments, mobile application 2009 may obtain information about printing device 2006 as a destination for print jobs. Device identification 2018 may be entered or scanned to register printing device 2006 as the destination for the print jobs for the user in the public domain.

Printing device 2006 is part of a public print service through public server 2004. The user may choose printing device 2006 to perform printing operations. In other embodiments, the user may access any printing device within the public print service through public server 2004. For example, the user may enter a location with a plurality of printing devices and access a kiosk for being printing operations. Alternatively, mobile application 2009 does not register or associate the print jobs with any printing device and only asks for a list of possible documents to print using the public print service.

Step 2304 executes by providing user information to mobile application 2009. Alternatively, the user information may be provided to mobile device 2008 using information provided from another source, such as private server 2002, the kiosk disclosed above or information from printing device 2006. Mobile application 2009 may store the user information on mobile device 2008 for use when needed in printing operations so that the user does not need to re-enter the information for each action taken within system 2000.

Step 2306 executes by generating request 2016 for a list of documents printable at printing device 2006 using mobile application 2009. In some embodiments, the list may be for documents printable within the public print service. Request 2016 may be generated at mobile device 2008.

Step 2308 executes by receiving request 2016 at public server 2004 from mobile application 2009 via mobile device 2008. Alternatively, request 2016 may be sent to printing device 2006, which then routes the request to public server 2004. Step 2310 executes by determining a private domain applicable to the user using the user information within request 2016. The user information preferably includes an email address for the user. Public server 2004 may use the email address to determine the private domain applicable to the user. The user information also may include a URL address that directs public server 2004 to the appropriate private domain. The private domain includes one or more private servers that store documents accessible by the user. Alternatively, mobile application 2009 may add information to request 2016 that indicates the private domain that is not related to an email address.

Step 2312 executes by sending request 2016 to private server 2002 associated with the private domain determined in step 2310. Request 2016 instructs private server 2002 to generate list 2022 of one or more documents 2012 associated with the user. Private server 2002 stores these documents and identifies those documents that the user may print. Not all of these documents may be printed on a public printing device. Step 2314 executes by retrieving documents 2012 associated with the user sending request 2016.

Step 2316 executes by applying policy 2010 to each document 2012 retrieved for the user. The application of policy 2010 to determine whether a document may be printed in the public domain is disclosed above. The disclosed embodiments determine whether policy 2010 will allow one or more documents 2012 to be printed based on the parameters and constraints set forth by the organization or company associated with the domain. The process of applying a policy to determine whether to allow a print job of a document is disclosed above.

Step 2318 executes by applying remaining credit value 2108 or remaining quota value 2118 to determine if one or more documents 2012 can be printed without exceeding the remaining values. This process is disclosed above by FIGS. 16 and 17. In some embodiments, steps 2316 and 2318 may be executed simultaneously. In other embodiments, step 2318 may be executed after step 2316 such that a document allowed by policy 2010 may not be allowed if the print job exceeds the remaining credit value or remaining quota value. Alternatively, only one step 2316 or 2318 may be executed. Private server 2002 may be instructed which step to execute by the organization.

Step 2320 executes by selecting one or more documents 2012 that may be printed according to step 2316 or step 2318, or both. As shown above, document A may be allowed for printing using both policy 2010 and remaining credit value 2108. Using only policy 2010, documents A, C, D, and H may be printed by the user. Step 2322 executes by generating list 2022 of approved documents for printing by the user. In some embodiments, separate lists may be generated according to different criteria. List 2022 may be stored at private server 2002 along with the corresponding request.

Steps 2314-2322 also may be executed at public server 2004. In other words, request 2016 is not sent to private server 2002. Documents 2012 may be stored at public server 2004 along with policy 2010 and ledger 2003 to determine remaining credit value 2108 or remaining quota value 2118. List 2022 may be generated at public server 2004 in the same manner. This feature may remove the need to engage and tie up private server 2002 with generating lists over and over for users.

Step 2324 executes by receiving list 2022 at public server 2004 from private server 2002, if applicable. If list 2022 is generated at private server 2002, then the list should be provided to public server 2004 as it will provide a selected document to printing device 2006. Step 2326 executes by storing any documents within list 2022 at public server 2004, if appropriate. In some embodiments, the files for the documents in list 2022 are sent as well so that these documents may be saved at public server 2004 for quick retrieval when a print job is received.

Step 2328 executes by providing list 2022 to mobile application 2009 on mobile device 2008. The user will receive list 2022 at mobile device 2008, which sent request 2016. In some embodiments, mobile application 2009 may display list 2022 on mobile device 2008 upon receipt from public server 2004. Mobile application 2009 may store list 2022 on mobile device 2008 for retrieval at a later time. The user may view list 2022 to select a document for printing when he/she is ready. Alternatively, list 2022 also may be sent to printing device 2006 such that the user view the list on the printing device.

Figure 19:
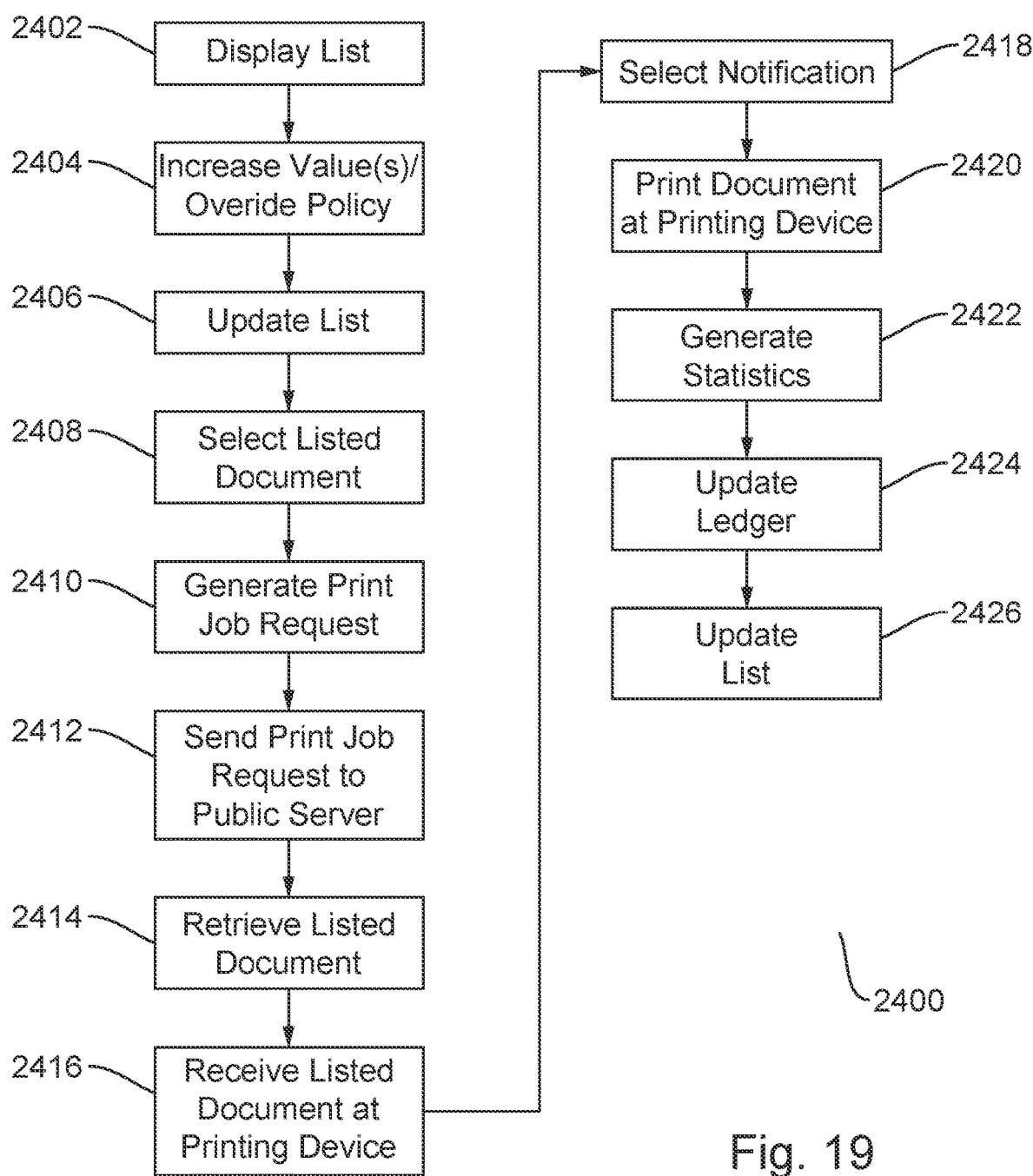
FIG. 19 illustrates a flowchart for using a list to print a document at the printing device according to the disclosed embodiments.

FIG. 19 illustrates a flowchart 2400 for using list 2022 to print document 2202 at printing device 2006 according to the disclosed embodiments. Flowchart 2400 may refer to the features of FIGS. 1-18 for illustrative purposes. The embodiments disclosed by flowchart 2400, however, are not limited to the features shown in FIGS. 1-18.

Step 2402 executes by displaying list 2022 on mobile device 2008 using mobile application 2009. The documents in list 2022 are made available to the user so that the user may browse the list to search for a document to print. The graphical user interface for mobile application 2009 may allow the user to scroll through list 2022 as well as bring up information about each document, such as page numbers, file size, estimated cost to print, and the like. Alternatively, list 2022 may be displayed on printing device 2006 so that the user may browse the documents thereon.

Step 2404 executes by increasing credit value or overriding policy 2010, if available. In some embodiments, an option may be presented to the user to add value to his/her account by payment so that the number of documents available in list 2022 increases accordingly. For example, if remaining credit value 2108 is $7 based on the example above, the user may add $3 to the account to increase the remaining credit value to $10. Thus, documents costing more than $7 may become available for printing within system 2000. Alternatively, the user may be able to override the restrictions applied by policy 2010 to printing operations. The user may have a code or other means to override the parameter constraints of policy 2010. The override code may be entered into mobile device 2008 using mobile application 2009 and sent to public server 2004 for verification. Step 2406 executes by updating list 2022 in response to any action taken in step 2404. If the remaining credit value is increased or the override approved, then list 2022 may be updated accordingly using the processes disclosed above with reference to flowchart 2300.

Step 2408 executes by selecting a listed document 2202 from list 2022 for printing. The user may indicate one or more documents to print that fit within the constraints and parameters applied when generating list 2022. Listed document 2202 may be selected by highlighting the selection on list 2022. Step 2410 executes by generating a print job request 2024 for listed document 2202 using mobile application 2009 executing on mobile device 2008. Print job request 2024 may be like a typical print job request sent to retrieve a document from public server 2004.

Step 2412 executes by sending print job request 2024 to public server 2004 from mobile device 2008. Print job request 2024 is sent to public server 2004 instead of directly to a private server, such as private server 2002, as mobile device 2008 may not have a direct connection to the private domain past firewall 2011 while in the public domain. In some embodiments, print job request 2024 may be generated using mobile application 2009 and sent via printing device 2006.

Step 2414 executes by retrieving listed document 2202 for printing based on the print job request. In some embodiments, print job request 2024 is passed from public server 2004 to private server 2002 to retrieve listed document 2202. Listed document 2202 is stored on private server 2002. Because the document is selected from list 2022, private server 2002 does not need to apply policy 2010 or use ledger 2003 to approve the print job. Private server 2002 may send the data file for listed document 2202 to public server 2004.

Alternatively, step 2414 may retrieve listed document 2202 from public server 2004. As noted above, the data files for documents on list 2022 may be sent from private server 2002 and stored at public server 2004 to allow easier access for printing operations. Thus, public server 2004 process print job request 2024 and retrieves the requested document without the need to involve private server 2002. Thus, the disclosed embodiments may reduce the number of actions needed to fulfill print job requests from printing device 2006 by using list 2022 in conjunction with public server 2004.

Step 2416 executes by receiving listed document 2202 at public server 2004. Public server 2004 may receive listed document 2202 from private server 2002. If listed document 2202 is stored on public server 2004, then this step may be skipped. In some embodiments, public server 2004 may retrieve documents from another server in the public print service.

Step 2418 executes by sending notification 2204 to the user that listed document 2202 is ready to print. Notification 2204 may be sent to mobile device 2008 and displayed using mobile application 2009. Notification 2204 may include a code to enter at printing device 2006 to launch printing of listed document 2202. The code may be used so that only the user may print listed document 2202. For example, printing device 2006 may be in a public location having many printing devices operated by a kiosk. The user enters the code from notification 2204 upon arrival at the public location so that the document is not made available without the user present. Printing device 2006 also may receive the code associated with listed document 2202.

Step 2420 executes by printing listed document 2202 at printing device 2006. If using a code from notification 2204, then printing device 2006 may verify the code to listed document 2202 to print. Step 2422 executes by generating statistics 2122 for the print job of listed document 2202. Statistics may include the number of pages printed, costs accrued, data used, type of paper used, color or black and white printing, and the like. Statistics 2122 may be sent to public server 2004 as well as mobile device 2008. If applicable, then statistics 2122 also are sent to private server 2002.

Step 2424 executes by updating ledger 2003 with statistics 2122 for the print job of listed document 2202. As disclosed above, completed print jobs are entered as transactions in ledger 2003. Thus, an entry will be created for the completed print job using the data from statistics 2122. Further, remaining credit value 2108 or remaining quota value 2118 is adjusted accordingly so that these values reflect the amount now available for the user. Step 2426 executes by updating list 2022 accordingly. List 2022 may remove those documents that are not allowed due to the updated remaining credit value 2108 or remaining quota value 2118. The updated list may be sent to public server 2004. In other embodiments, public server 2004 may update list 2022 using a ledger 2003 thereon. This feature may reduce the number of actions needed between public server 2004 and private server 2002.

In some embodiments, only policy 2010 is applied to generate list 2022. No remaining credit value 2108 or remaining quota value 2118 is used. Thus, no update of list 2022 is needed after a print job is completed. List 2022, however, may be updated when policy 2010 is changed or updated.

According to the disclosed embodiments, the number of applications of a policy or other constraints to a user for public domain printing may be reduced using a list generated beforehand and provided to the user. The list may reduce the number of denials to the user for print jobs. It also gives a clear indication to the user what is available to print in the public domain so that he/she may take action before commencing printing operations to make other documents available. The disclosed embodiments also may reduce the number of interactions between the public server and the private server. By using a mobile application, the selection of documents to print in the public domain is made simpler.

In some embodiments, it may be preferred to provide a list of documents already approved by the policy so that the policy-based printing system does not need to validate every print request. The user then may select a document from the list to print at a printing device. The private server may generate the list by applying the policy to a set of documents for the user as well as other criteria for printing the documents. The approved documents may be kept at the private server or sent to the public server so that when a document is selected from the list, it may be printed without the need for the private server. Further, the list may include documents that, if a parameter is modified, then these documents are available for printing.

Figure 20:
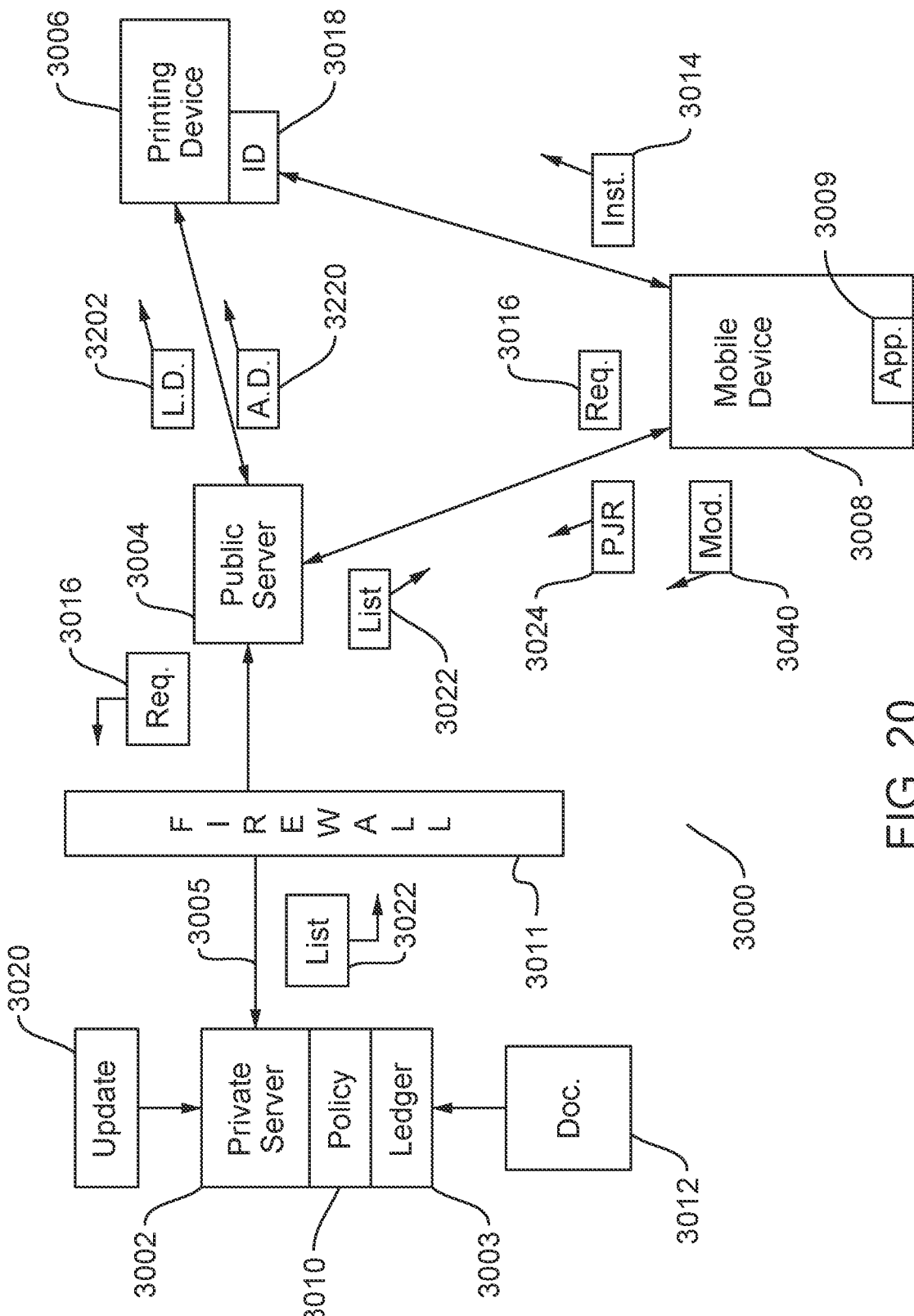
FIG. 20 illustrates a policy-based printing system to implement policy-based printing using a private server and a public server according to the disclosed embodiments.

FIG. 20 illustrates a policy-based system 3000 to implement policy-based printing using a private server 3002 and a public server 3004 according to the disclosed embodiments. System 3000 may reduce development and maintenance responsibilities in multiple components in the system and provide additional security with an advanced policy. In some embodiments, a private server at the corporate office, or private domain, has the policy set by an administrator. The policy changes frequently and becomes more complex with each evolution of software within the printing system or on the devices.

On the private server, a ledger may exist that records all the actions performed by end users who are printing, copying, scanning, and the like within system 3000. The users may utilize printing devices and servers in a public domain such that they perform actions outside the normal corporate environment. A public server may serve as a gateway to the private domain. It may have open websocket bi-directional communication with the private server, as disclosed above. The printing device is connected to the public server to request and receive documents to print. At times, the documents may come from the private server.

FIG. 20 shows a policy-based system 3000 having a private server 3002, a public server 3004, a printing device 3006, and a mobile device 3008. These components of the system may be disclosed above with regard to FIGS. 1-9. In system 3000, private server 3002 may refer to any of the servers in the private domain, such as private authentication server 124, private job server 126, and private policy server 128 of private domain 120 shown in FIG. 1. Private server 3002 may be used in system 3000 to represent any server or group of servers in a private domain, as disclosed above. Private server 3002 may be separated from servers and printing devices in public domains by firewall 3011. Private server 3002 also stores and applies policy 3010. Policy 3010 may correspond to policy 142 disclosed above.

Public server 3004 may refer to any of the servers in the public domain, such as public file server 114 and public policy server 112 of public domain 110 shown in FIG. 1. Public server 3004 may be accessible by a plurality of printing devices, including printing device 3006. In the public domain, public server 3004 may manage print jobs going to various printing devices. It also may include a connection to private server 3002, which has been verified and authenticated according to the processes disclosed above. For example, a websocket connection 3005 may exist between private server 3002 and public server 3004. Public server 3004 also may interact with mobile device 3008.

Printing device 3006 may receive documents from public server 3004 as well as other sources to print, modify, and the like. The features of printing devices according to the disclosed embodiments are disclosed above. Printing device 3006 may include device identification 3018 that indicates a unique identifier within system 3000. In some embodiments, device identification 3018 may be a number, alphanumeric characters, or a combination thereof. Public server 3004 may send documents and files to printing device 3006 based on device identification 3018.

Mobile device 3008 may be a mobile phone or smartphone, tablet, laptop, desktop computer, and the like. Mobile device 3008 may move between the private domain and the public domain, as separated by firewall 3011. It also may access private server 3002 as well as public server 3004. A user may send and receive data from the servers at user device 3008. Mobile device 3008 also may send instructions 3014 to printing device 3006 to print, copy, scan, and the like stored documents from private server 3002. In some embodiments, the user inputs instructions 3014 into printing device 3006 to retrieve a list of documents available to print based on the user's permissions set forth in the private domain. In other embodiments, mobile device 3008 sends the instructions to printing device 3006.

Mobile device 3008 includes mobile application 3009 to manage print jobs within system 3000. Mobile application 3009 may send and receive information to public server 3004 or printing device 3006. For example, mobile application 3009 may send a selection by the user of mobile device 3008 to print a document. Mobile application 3009 also may display information regarding print jobs on mobile device 3008. In some embodiments, mobile application 3009 is launched or executed on mobile device 3008 to configure the mobile device into a special purpose machine to manage printing operations within system 3000.

Private server 3002 may upload one or more documents 3012. Documents 3012 may be data files stored on private server 3002 for retrieval within system 3000. Documents 3012 include data and information that is transmitted to devices within the private domain. The user of mobile device 3008 may upload documents 3012 within the private domain. Documents 3012, however, may be processed and printed at devices outside the private domain and not necessarily at devices connected to private server 3002. Policy 3010 also may be used to determine how and if documents 3012 are used within system 3000 outside the private domain.

The user may authenticate mobile device 3008 to public server 3004 according to the disclosed embodiments. For example, mobile device 3008 may provide verification data, such as a user/account name and password, to verify the user to public server 3004. Public server 3004 may use this information to verify the user to private server 3002. This process may be disclosed above with regard to verification between public policy server 112 and private authentication server 124. Alternatively, the verification data may be a token used by mobile device 3008 to authenticate the user in a public domain. Upon authentication, websocket connection 3005 may be established to allow open bi-directional communication between private server 3002 and public server 3004 on behalf of the user for mobile device 3008.

In some embodiments, printing device 3006 receives instructions 3014 from the user or mobile device 3008 to access documents 3012. Electronic copies of documents 3012 may be sent to printing device 3006 to process and print, copy, scan, and the like. The user also may modify the electronic copies. In summary, one or more documents stored on private server 3002 are made available to print on a public device as managed by mobile application 3009 on mobile device 3008.

Before receiving documents 3012, mobile application 3009 in conjunction with public server 3004 and private server 3002 may determine whether any action on behalf of the user is allowed at the printing device. An action by printing device 3006 is a simple operation of print, copy, scan, and the like. It may be measured in the smallest scale possible, such as a single page at a time. Thus, mobile device 3008 may send request 3016 to public server 3004, which is then forwarded to private server 3002. Mobile device 3008 does not do any analysis of policy 3010. Private server 3002 applies policy 3010 to determine whether printing operations allowed on behalf of the user at printing device 3006, as disclosed above by FIG. 3.

In some embodiments, request 3016 is used to obtain a list 3022 of documents 3012 that are available to the user for printing at printing device 3006. Private server 3002 may apply policy 3010 to the documents associated with the user to determine which ones can be printed outside the private domain. For example, policy 3010 may include a parameter that indicates the user may not color print outside the office, or private domain. The user is limited to printing documents in black and white, or greyscale, in the public domain. Thus, policy 3010 will not allow color documents on list 3022 provided to the user through mobile application 3009.

In other embodiments, the parameter set forth by policy 3010 may include a total cost that may be incurred by the user or the organization using public print services. Thus, print jobs of documents on private server 3002 that cause the user to exceed this limit may not be placed in list 3022. The user may not select these documents for printing at printing device 3006. The process of generating list 3022 is disclosed in greater detail below.

Public server 3004 receives request 3016 pertaining to the user instructions from mobile application 3009 to access documents 3012. Public server 3004 may forward request 3016 without further processing. In other embodiments, public server 3004 may determine whether request 3016 is acceptable to private server 3002. Public server 3004 also may perform tasks on behalf of private server 3002, such as store list 3022 or documents to be sent to the printing devices. Public server 3004 also may track print jobs to completion. Upon receipt of responses from private server 3002, public server 3004 may forward documents 3012 or provide further instructions to printing device 3006 or mobile application 3009.

Private server 3002 receives request 3016 from public server 3004 via websocket connection 3005. If no websocket connection exists, then private server 3002 may not receive the request and public server 3004 responds to mobile application 3009 with an alert that printing, copying, scanning, and the like for request 3016 is denied. Upon receipt of request 3016, private server 3002 analyzes policy 3010 to determine what documents of documents 3012 may be sent to printing device 3006. Private server 3002 also compiles or accesses ledger 3003 to determine if the action is allowed based on a remaining cost value or a remaining quota value. These features are disclosed in greater detail below. Ledger 3003 may be a record or file of all fine grained action within system 3000 that provides the status of the account for the user. For example, ledger 3003 may indicate how many pages that the user has printed in the policy-set period, costs incurred, and other statistics of actions limited by policy 3010 or the account for the user's organization.

Update 3020 also may be received at private server 3002. Update 3020 can impact policy 3010 and ledger 3003. Update 3020 may change the parameters of interest to policy 3010 or provide temporary adjustments to the policy. For example, the user may exceed his/her printing page limit by a specified number of pages for a 24 hour period. The user is attending an important off-site meeting or conference that would provide a good reason to exceed the daily printing limit. Update 3020, however, is not meant to be permanent. In the disclosed embodiments, update 3020 may be implemented in a more efficient manner by keeping policy 3010 at private server 3002 as opposed to having it stored on public server 3004. Private server 3002 does not need to update policies in the public domain or on different devices because all policy analysis and determinations may be performed at the private server. In some embodiments, update 3020 may modify policy 3010 to allow unused usage from a previous period or borrow usage from a future period for a current period.

Depending on the results of the determination, private server 3002 sends list 3022 to public server 3004. List 3022 may include a copies of approved documents 3012 for printing. Documents 3012 may be sent as data files intended to reproduce the documents at printing device 3006. List 3022 may include more than one list, but is shown as a single list for brevity. Public server 3004 may analyze list 3022 to ensure it is appropriate for printing device 3006. Public server 3004 forwards list 3022 to mobile device 3008. List 3022 may be displayed on mobile device 3008 using mobile application 3009 to allow the user to select one or more listed documents to print. Mobile device 3008 using mobile application 3009 sends the selected listed document as listed document print job request 3024 to public server 3004. As disclosed below, the listed document selected by the user is retrieved from storage on public server 3004 or private server 3002. It is then sent to printing device 3006 for processing and printing.

In some embodiments, public server 3004 also may send list 3022 or a message associated thereto to printing device 3006. Instead of being sent to mobile application 3009, list 3022 is displayed at printing device 3006. Request 3016 also may be generated at printing device 3006 such that mobile device 3008 is not used in printing operations. The user may enter information at printing device 3006 to generate request 3016 and send it to public server 3004. Public server 3004 then interacts with private server 3002 as disclosed above to obtain list 3022. List 3022 is provided to printing device 3006 such that the user interacts there to select a document to print. Printing device 3006 may include the functionality disclosed herein for the mobile application 3009 and mobile device 3008.

The response sent to mobile device 3008 or printing device 3006 also may include statistics or information regarding the status of the user's account based on ledger 3003 and policy 3010. List 3022 may be displayed on mobile device 3008 through mobile application 3009 or on an operations panel on printing device 3006 as well as a kiosk attached to printing device 3006. The listed document selected by the user may be sent to printing device 3006 from mobile device 3008, which then forwards the request for the document to public server 3004. Alternatively, the listed document selected by the user may be sent directly to public server 3004 from mobile device 3008.

System 3000 shows mobile device 3008 sending instructions 3014 to printing device 3006. In some embodiments, the user may interact directly with printing device 3006 to process document 3012 thereon. Use of mobile device 3008 is not required to print, copy, or scan a document at printing device 3006 or within the public domain. Further, mobile device 3008 may generate request 3016 and send it to printing device 3006. The request is forwarded to private server 3002 through public server 3004. Mobile device 3008 receives list 3022 to indicate documents which may be selected from the list to print, which is then provided to public server 3004 or printing device 3006.

As disclosed above, the functions of mobile application 3009 and mobile device 3008 may be performed on printing device 3006. The user may interact with the public print service using printing device 3006.

In some embodiments, list 3022 may include two or more sets of documents to display for printing operations. The first set may include documents allowed to be printed by policy 3010 without modification. These documents may be printed at printing device 3006 without changing any of the parameters set forth in policy 3010. The second and subsequent sets of documents may not be printed according to the parameters in policy 3010. For example, policy 3010 may include a parameter whether the user may color print, such as color parameter 450 shown in FIG. 4B. The first set of documents available to print in list 3022 are documents that do not require color printing. The user may indicate that documents not available to print in black and white be converted or access converted documents that are black and white. Thus, list 3022 may include both sets of documents.

In some embodiments, the user may modify the parameter setting at mobile application 3009 or printing device 3006 and list 3022 is updated using the process disclosed above. In other embodiments, the second set of documents is made available in list 3022 shown to the user with features to allow the user to select a document to print that does not include the non-allowed parameter. This feature is shown in greater detail below.

Thus, modification 3040 may be sent from mobile application 3009 or printing device 3006 to public server 3004 to make additional documents available for printing. Modification 3040 may be sent with request 3016 so that private server 3002 compiles list 3022 once with both sets of documents. Alternatively, the user may send modification 3040 for the parameter after receiving list 3022 and not seeing a desired document available for printing.

Alternate document 3220 may be printed from the second set of documents. Alternate document 3220 is a version of an original document in documents 3012 that has been modified to meet the parameters of policy 3010. For example, alternate document 3220 may be a black and white (or greyscale) version of a color document that meets the color parameter requirement of policy 3010. Alternatively, alternate document 3220 may be a text document having graphics removed in order to meet a parameter in policy 3010 or any constraints due to costs or quotas placed on the user for public printing.

Figure 21:
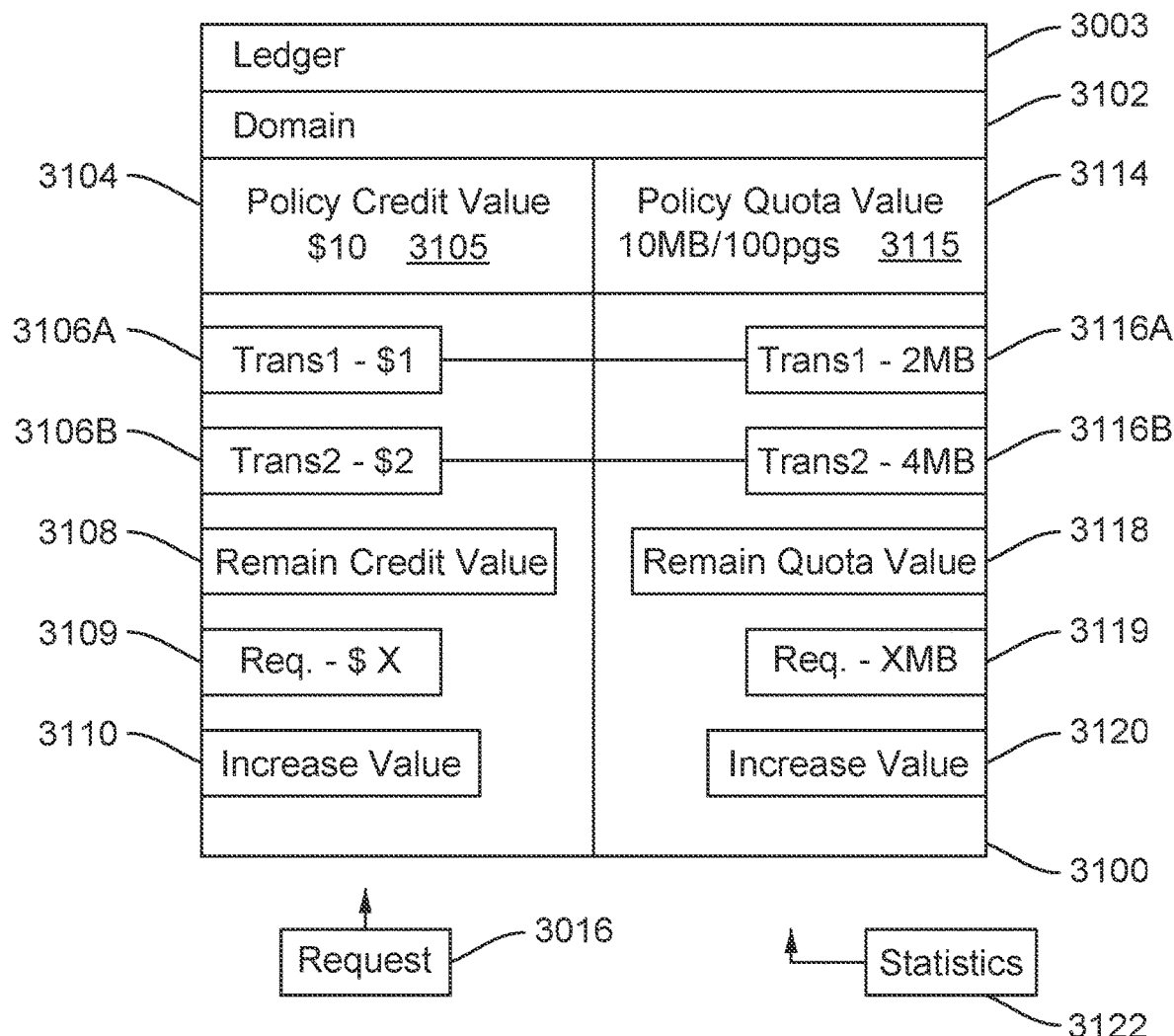
FIG. 21 illustrates a block diagram of a ledger for use in the policy-based printing system according to the disclosed embodiments.

FIG. 21 depicts ledger 3003 for use in policy-based printing operations according to the disclosed embodiments. FIG. 21 shows some of the features disclosed above in greater detail. Ledger 3003 may store information that is used in determining whether to allow a print job. Further, ledger 3003 is used to generate list 3022 of documents that may be printed by the user. Ledger 3003 may be a table or file stored on private server 3002 to record transactions generated by the user in the private or public printing domain. The fields and entries shown in ledger 3003 are for illustrative purposes only. Other means for storing the information used by ledger 3003 may be used.

Table 3100 may be in ledger 3003, which corresponds to the user. The user may belong to an organization corresponding to a domain, shown as domain 3102. Domain 3102 may be related to a URL address for private server 3002, and identified using the URL address in a request for a print job. Domain 3102 may be a field in table 3100 that stores this information. The URL address may be used by public server 3004 to identify the appropriate domain to query for print jobs for the user. Domain 3102 relates to the organization that employs or allows the user to print from private server 3002 in the public domain. Preferably, policy 3010 is used to facilitate this process.

Table 3100 also may include fields for parameters that vary over time due to the transactions. These fields include values that are used to determine whether to allow a print job or generate list 3022. For illustrative purposes, the features of ledger 3003 will be disclosed as using printing device 3006. The same features also may apply to print jobs using a printing device in the private domain.

For the user, policy 3010 may be used to limit print jobs according to certain parameters, such as only black and white printing, security levels, and the like, disclosed above. One parameter may be costs, as shown in FIG. 4B in that the user may not exceed a certain amount of printing costs for a policy period. To track incurred costs, ledger 3003 records transactions and adjusts a remaining credit value 3108 for the user. Thus, credit field 3104 includes information to determine the remaining credit value for the user. Remaining credit value 3108 then may be used to determine which documents belong in list 3022.

Credit field 3104 includes a policy credit value 3105. Policy credit value 3105 may be set by an administrator based on factors, such as the contract with the organization, the access level of the user, budgeted usage, and the like. Policy credit value 3105 may be sent or set at ledger 3003 by the administrator or set forth in policy 3010. Policy credit value 3105 is stored in credit field 3104. For the most part, policy credit value 3105 does not change during a policy period. It sets the limit on how much the user may charge to the organization for printing. In some embodiments, policy credit value 3105 may differ for printing using printing devices in the private domain as opposed to using printing devices through public server 3004. Alternatively, policy credit value 3105 may place a limit on all printing across both services.

Print jobs for the user results in entries for the transactions being created in credit field 3104. Thus, transactions 3106A and 3106B may reflect two print jobs already performed for the user during the current policy period. Information for these transactions may include costs, time/date, device identification for the printing device, whether it is a private or public print job, and the like. When a request for a new print job or list 3022 is received, the costs of the transactions are compiled to determining remaining credit value 3108.

For example, policy credit value 3105 may be $10 for a policy period. The user may incur printing costs up to $10 before requests will be denied. Transaction 3106A incurred a cost of $1 while transaction 3106B incurred a cost of $2. Thus, remaining credit value 3108 is $7. A print job will be allowed as long as it does not cost more than $7. Ledger 3003 is notified of a pending request for list 3022, which will include documents for the user stored at private server 3002. In some embodiments, request 3016 is received from public server 3004. In other embodiments, request 3016 may be received from mobile device 3008. The request may include a request to list or provide all documents that may be printed for less than $7, or remaining credit value 3108. This feature is disclosed in greater detail below.

In some embodiments, request 3016 may be for a print job. Ledger 3003 may be used to allow the print job if enough remaining credit value is available. Estimated transaction 3109 may be the amount estimated to complete the print job, shown as X. If X is $5, then the print job will be allowed. If X is $8, then the print job will be denied as it exceeds remaining credit value 3108 or $7. In other embodiments, request 1016 may be for a scan job.

If request 3016 is received at public server 3004, then a URL address may be used to determine which domain 3102 to query with the user's information. The URL address is determined by public server 3004 based on information provided by the user, such as an email address. The email address will indicate the domain of the user, which then is used to obtain the URL address. Determination of domains may be disclosed above by FIG. 4A. Mobile application 3009 also may provide information to identify domain 3102, such as a token or code if the email address is not provided.

Table 3100 also includes quota field 3114 to determining a remaining quota value 3118 for the user. Quota value may refer to a parameter other than cost to limit printing operations for the user, such as total data or pages for print jobs during a policy period. For example, the user may be limited to printing up to 10 MB of data for a policy period. Another example may be limiting the user to printing 100 pages within a policy period. The data limit may be more applicable when the user is printing documents having complex graphics or information as opposed to text. Much like policy credit value 3105, policy quota value 3115 may be set by policy 3010 or the administrator.

Quota field 3114 also includes entries for transactions corresponding to those in credit field 3104. Thus, transaction 3116A corresponds to transaction 3106A and includes the amount of data used to accomplish the print job, which cost $1. Transaction 3116B corresponds to transaction 3106B. The corresponding transactions may share certain information such as time/data, printing location, and the like. The determination of remaining quota value 3118 also is determined by compiling the amount of data used in the previous transaction and comparing the compiled amount to policy quota value 3115. Using the above example, transaction 3116A used 2 MB of data while transaction 3116B used 4 MB of data. If using pages, then the number of pages printed may be compiled. If policy quota value 3115 is 10 MB, then remaining quota value 3118 is 4 MB.

Request 3016 is received and a list 3022 is generated as a result. Remaining quota value 3118 may be used to determine which documents to add to list 3022 in that printing the document will not cause the user to exceed policy quota value 3115 for the policy period, or whatever period is set. In some embodiments, both remaining credit value 3108 and remaining quota value 3118 may be used to filter the documents placed in list 3022. The disclosed embodiments may prevent the user from printing large amounts of data in the public domain.

In some embodiments, request 3016 may be for a print job as opposed to a request for list 3022. When the request for the new print job is received, the estimated size of the print job is shown as estimated transaction 3119. The estimated quota size may be X MB. If X is 2 MB, then the print job should be allowed. If X is 6 MB, then the print job will be denied. In some embodiments, if the estimated cost and size of the print job fails to be within the parameters for remaining credit value 3108 or remaining quota value 3118, then the print job will not be allowed. Alternatively, if the estimated cost or size is acceptable, then the print job may proceed. The appropriate notification may be generated by private server 3002 and sent to the appropriate device, either mobile device 3008 or public server 3004.

After printing operations are complete, the printing device performing the print job will generate statistics 3122 and send them to update ledger 3003. Statistics 3122 also may be sent to mobile device 3008 for the user to view in mobile application 3009. Entries will be made into credit field 3104 and quota field 3114 for the transaction. Statistics 3122 may include the actual cost and size of the print job, which may differ from the estimated amounts used in determining whether to allow the print job. Statistics 3122 may be generated for printing operations using a printing device in the public domain as well as the private domain. In some embodiments, list 3022 may be updated upon receipt of statistics 3122. For example, remaining credit value 3108 is reduced based on the new transaction such that documents are removed from list 3022 that cannot be printed for less than the new remaining credit value.

In some embodiments, the user may add to the credit or quota allocation for the period in order to perform more printing operations. Alternatively, an administrator or other third party may add to remaining credit value 3108 or remaining quota value 3118 to allow list 3022 to include more documents to print. Thus, ledger 3003 may receive increase credit value 3110 or increase quota value 3120 that increases the respective remaining values. As a result, list 3022 may be updated with the additional documents made available due to the increase. Update 3020 may include increase credit value 3110 and increase quota value 3120. The increase in remaining values may be performed using mobile application 3009. The user may submit payment information obtained at mobile device 3008 to private server 3002 to update ledger 3003.

Figure 22:
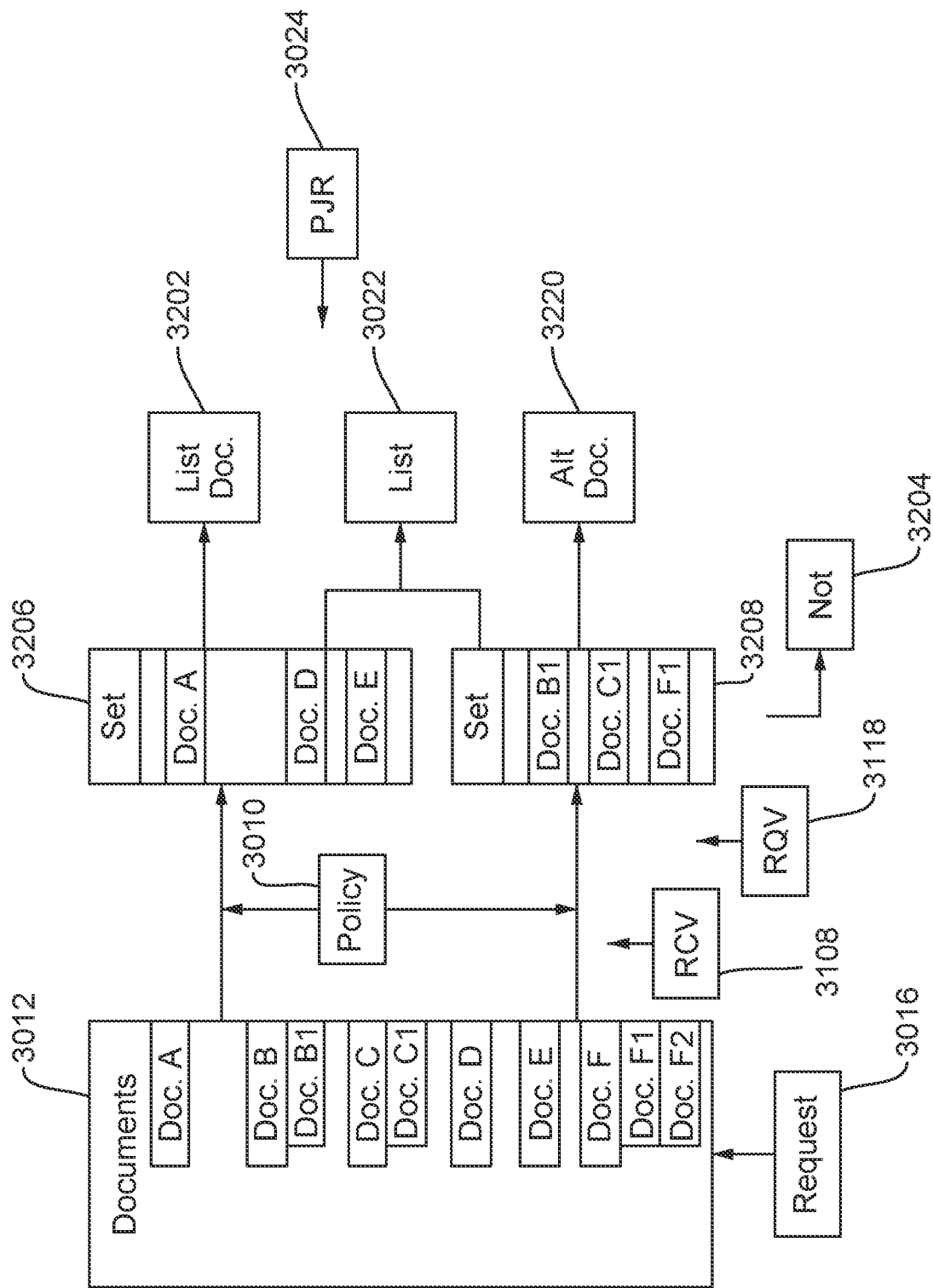
FIG. 22 illustrates a block diagram of components within the system to generate a list for use in policy-based printing operations according to the disclosed embodiments.

FIG. 22 depicts a block diagram of components within system 3000 to generate a list 3022 for use in policy-based printing operations according to the disclosed embodiments. FIG. 22 shows a plurality of documents 3012 available to print by the user being filtered to generate list 3022 of documents that the user may print based on policy 3010, remaining credit value 3108, or remaining quota value 3118.

The disclosed embodiments apply these items at private server 3002 to create list 3022. Alternatively, public server 3004 may apply these items.

Documents 3012 include documents A, B, C, D, E, and F. Each one of these documents may differ in size and cost to print. For example, document A may be 20 pages with complex graphics and cost $5 to print at printing device 3006. Document F may be 2 pages of text and cost $0.50 to print. As the user prints documents within the public domain, the number of documents available to print in subsequent actions may reduce based on the terms of policy 3010 or the remaining credit values. Policy 3010 also may limit the number of documents available due to parameters set forth by the organization, such as no color printing, no printing confidential information or certain level of documents, and the like.

Alternate versions of some documents may be available through printing system 3000. For example, document B may include alternate document B1, document C may include alternate document C1, and document F may include alternate document F1 and alternate document F2. Documents A, D, and E may not have alternate versions. The alternate versions may be modified corresponding to a parameter so that the document meets the requirements of policy 3010. For example, documents B, C, and F may be color documents that are not printable on the public print service. Alternate documents B1, C1, and F1 may be black and white versions of the original documents that are available to print in the public domain. Alternate document F2 may be a text only document with graphics removed to meet the requirements of policy 3010.

In some embodiments, the alternate versions may be lower cost versions of the original documents. Again, the alternate versions may be cheaper because they are in black and white or text only so that they can be printed within the constraints imposed by remaining credit value 3108 or remaining quota value 3118.

Request 3016 is received at private server 3002 where documents 3012 are stored. The disclosed embodiments apply policy 3010 to the documents and determines those documents which may be printed based on the information provided in request 3016. For example, request 3016 may include information about printing device 3006, such as the cost per page or per kilobyte for printing operations. It also includes user information so that the appropriate policy is applied. Request 3016 also may include limitations of the printing device itself, such as no color printing or certain sizes of paper are not available. For example, printing device 3006 may only print on letter size paper such that a map on legal size paper could not be printed.

The disclosed embodiments apply the parameters set forth in policy 3010 to filter out documents 3012. The documents that are allowed according to policy 3010 are identified and added to a set of documents 3206. For example, documents A, D, and E are acceptable to print for the user according to policy 3010. Policy 3010 will allow those documents to be printed at printing device 3006. The parameters of policy 3010 deny the printing of documents B, C, and F so they are not included in set of documents 3206.

Remaining credit value 3108 and remaining quota value 3118 also may be applied to documents 3012 with policy 3010. Alternatively, policy 3010 is not applied and only the remaining values are used to create set of documents 3206. As noted above, ledger 3003 may be used to determine the remaining values left to the user for print jobs. If remaining credit value 3108 is $7, then documents that may be printed for $7 or less may be added to set of documents 3206. The disclosed embodiments may estimate how much a print job is for each document based on information from printing device 3006, such as cost to print a page in black and white. The number of pages in each document is then used to determine the estimated cost, shown as 3109. This process may be repeated for each document. Further, the same process may be used for adding documents to set of documents 3206 based on remaining quota value 3118.

The disclosed embodiments also create set of documents 3208 by identifying and adding documents that meet the requirements of policy 3010 but are not the original documents stored at private server 3002. A parameter may be modified that corresponds to set of documents 3208 so that these documents comply with the parameter restrictions of policy 3010. For example, if the parameter modified is color to black and white, then different versions of the original documents are available to print. Set of documents 3208, therefore, includes documents B1, C1, and F1. Should the user desire to modify a parameter within the document, these documents become available for printing at printing device 3006. If the user does not desire to modify a parameter for printing operations, then set of documents 3208 do not become available.

Additional sets of documents may be created by modifying another parameter of the documents that allows these versions to be printed according to policy 3010. For example, documents may be modified to be text only. In other words, graphics and pictures may be removed from the documents to reduce the costs of printing on printing device 3006. Referring to documents 3012, document F may include two versions of the original document. Document F1 may be in black and white instead of color. Document F2 may go further and remove graphics and pictures from the document. This feature may be desired when costs to print the document vary so that a cheaper alternative may be found to printing the original document.

Set of documents 3206 and set of documents 3208 are combined to generate list 3022. List 3022, as disclosed above, is sent to mobile device 3008 or printing device 3006. The user is presented with a list 3022 of documents that he/she may print at printing device 3006. In some embodiments, list 3022 is displayed to the user on mobile device 3008 through mobile application 3009. Mobile application 3009 or printing device 3006 may include a graphical user interface (GUI) to interact with the user to indicate a document from printing. Mobile application 3009 on mobile device 3008 sends a listed document print job request 3024 to retrieve listed document 3202 for printing.

The user also may use the GUI to access alternate documents for printing operations. Initially, list 3022 may include set of documents 3206. The user may indicate a modified parameter is desirable to add documents to list 3022. Then, list 3022 also includes set of documents 3208. The user may then select a document, shown as listed document 3202 for printing on printing device 3006, from set of documents 3206. Alternatively, the user may select an alternate document 3220 to print.

In some embodiments, list 3022 may reside at private server 3002. Print job request 3024 is received at private server 3002. As document 3202 or alternate document 3220 is within list 3022, policy 3010, remaining credit value 3108, and remaining quota value 3118 need not be applied to the request. Document 3202 or 3220 is already approved for printing. Private server 3002 may send document 3202 or 3220 to public server 3004. Public server 3004 forwards document 3202 or 3220 to printing device 3006.

Alternatively, list 3022 may include the data files for the listed documents such that these documents are made available on public server 3004. Listed document print job request 3024 for document 3202 or 3220 is received at public server 3004 from mobile device 3008. Public server 3004 retrieves document 3202 or 3220 and sends it to printing device 3006. This feature may save actions needed to communicate with private server 3002. Further, private server 3002 may not be available to send documents such that public server 3004 manages the allowed and alternate documents in list 3022.

Once a document is retrieved from list 3022, notification 3204 may be sent to the user via mobile device 3008. Notification 3204 may indicate that the document is being sent to printing device 3006. It also may include a code to enter into printing device 3006 to print document 3202 or 3220. For example, the user may not physically be next to printing device 3006 when document 3202 or 3220 is sent. Notification 3204 may include a code for the user to input to printing device 3006 to print document 3202 or 3220 when the user is at the printing device. In some embodiments, statistics 3122 are generated and sent to private server 3002 or public server 3004 to update list 3022.

Figure 23:
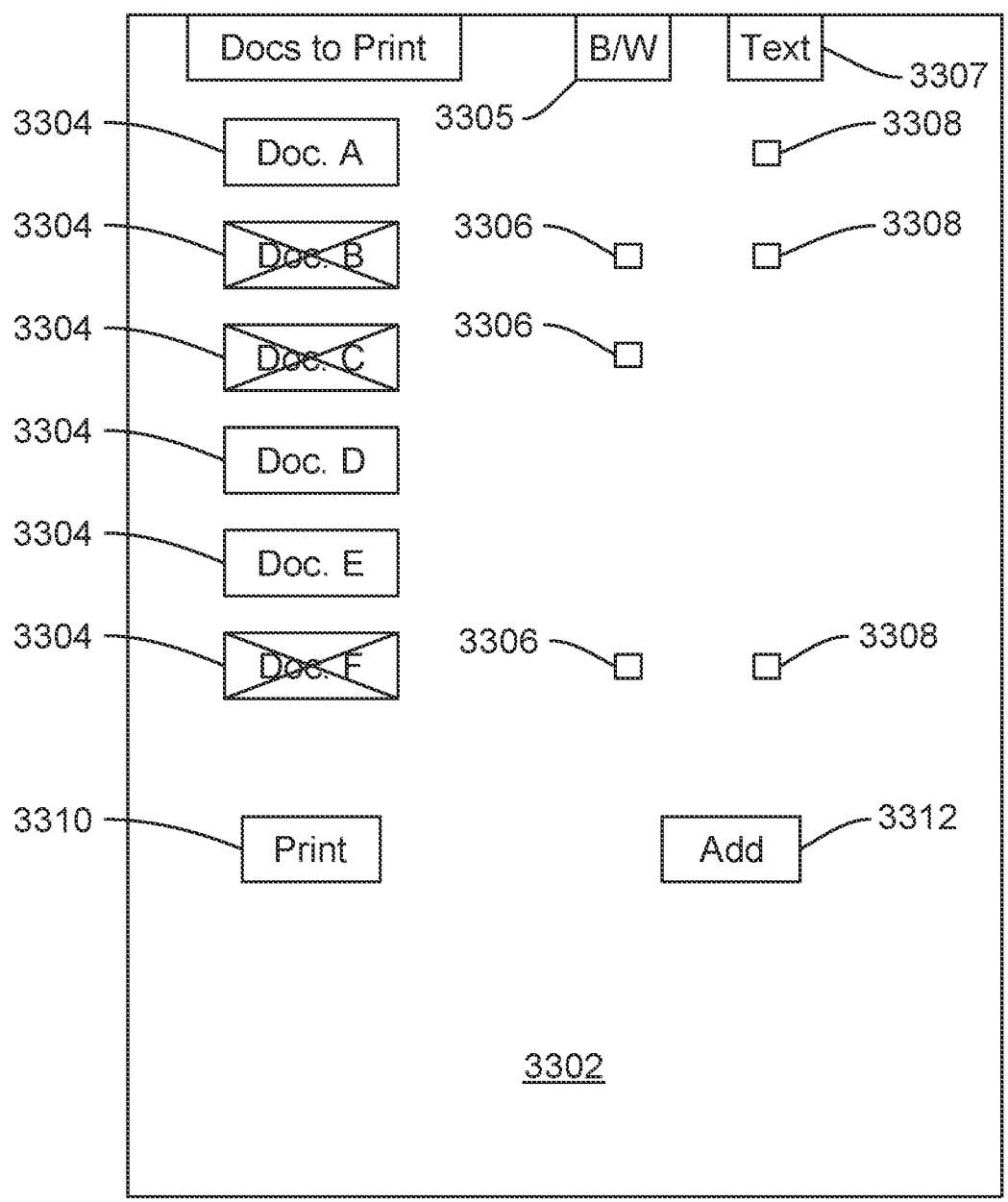
FIG. 23 illustrates a displayed list within a graphical user interface according to the disclosed embodiments.

FIG. 23 depicts a displayed list 3022 within a GUI 3302 according to the disclosed embodiments. FIG. 23 shows an example of how list 3022 may be displayed on mobile device 3008 or printing device 3006 according to some embodiments. Other embodiments may be implemented that show list 3022 to the user so that the user may select one or more documents to print.

GUI 3302 may be a feature of an application, such as mobile application 3009 running on mobile device 3008, or an application executing on printing device 3006. GUI 3302 displays information and receives input based on the displayed information. For example, GUI 3302 includes buttons 3304, 3306, and 3308 that may be displayed on a screen to indicate different information or actions available to the user. The user interacts with the buttons to perform an action using the associated application for managing and printing documents over system 3000.

List 3022 includes documents to print column 3303. Column 3303 may include a header reading "Documents to Print" or something similar. Column 1303 may include buttons 1304 for each document available for the user to access using the policy-based printing system. The name or other designator for each document may be shown. For example, button 3304 for document A displays "Doc. A" and so on. There may be a button for each document stored on private server 3002. Some buttons may use an indicator, such as "X," to designate that this document is not available to the user under policy 3010 or some other reason, such as not enough remaining credit value 3108. Referring to FIG. 23, documents A, D, and E are available to print using list 3022. Documents B, C, and F are not available currently to print according to policy 3010 and are designated as such.

Even though documents B, C, and F are noted as unavailable by GUI 3302, alternate versions of these documents may be available to print under policy 3010. Thus, list 3022 may include the set of documents 3208 of the alternate versions to display on GUI 3302. Black and white print column 3305 and text only column 3307 includes buttons for these respective versions of the documents not available. Black and white print column 3305 may refer to those alternate documents available for printing only in black and white.

For example, column 3305 includes buttons 3306 for documents B, C, and F. The original version of these documents may have color features so that printing is done in color. Policy 3010 may not allow the user to color print at printing device 3006. Thus, buttons 3304 show that these documents are not available to print. Alternate versions of these documents, however, exist that allow them to print in black and white instead of color. Thus, the user is presented the option to select black and white printing in order to meet the requirements of policy 3010. The user may select the alternate version using the appropriate button for the desired document. If the user wishes to print the black and white version of document B, then button 3306 corresponding to document B may be indicated using GUI 3302.

Documents A, D, and E may not necessarily have corresponding buttons 3306 for black and white printing as these documents may not have color features that require color printing. Thus, these documents are provided in set of documents 3206 that meet the requirements of policy 3010.

Column 3307 refers to text only printing alternate versions for the documents. As disclosed above, printing operations may be allowed for versions of originally unavailable documents by removing graphics or pictures that are not allowed to be printed according to policy 3010. These alternate versions may not necessarily correspond to black and white versions in column 3305. Referring to FIG. 23, documents A, B, and F have text only alternate versions that are allowed under policy 3010. Document A may have a text only version even though original document A is allowed to print under policy 3010. The text only version of document A indicated by button 3308 may be available if the user does not need graphics or pictures. As for documents B and F, the original versions are not available for printing operations on printing device 3006 so that text only versions may be available. As with black and white, documents D and E may not need text only alternate versions.

Documents on private server 3002 that are not available to the user for public printing operations and also do not have alternate versions available to print may not be listed in list 3022. Only those documents with the alternate version may listed, such as those within sets of documents 3206 and 3208. The text only documents may be a separate set of documents also included in list 3022. Alternatively, these just may be an additional feature available for a document already in sets 3206 and 3208.

GUI 3302 also may include a print button 3310 that sends data for the selected document to public server 3004. Because the selected document is listed on list 3022 in GUI 3302, policy 3010 does not need to be reapplied to determine if the print job for the document is acceptable. Print button 3310 also may instruct mobile application 3009 to save the instructions for recall if there are problems with printing at printing device 3006.

Add button 3312 also may be included in GUI 3302. An add action may allow the user to add value to the remaining credit value 3108 for the user. For example, the user may use add button 3312 to access another screen to pay the fees associated with printing one or more of the unavailable documents of list 3022. The user may add cash value so that any costs of using printing device 3006 does not exceed the allotted limit. Using the example, the user selects add button 3312 to add enough value to remaining credit value 3108 to print document C, which may not be available due to the current remaining credit value. Ledger 3003 may be updated with the added value to change remaining credit value 3108.

Figure 24:
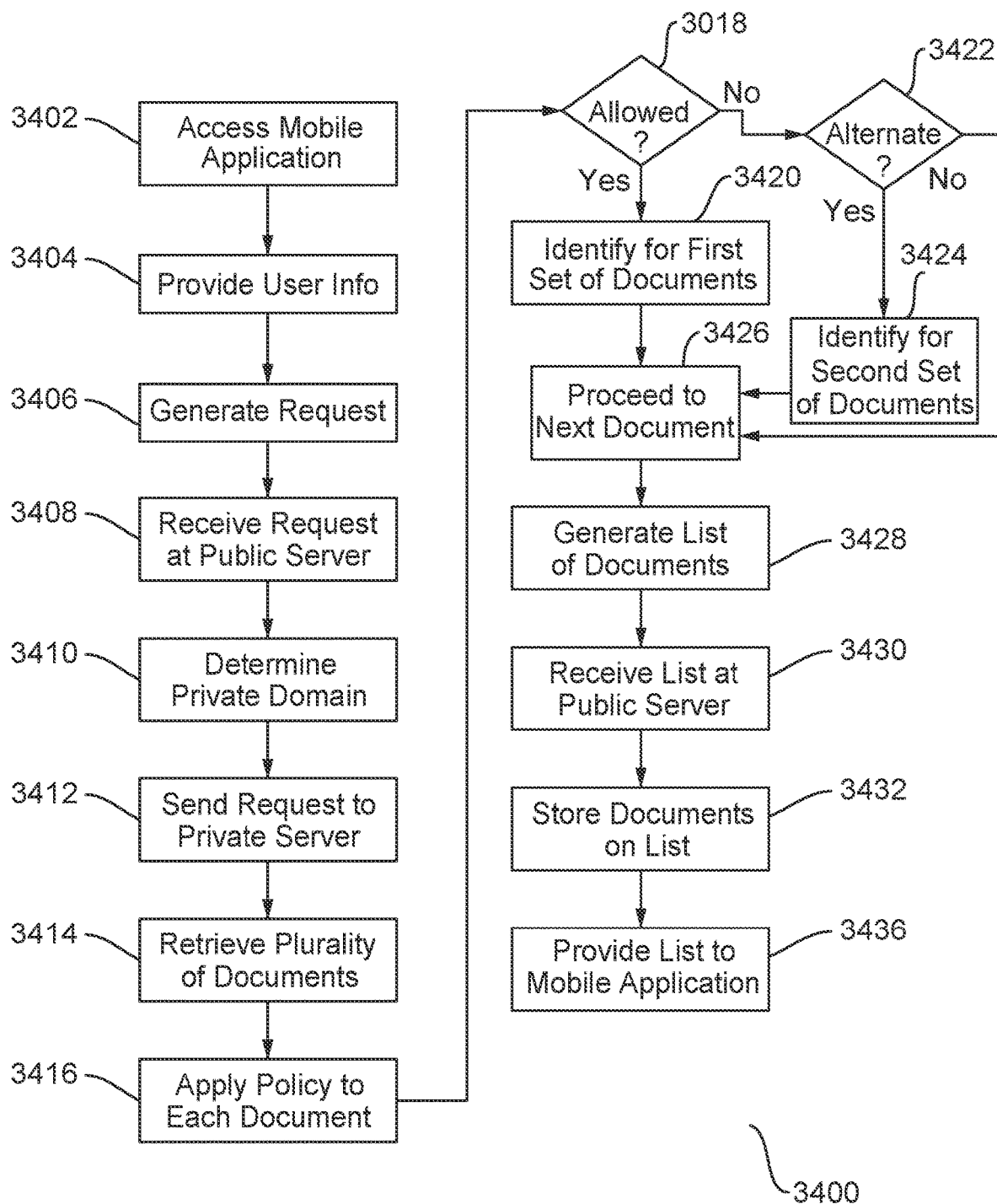
FIG. 24 illustrates a flowchart for generating a list for use within the policy-based printing system according to the disclosed embodiments.

FIG. 24 depicts a flowchart 3400 for generating list 3022 for use within policy-based printing system 3000 according to the disclosed embodiments. Flowchart 3400 may refer to the features of FIGS. 1-23 for illustrative purposes. The embodiments disclosed by flowchart 3400, however, are not limited to the features shown in FIGS. 1-23.

Step 3402 executes by accessing mobile application 3009. The user may launch mobile application 3009 on mobile device 3008. Mobile application 3009 includes a GUI to allow the user to select an action to take to manage printing operations within system 3000. One option may be to obtain a list of documents that the user may print in the public domain. The user may select this action using mobile application 3009. In some embodiments, mobile application 3009 may obtain information about printing device 3006 as a destination for print jobs. Device identification 3018 may be entered or scanned to register printing device 3006 as the destination for the print jobs for the user in the public domain.

Printing device 3006 is part of a public print service through public server 3004. The user may choose printing device 3006 to perform printing operations instead of mobile application 3009. In other embodiments, the user may access any printing device within the public print service through public server 3004. For example, the user may enter a location with a plurality of printing devices and access a kiosk for being printing operations. Alternatively, mobile application 3009 does not register or associate the print jobs with any printing device and only asks for a list of possible documents to print using the public print service.

Step 3404 executes by providing user information to mobile application 3009. Alternatively, the user information may be provided to mobile device 3008 using information provided from another source, such as private server 3002, the kiosk disclosed above or information from printing device 3006. Mobile application 3009 may store the user information on mobile device 3008 for use when needed in printing operations so that the user does not need to re-enter the information for each action taken within system 3000.

Step 3406 executes by generating request 3016 for a list of documents printable at printing device 3006 using mobile application 3009. In some embodiments, the list may be for documents printable within the public print service. Request 3016 may be generated at mobile device 3008 or printing device 3006. The list of documents printable also may include alternate versions of documents that may not be printable at printing device 3006 under policy 3010.

Step 3408 executes by receiving request 3016 at public server 3004 from mobile application 3009 via mobile device 3008. Alternatively, request 3016 may be generated at printing device 3006 or sent to printing device 3006, which then routes the request to public server 3004. Step 3410 executes by determining a private domain applicable to the user using the user information within request 3016. The user information preferably includes an email address for the user. Public server 3004 may use the email address to determine the private domain applicable to the user. The user information also may include a URL address that directs public server 3004 to the appropriate private domain. The private domain includes one or more private servers that store documents accessible by the user. Alternatively, mobile application 3009 may add information to request 3016 that indicates the private domain that is not related to an email address.

Step 3412 executes by sending request 3016 to private server 3002 associated with the private domain determined in step 3310. Request 3016 instructs private server 3002 to generate list 3022 of one or more documents 3012 associated with the user. Private server 3002 stores these documents and identifies those documents that the user may print. Not all of these documents may be printed on a public printing device. Step 3414 executes by retrieving documents 3012 associated with the user sending request 3016.

Step 3416 executes by applying policy 3010 to each document 3012 retrieved for the user. The application of policy 3010 to determine whether a document may be printed in the public domain is disclosed above. The disclosed embodiments determine whether policy 3010 will allow one or more documents 3012 to be printed based on the parameters and constraints set forth by the organization or company associated with the domain. The process of applying a policy to determine whether to allow a print job of a document is disclosed above.

Alternatively, step 3416 may apply remaining credit value 1108 or remaining quota value 3118 to determine if one or more documents 3012 can be printed without exceeding the remaining values. This process is disclosed above by FIG. 21. In some embodiments, the application of policy 3010 and values 3108 or 3118 may be executed simultaneously. In other embodiments, the application of remaining credit value 3108 or remaining quota value 3118 may be executed after the application of policy 3010 such that a document allowed by policy 3010 may not be allowed if the print job exceeds the remaining credit value or remaining quota value. Private server 3002 may be instructed which application to execute by the organization.

Step 3418 executes by determining whether the document may be printed according to policy 3010 or other constraints applied in step 3416. If allowed, then the original version of the document may be printed at printing device 3006. If yes, then step 3420 executes by identifying the document for the first set of documents, such as set of documents 3206. The first set of documents also may be known as the set of original documents. These are the original documents as stored on private server 3002.

If step 3418 is no, then step 3422 executes by determining whether an alternate version of the original document is available for printing operations at printing device 3006. The disclosed embodiments may check to see if an alternate version of the documents exists that meets the requirements of policy 3010. In some embodiments, the alternate version may be generated in this step if it is not presently available on private server 3002. If more than one alternate version is available, then the different alternate versions are checked to see which parameter has been modified to meet the requirements of policy 3010. For example, document F may include an alternate version document F1 for black and white printing and an alternate version document F2 for text only printing.

If step 3422 is yes, then step 3424 executes by identifying the alternate version of the documents for a second set of documents 3208. The second set of documents also may be known as the set of alternate documents, which is different from the set of original documents. If step 3422 is no, then flowchart 3400 proceeds to step 3426, which also executes after the completion of step 3420 or 3424. Step 3426 executes by proceeding to the next document for the user on private server 3002. If no further document to process using policy 3010 exist, then flowchart 3400 proceeds to step 3428.

Step 3428 executes by generating list 3022 of approved documents for printing by the user. For example, list 3022 will include the documents from set of documents 3208 along with set of documents 3206. If more than two set of documents are identified, list 3022 may include these as well. List 3022 may be stored at private server 3002 along with the corresponding request.

Steps 3414-3428 also may be executed at public server 3004. In other words, request 3016 is not sent to private server 3002. Documents 3012 may be stored at public server 3004 along with policy 3010 and ledger 3003 to determine remaining credit value 3108 or remaining quota value 3118. List 3022 may be generated at public server 3004 in the same manner as disclosed above. This feature may remove the need to engage and tie up private server 3002 with generating lists over and over for users.

Step 3430 executes by receiving list 3022 at public server 3004 from private server 3002, if applicable. If list 3022 is generated at private server 3002, then the list should be provided to public server 3004 as it will provide a selected document to printing device 3006. Step 3432 executes by storing any documents within list 3022 at public server 3004, if appropriate. In some embodiments, the files for the documents in list 3022 are sent as well so that these documents may be saved at public server 3004 for quick retrieval when a print job is received.

Step 3436 executes by providing list 3022 to mobile application 3009 on mobile device 3008. The user will receive list 3022 at mobile device 3008, which sent request 3016. In some embodiments, mobile application 3009 may display list 3022 on mobile device 3008 upon receipt from public server 3004. Mobile application 3009 may store list 3022 on mobile device 3008 for retrieval at a later time. The user may view list 3022 to select a document for printing when he/she is ready. Alternatively, list 3022 also may be sent to printing device 3006 such that the user views the list on the printing device.

Figure 25:
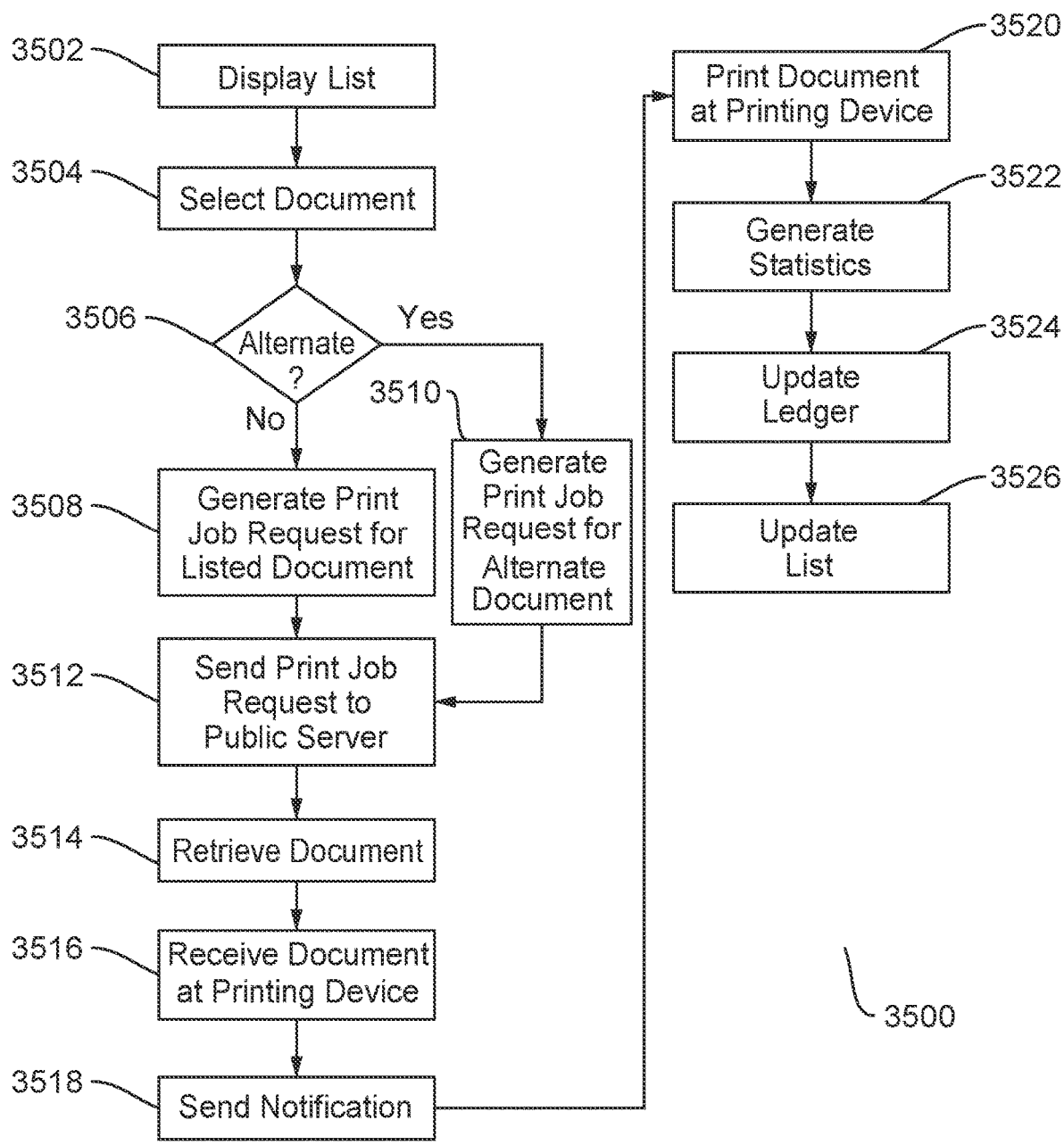
FIG. 25 illustrates a flowchart for using a list to print a document at the printing device according to the disclosed embodiments.

FIG. 25 illustrates a flowchart 3500 for using list 3022 to print document 3202 at printing device 3006 according to the disclosed embodiments. Flowchart 3500 may refer to the features of FIGS. 1-24 for illustrative purposes. The embodiments disclosed by flowchart 3500, however, are not limited to the features shown in FIGS. 1-24.

Step 3502 executes by displaying list 3022, for example, on mobile device 3008 using mobile application 3009. The documents in list 3022 are made available to the user so that the user may browse the list to search for a document to print. GUI 3302 for mobile application 3009 may allow the user to scroll through list 3022 as well as bring up information about each document, such as page numbers, file size, estimated cost to print, and the like. Alternatively, list 3022 may be displayed on printing device 3006 so that the user may browse the documents thereon.

List 3022 displays all sets of documents used to generate list 3022. In some embodiments, a different column, row, area, and the like, may be shown for each set of documents. Referring back to FIG. 22, column 3303 shows the documents available to print in set of documents 3206 while column 3305 shows the documents available to print in set of documents 3208. Thus, one column may include the set of original documents available to print while another column may include the set of alternate documents available to print.

Step 3504 executes by selecting a document 3202 from list 3022 for printing. The selected document may be from the set of original documents or from the set of alternate documents. The user may select a document using the appropriate button as displayed by GUI 3302. The user may indicate one or more documents to print that fit within the constraints and parameters applied when generating list 3022.

Step 3506 executes by determining whether the selected document is an alternate document, or a document from set of documents 3208, within list 3022. Listed document 3202 may be an original document listed on the documents available to print without modification. Alternate document 3220 may be an alternate document listed on the alternate documents available to print with a modification to a parameter in the document to meet the requirements of policy 3010. Step 3506 determines which set of documents includes the selected document. The determination may be made based on the button used to select the document in GUI 3302.

If step 3506 is no, then step 3508 executes by generating a print job request 3024 for listed document 3202. Print job request 3024 may be generated using mobile application 3009 executing on mobile device 3008. Alternatively, it may be generated at printing device 3006 if the user is managing printing operations from that device. Print job request 3024 may be like a typical print job request sent to retrieve a document from public server 3004.

If step 3506 is yes, then step 3510 executes by generating print job request 3024 for an alternate document 3220. Print job requests from original and alternate documents may be distinguishable from each other in that different information may be included in the request such that the original document of an alternate document is not sent accidentally to printing device 3006, thereby violating policy 3010. Further, a print job request 3024 for alternate document 3220 also may include instructions to create the alternate document. For example, list 3022 may include that such alternate versions of the original document may be made available from private server. In other words, private server 3002 may not store alternate versions of the original documents but, instead, creates them when needed. Thus, a document C1 is not stored but created when this option is selected using the disclosed embodiments.

Step 3512 executes by sending print job request 3024 to public server 3004 from mobile device 3008. Print job request 3024 is sent to public server 3004 instead of directly to a private server, such as private server 3002, as mobile device 3008 may not have a direct connection to the private domain past firewall 3011 while in the public domain. In some embodiments, print job request 3024 may be generated using mobile application 3009 and sent via printing device 3006. Alternatively, print job request 3024 may be sent from printing device 3006 to public server 3004.

Step 3514 executes by retrieving listed document 3202 or alternate document 3220 for printing based on the print job request. In some embodiments, print job request 3024 is passed from public server 3004 to private server 3002 to retrieve listed document 3202 or alternate document 3220. Listed document 3202 is stored on private server 3002. As disclosed above, alternate document 3220 may be stored on private server 3002 or created thereon in response to print job request 3024. Because the document is selected from list 3022, private server 3002 does not need to apply policy 3010 or use ledger 3003 to approve the print job. Private server 3002 may send the data file for listed document 3202 or alternate document 3220 to public server 3004.

Alternatively, step 3514 may retrieve listed document 3202 or alternate document 3220 from public server 3004. As noted above, the data files for documents on list 3022 may be sent from private server 3002 and stored at public server 3004 to allow easier access for printing operations. Thus, public server 3004 process print job request 3024 and retrieves the requested document without the need to involve private server 3002. If alternate document 3220 needs to be created, then public server 3004 may create it at this time. Thus, the disclosed embodiments may reduce the number of actions needed to fulfill print job requests from printing device 3006 by using list 3022 in conjunction with public server 3004.

Step 3516 executes by receiving listed document 3202 or alternate document 3220 at public server 3004. Public server 3004 may receive listed document 3202 or alternate document 3220 from private server 3002. If listed document 3202 or alternate document 3220 is stored on public server 3004, then this step may be skipped. In some embodiments, public server 3004 may retrieve documents from another server in the public print service.

Step 3518 executes by sending notification 3204 to the user that listed document 3202 or alternate document 3220 is ready to print. Notification 3204 may be sent to mobile device 3008 and displayed using mobile application 3009. Notification 3204 may include a code to enter at printing device 3006 to launch printing of listed document 3202 or alternate document 3220. The code may be used so that only the user may print listed document 3202 or alternate document 3220. For example, printing device 3006 may be in a public location having many printing devices operated by a kiosk. The user enters the code from notification 3204 upon arrival at the public location so that the document is not made available without the user present. Printing device 3006 also may receive the code associated with listed document 3202 or alternate document 3220.

Step 3520 executes by printing listed document 3202 or alternate document 3220 at printing device 3006. If using a code from notification 3204, then printing device 3006 may verify the code to listed document 3202 or alternate document 3220 to print. Step 3522 executes by generating statistics 3122 for the print job of listed document 3202 or alternate document 3220. Statistics may include the number of pages printed, costs accrued, data used, type of paper used, color or black and white printing, and the like. Statistics 3122 may be sent to public server 3004 as well as user device 3008. If applicable, then statistics 3122 also are sent to private server 3002.

Step 3524 executes by updating ledger 3003 with statistics 3122 for the print job of listed document 3202 or alternate document 3220. As disclosed above, completed print jobs are entered as transactions in ledger 3003. Thus, an entry will be created for the completed print job using the data from statistics 3122. Further, remaining credit value 3108 or remaining quota value 3118 is adjusted accordingly so that these values reflect the amount now available for the user. Step 3526 executes by updating list 3022 accordingly. List 3022 may remove those documents that are not allowed due to the updated remaining credit value 3108 or remaining quota value 3118. The updated list may be sent to public server 3004. In other embodiments, public server 3004 may update list 3022 using a ledger 3003 thereon. This feature may reduce the number of actions needed between public server 3004 and private server 3002.

In some embodiments, only policy 3010 is applied to generate list 3022. No remaining credit value 3108 or remaining quota value 3118 is used. Thus, no update of list 3022 is needed after a print job is completed. List 3022, however, may be updated when policy 3010 is changed or updated.

According to the disclosed embodiments, the number of applications of a policy or other constraints to a user for public domain printing may be reduced using a list generated beforehand and provided to the user. The list may reduce the number of denials to the user for print jobs. It also gives a clear indication to the user what is available to print in the public domain so that he/she may take action before commencing printing operations to make other documents available. The disclosed embodiments also may reduce the number of interactions between the public server and the private server. By using a mobile application, the selection of documents to print in the public domain is made simpler. The disclosed embodiments also provide alternate versions that meet the requirements of the policy that the user may select for printing operations. Thus, the user is provided with some options for printing documents using a policy-based printing system.

In a first alternate embodiment, a policy-based printing method includes receiving a request with information from a mobile application on a mobile device to perform printing operations at a printing device, wherein the information corresponds to a user;

determining a private domain for the user at a public server connected to the printing device based on the information in the request;

sending the request to a private server corresponding to the private domain from the public server;

determining a plurality of documents accessible by the user, wherein the plurality of documents is stored at the private server;

applying a policy stored at the private server to each of the plurality of documents, wherein the policy corresponds to the user;

selecting at least one document from the plurality of documents according to the policy to generate a list;

receiving the list including the at least one document at the public server; and providing the list including the at least one document to the user at the mobile application on the mobile device.

The first alternate embodiment also includes selecting a listed document on the mobile application to print at the printing device from the list of the at least one document.

The first alternate embodiment also includes sending a print job request from the mobile device to the public server to retrieve the listed document.

The first alternate embodiment also includes retrieving the listed document from the private server.

The first alternate embodiment also includes printing the listed document at the printing device.

The first alternate embodiment also includes sending a print job request from the mobile device to the printing device to print the listed document.

The first alternate embodiment also includes sending the at least one document to the public server with the list, wherein the at least one document is retrieved from the public server to print at the printing device when selected by the user using the mobile application.

The first alternate embodiment also includes receiving a code at the mobile application to print the listed document at the printing device.

In a second alternate embodiment, a policy-based printing method includes receiving a request with information from a mobile application on a mobile device to perform printing operations at a printing device, wherein the information corresponds to a user;

determining a private domain for the user at a public server connected to the printing device based on the information in the request;

sending the request to a private server corresponding to the private domain;

determining a plurality of documents accessible by the user, wherein the plurality of documents is stored at the private server;

determining a remaining credit value for a print job for the user at the printing device using a ledger;

selecting at least one document from the plurality of documents according to the remaining credit value for the user;

receiving a list including the at least one document at the public server; and providing the list including the at least one document to the user at the mobile application on the mobile device.

The second alternate embodiment also includes selecting a listed document from the list of the at least one document.

The second alternate embodiment also includes printing the listed document at the printing device.

The second alternate embodiment also includes increasing the remaining credit value using the mobile application.

The second alternate embodiment also includes sending the at least one document to the public server with the list, wherein the at least one document is retrieved from the public server to print at the printing device when selected by the user using the mobile application.

The second alternate embodiment also includes that determining the remaining credit value includes using a policy credit value set forth by a policy corresponding to the user.

The second alternate embodiment also includes that determining the policy credit value includes compiling costs for at least one transaction in the ledger and subtracting the compiled costs from the policy credit value.

The second alternate embodiments also includes determining a remaining quota value for the user using the ledger, wherein the remaining quota value corresponds to data usage available to the user.

The second alternate embodiment also includes that determining the remaining quota value includes using a policy quota value set forth by a policy corresponding the user.

In a third alternate embodiment, a policy-based printing method includes receiving a request with information at a public server from a mobile application on a mobile device to perform printing operations at a printing device, wherein the information corresponds to a user;

determining a private domain for the user at the public server based on the information in the request;

determining a plurality of documents accessible by the user based on the private domain;

generating a list of at least one document from the plurality of documents according to a constraint corresponding to the user;

receiving the at least one document of the list at the public server;

receiving the list of the at least one document at the mobile application on the mobile device;

selecting a listed document from the list using the mobile application;

retrieving the listed document from the at least one document stored on the public server; and printing the listed document at the printing device.

The third alternate embodiment also includes that generating the list according to the constraint includes applying a policy corresponding to the user to identify the at least one document for the list.

The third alternate embodiment also includes that generating the list according to the constraint includes using a remaining credit value for printing operations by the user to identify the at least one document for the list.

In a fourth alternate embodiment, a policy-based printing method includes receiving a request to access a plurality of documents stored on a server, wherein the request includes information about a user;

determining a first set of documents and a second set of documents from the plurality of documents, wherein the first set of documents are identified according to a policy corresponding to the user as having at least one original document available to print at a printing device connected to the server, wherein the second set of documents are identified according to the policy as having at least one alternate document available to print at the printing device, wherein the at least one alternate document includes a modified parameter to be allowed to print according to the policy;

generating a list including the first set of documents and the second set of documents having at least one alternate document with the modified parameter;

sending the list of the first set of documents and the second set of documents to the printing device;

selecting an alternate document from the second set of documents;

retrieving the alternate document from the server; and printing the alternate document with the modified parameter at the printing device.

The fourth alternate embodiment also includes displaying the list on the printing device, wherein the second set of documents are displayed indicating the modified parameter.

The fourth alternate embodiment also includes that the server is a public server connected to the printing device.

The fourth alternate embodiment also includes that the server is a private server connected to the printing device through a public server.

The fourth alternate embodiment also includes that the policy is stored on the private server.

The fourth alternate embodiment also includes the policy corresponds to a domain associated with the user.

The fourth alternate embodiment also includes selecting an original document from the first set of documents to print at the printing device.

The fourth alternate embodiment also includes printing the original document at the printing device.

In a fifth alternate embodiment, a policy-based printing method includes receiving a request to access a plurality of documents stored on a server, wherein the request includes information about a user;

determining a first set of documents and a second set of documents from the plurality of documents, wherein the first set of documents are identified according to a policy corresponding to the user as having at least one original document available to print at a printing device connected to the server, wherein the second set of documents are identified according to the policy as having at least one alternate document available to print at the printing device, wherein the at least one alternate document includes a modified parameter to be allowed to print according to the policy;

generating a list including the first set of documents and the second set of documents having at least one alternate document with the modified parameter;

sending the list of the first set of documents and the second set of documents to a mobile application on a mobile device;

selecting an alternate document from the second set of documents using the mobile application;

retrieving the alternate document from the server; and printing the alternate document with the modified parameter at the printing device.

The fifth alternate embodiment also includes displaying the list in the mobile application on the mobile device, wherein the second set of documents are displayed indicating the modified parameter.

The fifth alternate embodiment also includes that the server is a public server connected to the printing device.

The fifth alternate embodiment also includes that the server is a private server connected to the printing device through a public server.

The fifth alternate embodiment also includes that the policy is stored on the private server.

The fifth alternate embodiment also includes sending a print job request for the alternate document selected using the mobile application to the public server.

The fifth alternate embodiment also includes sending a print job request for the alternate document selected using the mobile application to the printing device.

The fifth alternate embodiment also includes that the server is a cloud-based server.

In a sixth alternate embodiment, a policy-based printing method includes receiving a request at a server for a list of documents to print at a printing device in a public domain, wherein the request pertains to a user;

applying a policy to a plurality of documents stored on the server in response to the request, wherein the policy corresponds to the user;

determining a first set of documents according to the policy, wherein the first set of documents include original versions of documents within the plurality of documents;

determining a second set of documents according to the policy, wherein the second set of documents include alternate versions of documents within the plurality of documents and wherein the alternate versions of documents have a modified parameter;

generating the list using the first set of documents and the second set of documents;

displaying the list to the user, wherein the first set of documents and the second set of documents are indicated separately;

selecting an alternate document having the modified parameter from the second set of documents;

retrieving the alternate document from the server; and printing the alternate document with the modified parameter at the printing device.

The sixth alternate embodiment also includes sending the list from the server to a mobile device, wherein the list is displayed on the mobile device using a mobile application.

The sixth alternate embodiment also includes that the server is a private server such that the private server communicates with the printing device through a public server in the public domain.

The sixth alternate embodiment also includes that the server is a public server within the public domain.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more multi-functional printer (MFP) systems coupled to a network capable of exchanging information and data. Various functions and components of the MFP system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

What is claimed is:

1. A policy-based printing method comprising:
receiving a request to access a plurality of documents stored on a server, wherein the request includes information about a user;
determining a first set of documents and a second set of documents from the plurality of documents,
wherein the first set of documents are identified according to a policy corresponding to the user as having at least one original document available to print at a printing device connected to the server,
wherein the second set of documents are identified according to the policy as having at least one alternate document available to print at the printing device,
wherein the at least one alternate document includes a modified parameter to be allowed to print according to the policy;
generating a list including the first set of documents and the second set of documents having at least one alternate document with the modified parameter;
sending the list of the first set of documents and the second set of documents to the printing device;
selecting an alternate document from the second set of documents;
retrieving the alternate document from the server; and
printing the alternate document with the modified parameter at the printing device.

2. The policy-based printing method of claim 1, further comprising displaying the list on the printing device, wherein the second set of documents are displayed indicating the modified parameter.

3. The policy-based printing method of claim 1, wherein the server is a public server connected to the printing device.

4. The policy-based printing method of claim 1, wherein the server is a private server connected to the printing device through a public server.

5. The policy-based printing method of claim 4, wherein the policy is stored on the private server.

6. The policy-based printing method of claim 1, wherein the policy corresponds to a domain associated with the user.

7. The policy-based printing method of claim 1, further comprising selecting an original document from the first set of documents to print at the printing device.

8. The policy-based printing method of claim 7, further comprising printing the original document at the printing device.

9. A policy-based printing method comprising:
receiving a request to access a plurality of documents stored on a server, wherein the request includes information about a user;
determining a first set of documents and a second set of documents from the plurality of documents,
wherein the first set of documents are identified according to a policy corresponding to the user as having at least one original document available to print at a printing device connected to the server,
wherein the second set of documents are identified according to the policy as having at least one alternate document available to print at the printing device,
wherein the at least one alternate document includes a modified parameter to be allowed to print according to the policy;
generating a list including the first set of documents and the second set of documents having at least one alternate document with the modified parameter;
sending the list of the first set of documents and the second set of documents to a mobile application on a mobile device;
selecting an alternate document from the second set of documents using the mobile application;
retrieving the alternate document from the server; and
printing the alternate document with the modified parameter at the printing device.

10. The policy-based printing method of claim 9, further comprising displaying the list in the mobile application on the mobile device, wherein the second set of documents are displayed indicating the modified parameter.

11. The policy-based printing method of claim 9, wherein the server is a public server connected to the printing device.

12. The policy-based printing method of claim 9, wherein the server is a private server connected to the printing device through a public server.

13. The policy-based printing method of claim 12, wherein the policy is stored on the private server.

14. The policy-based printing method of claim 11, further comprising sending a print job request for the alternate document selected using the mobile application to the public server.

15. The policy-based printing method of claim 9, further comprising sending a print job request for the alternate document selected using the mobile application to the printing device.

16. The policy-based printing method of claim 9, wherein the server is a cloud-based server.

17. A policy-based printing method comprising:
receiving a request at a server for a list of documents to print at a printing device in a public domain, wherein the request pertains to a user;
applying a policy to a plurality of documents stored on the server in response to the request, wherein the policy corresponds to the user;
determining a first set of documents according to the policy, wherein the first set of documents include original versions of documents within the plurality of documents;
determining a second set of documents according to the policy, wherein the second set of documents include alternate versions of documents within the plurality of documents and wherein the alternate versions of documents have a modified parameter;
generating the list using the first set of documents and the second set of documents;
displaying the list to the user, wherein the first set of documents and the second set of documents are indicated separately;
selecting an alternate document having the modified parameter from the second set of documents;
retrieving the alternate document from the server; and
printing the alternate document with the modified parameter at the printing device.

18. The policy-based printing method of claim 17, further comprising sending the list from the server to a mobile device, wherein the list is displayed on the mobile device using a mobile application.

19. The policy-based printing method of claim 17, wherein the server is a private server such that the private server communicates with the printing device through a public server in the public domain.

20. The policy-based printing method of claim 17, wherein the server is a public server within the public domain.

* * * * *